(12) United States Patent
Aoki

(10) Patent No.: US 9,921,409 B2
(45) Date of Patent: Mar. 20, 2018

(54) IMAGE PICKUP APPARATUS

(71) Applicant: CANON KABUSHIKI KAISHA, Tokyo (JP)

(72) Inventor: Koji Aoki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 15/090,788

(22) Filed: Apr. 5, 2016

(65) Prior Publication Data
US 2016/0299338 A1 Oct. 13, 2016

(30) Foreign Application Priority Data

Apr. 7, 2015 (JP) .................. 2015-078355

(51) Int. Cl.
| | | |
|---|---|---|
| *G02B 27/00* | (2006.01) | |
| *H04N 5/225* | (2006.01) | |
| *G03B 17/08* | (2006.01) | |
| *G03B 17/14* | (2006.01) | |
| *G02B 7/14* | (2006.01) | |
| *G03B 5/00* | (2006.01) | |

(52) U.S. Cl.
CPC .......... *G02B 27/0068* (2013.01); *G02B 7/14* (2013.01); *G03B 5/00* (2013.01); *G03B 17/08* (2013.01); *G03B 17/14* (2013.01); *H04N 5/2252* (2013.01)

(58) Field of Classification Search
CPC ........ G02B 27/0068; G02B 7/14; G03B 5/00; G03B 17/08; G03B 17/14; H04N 5/2252
See application file for complete search history.

(56) References Cited

U.S. PATENT DOCUMENTS

| | | | |
|---|---|---|---|
| 2015/0185493 A1 | 7/2015 | Aoki | |
| 2015/0308665 A1* | 10/2015 | Hough | F21S 10/007 362/268 |
| 2017/0038566 A1* | 2/2017 | Shibayama | G02B 15/17 |

FOREIGN PATENT DOCUMENTS

| | | |
|---|---|---|
| JP | 2004-252219 A | 9/2004 |
| JP | 2004-325711 A | 11/2004 |

\* cited by examiner

*Primary Examiner* — Twyler Haskins
*Assistant Examiner* — Fayez Bhuiyan
(74) *Attorney, Agent, or Firm* — Carter, DeLuca, Farrell & Schmidt, LLP

(57) ABSTRACT

Provided is an image pickup apparatus, including: an image pickup optical system including a protection lens, which is arranged closest to a light incident side and has a convex-shaped surface on light incident side; and a housing houses the image pickup optical system, in which the image pickup optical system includes an aperture stop, and an optical systems A and B, which are arranged on an image side of aperture stop to be selectively placed in an optical path of image pickup optical system, the optical systems A and B having mutually different optical characteristics, and in which the housing separates a medium outside of housing and an inside of housing, and in which the image pickup apparatus further includes a switching unit selectively places one of optical systems A and B in optical path of image pickup optical system depending on a medium outside housing.

19 Claims, 27 Drawing Sheets

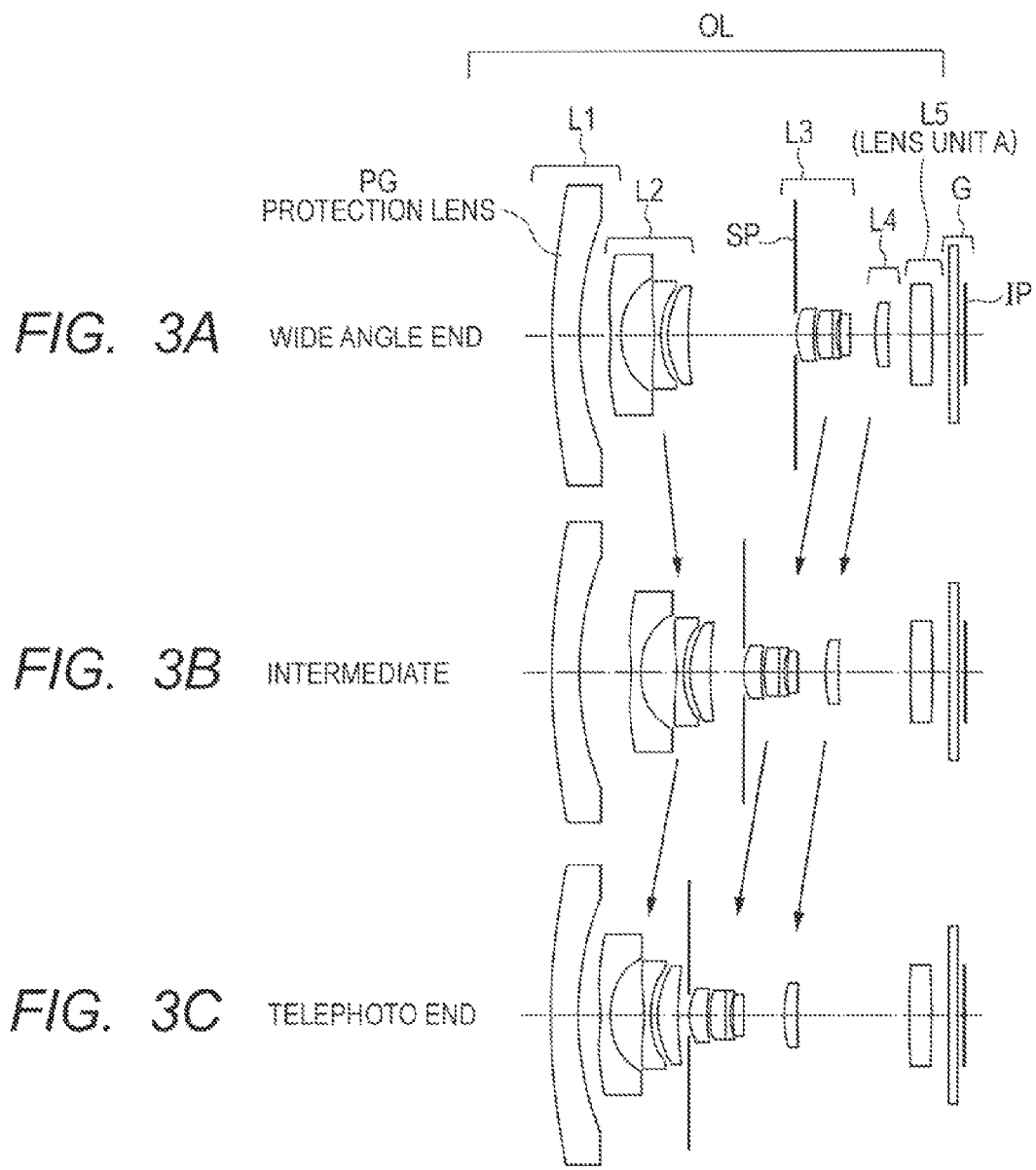

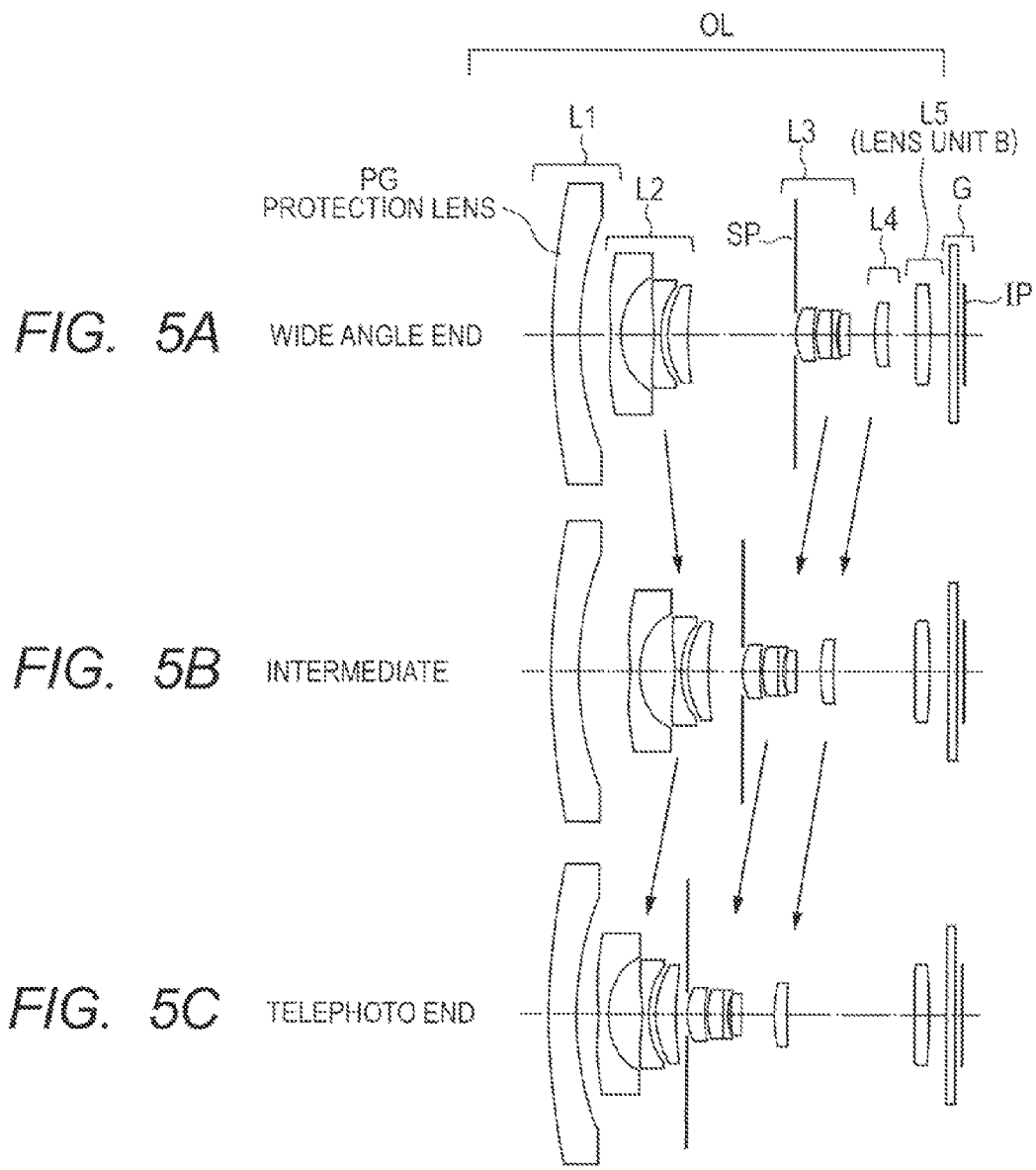

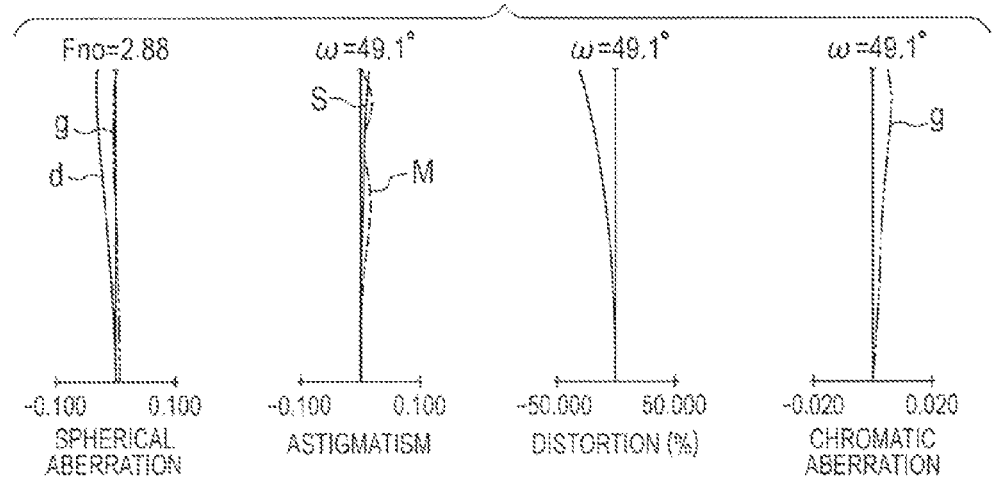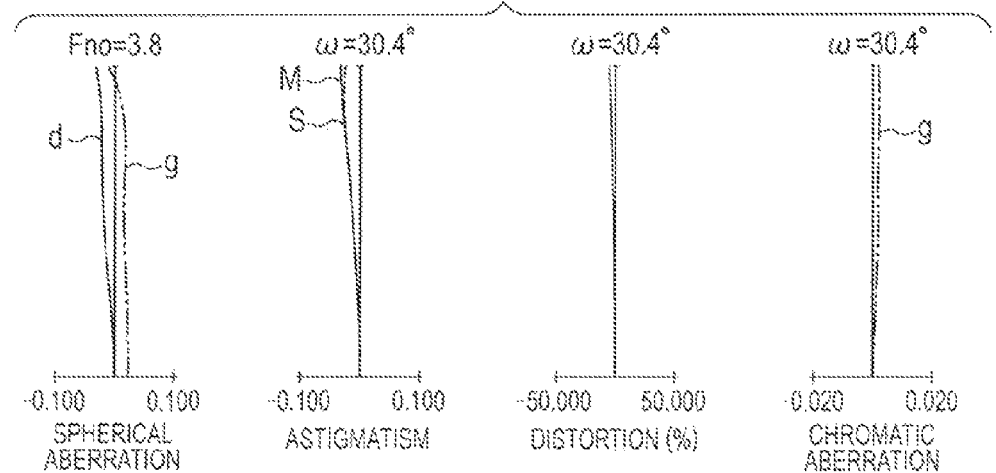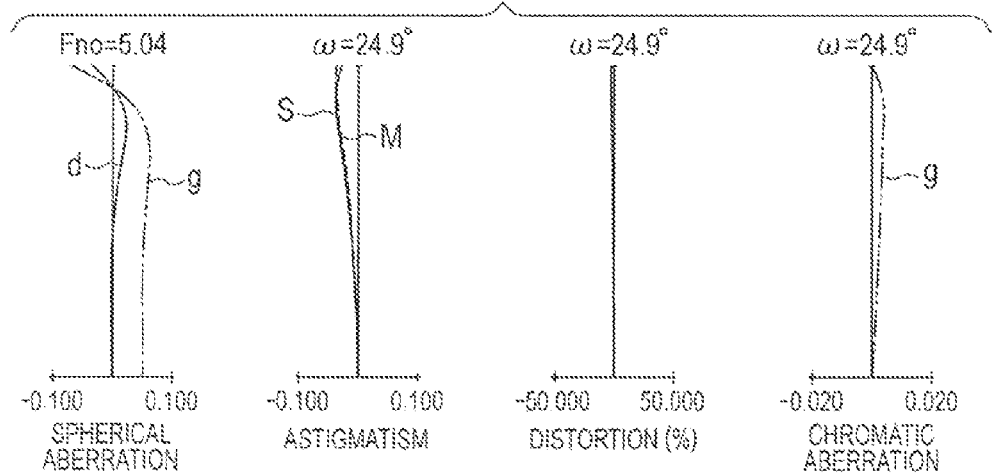

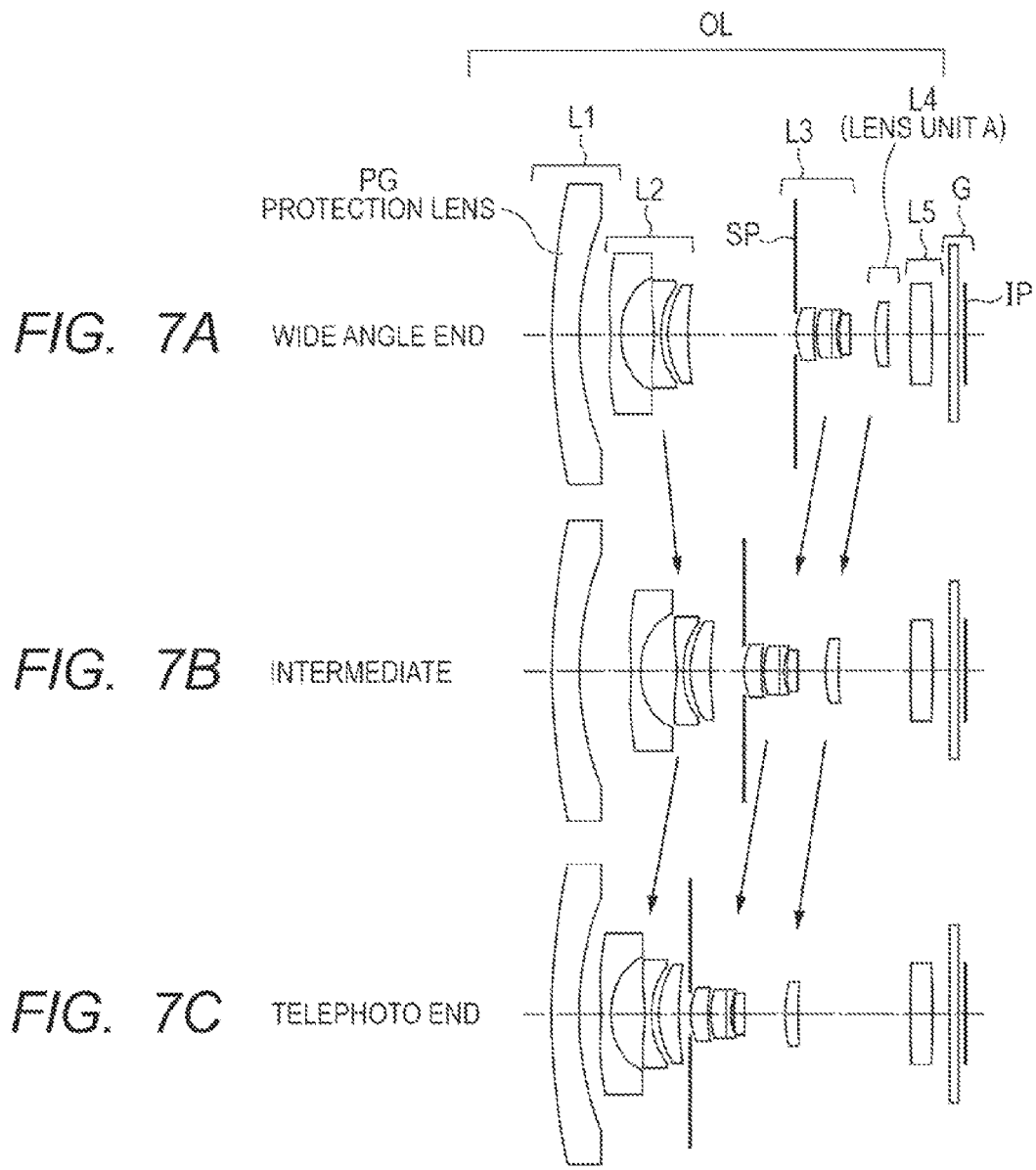

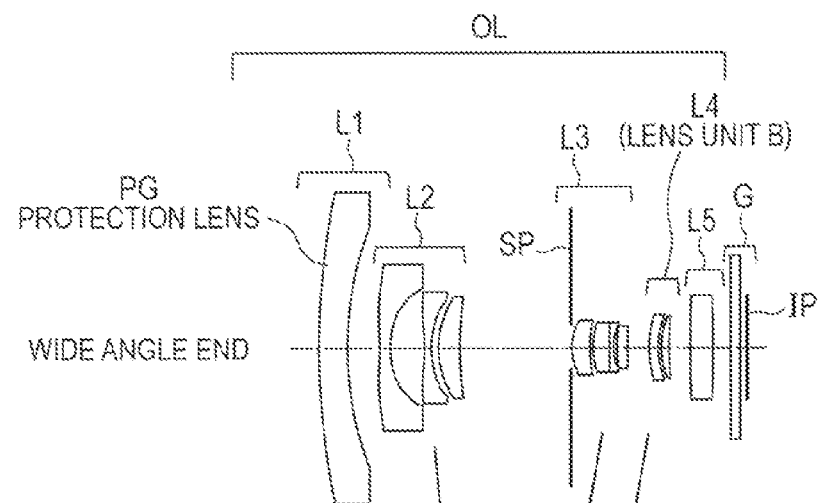
FIG. 8A  WIDE ANGLE END
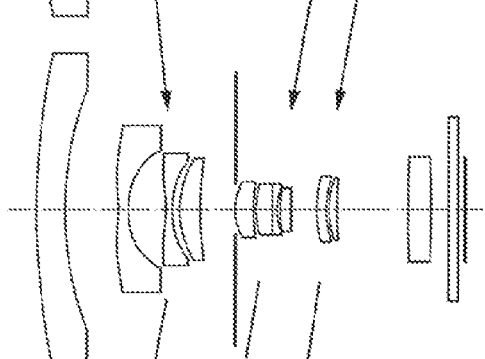
FIG. 8B  INTERMEDIATE
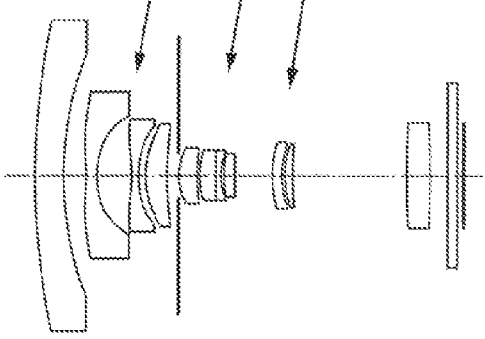
FIG. 8C  TELEPHOTO END

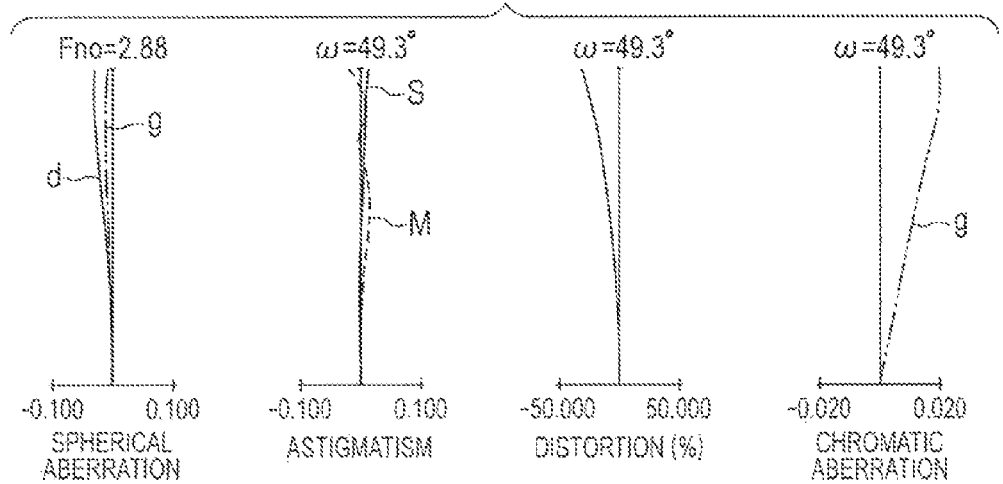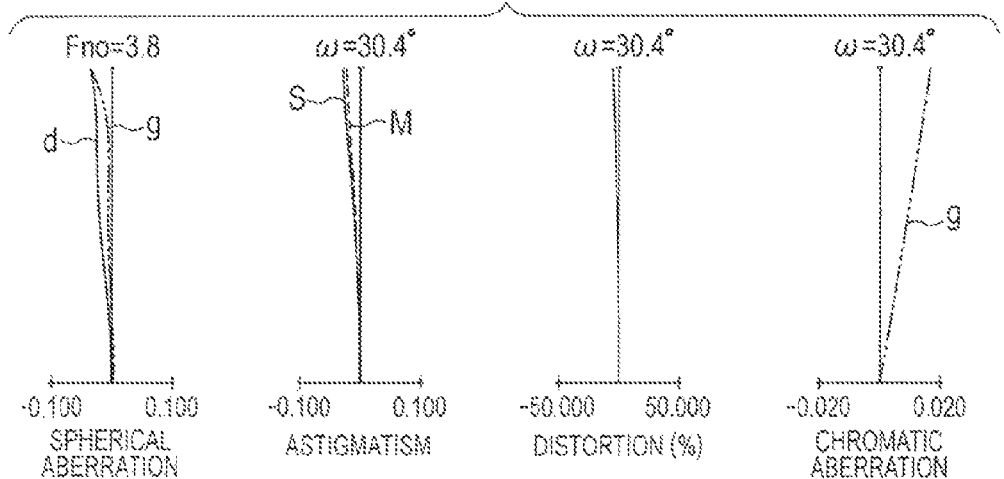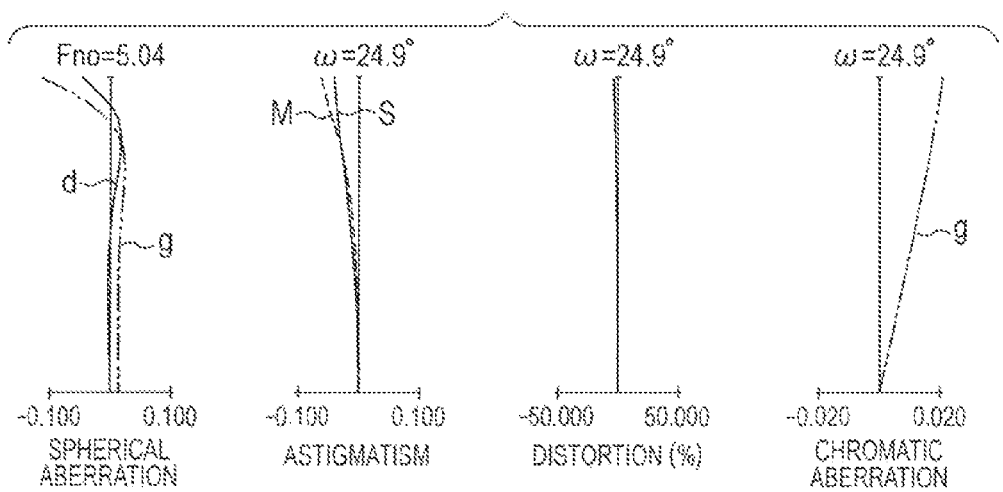

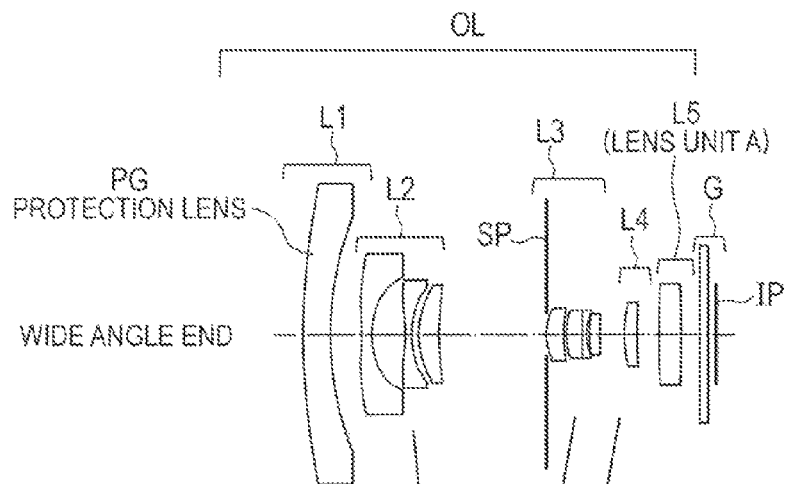
FIG. 10A WIDE ANGLE END
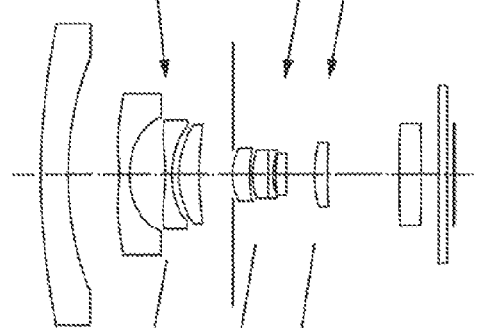
FIG. 10B INTERMEDIATE
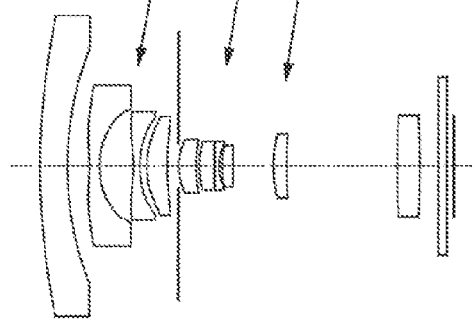
FIG. 10C TELEPHOTO END

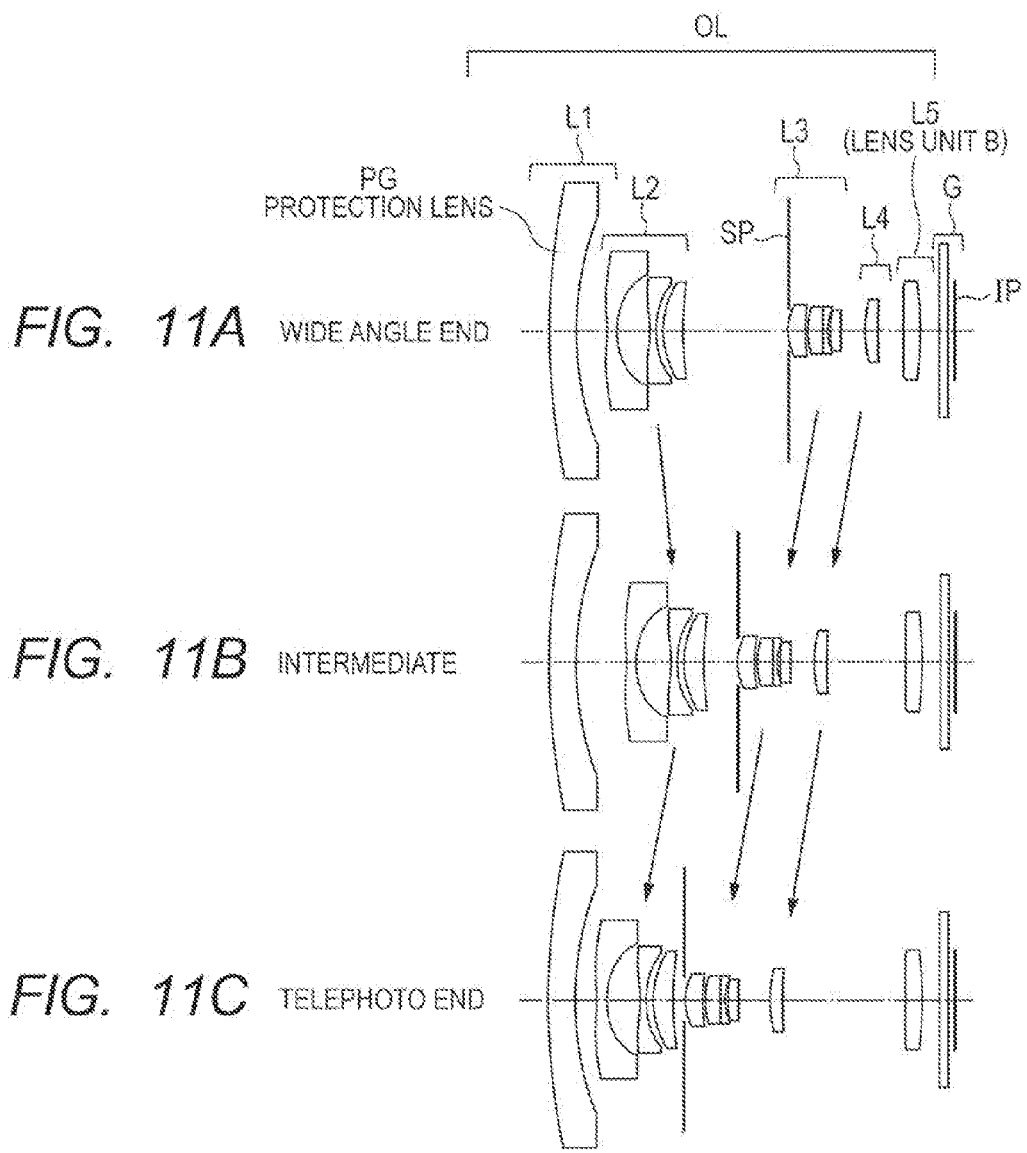

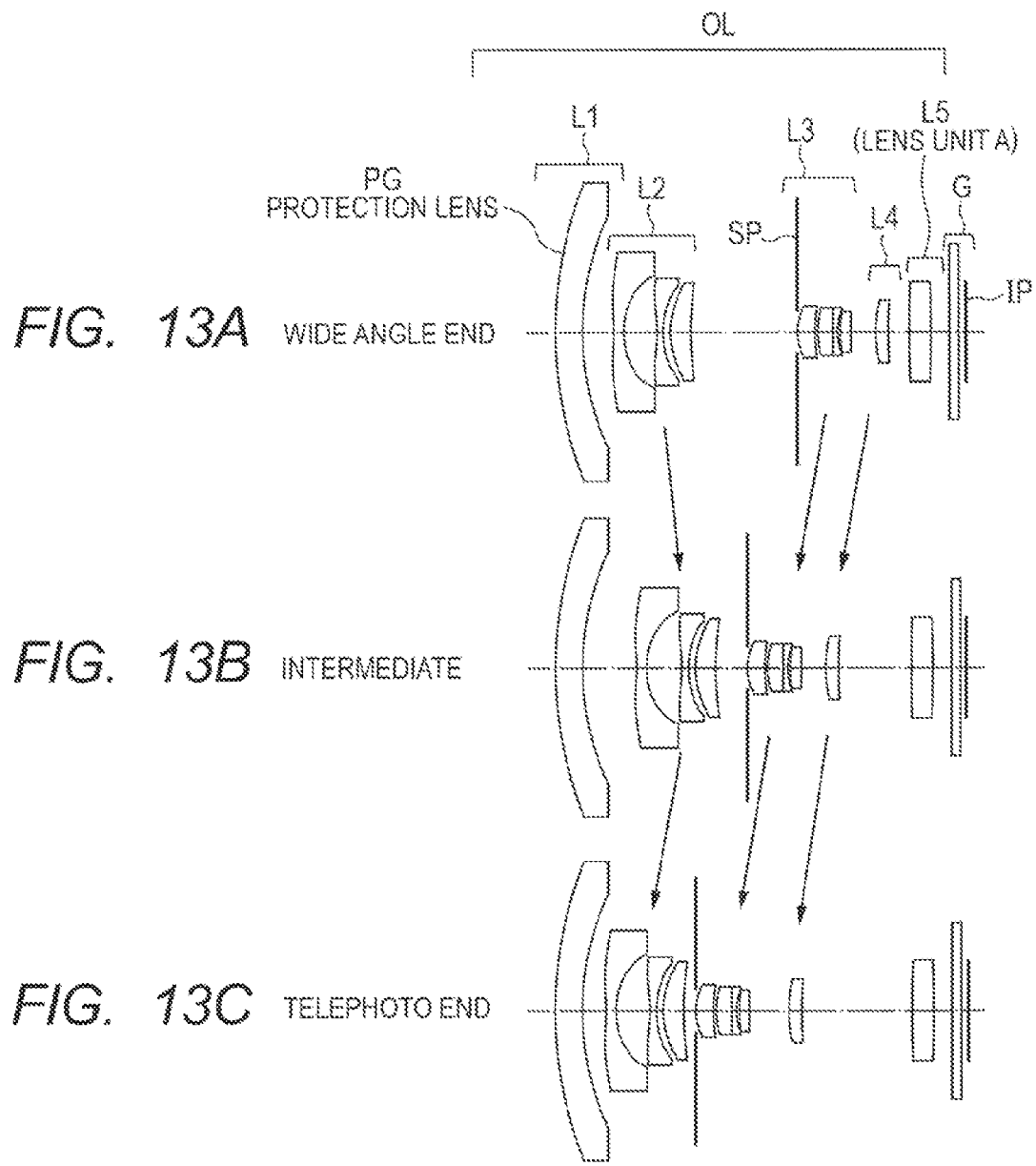

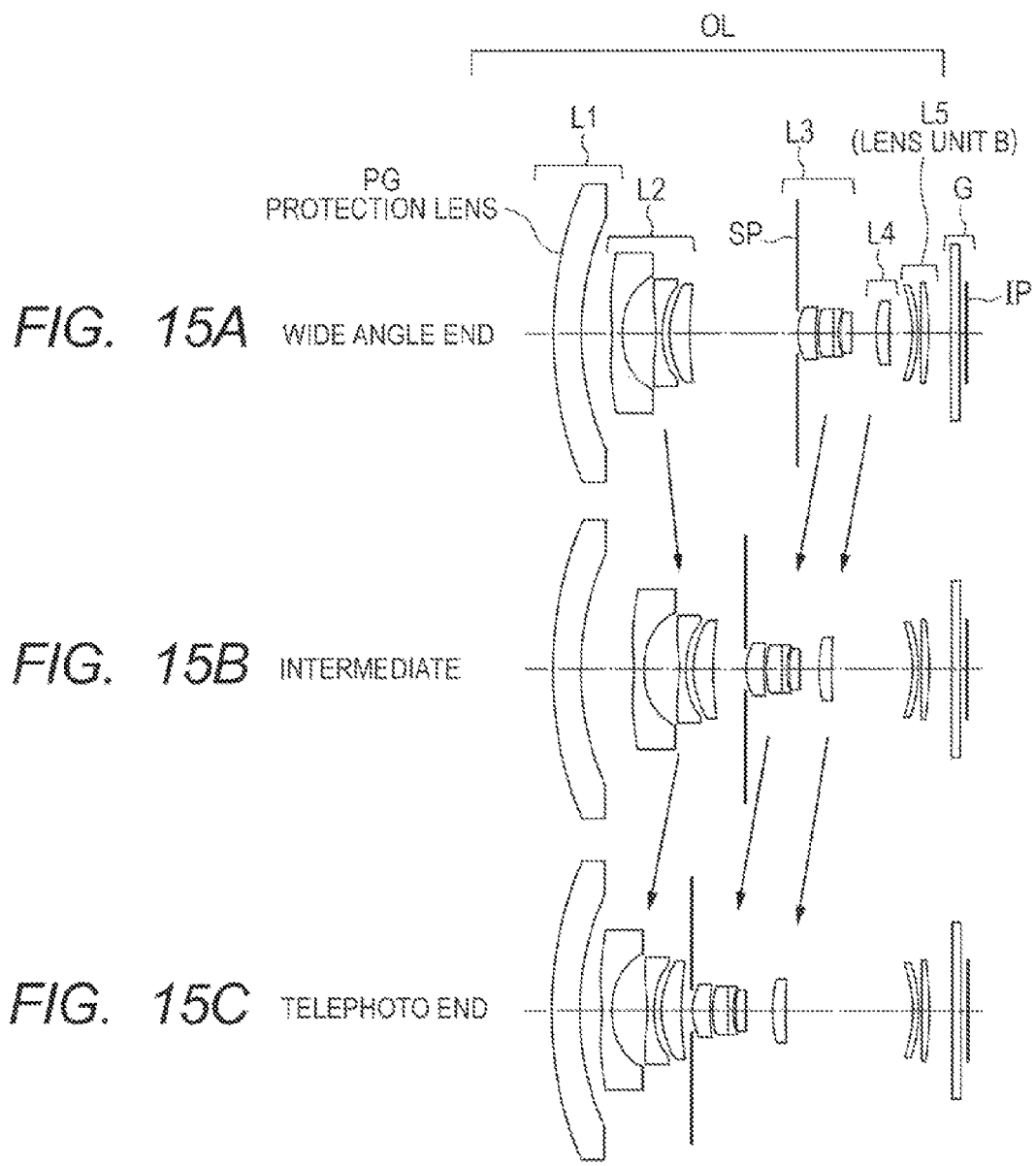

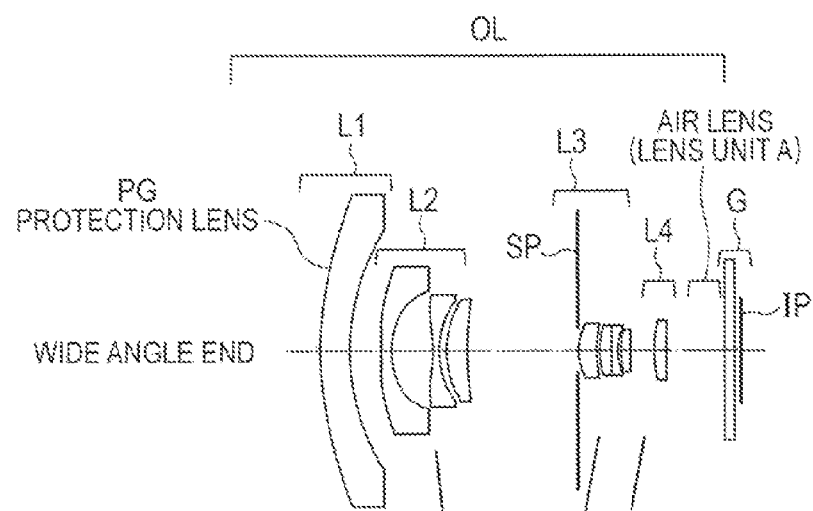
FIG. 17A WIDE ANGLE END
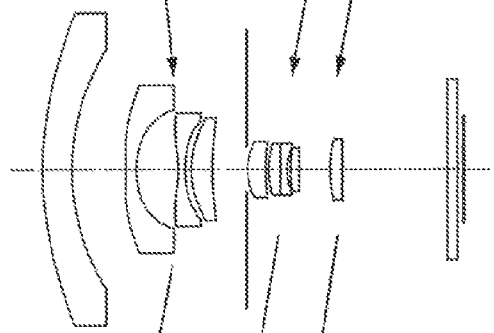
FIG. 17B INTERMEDIATE
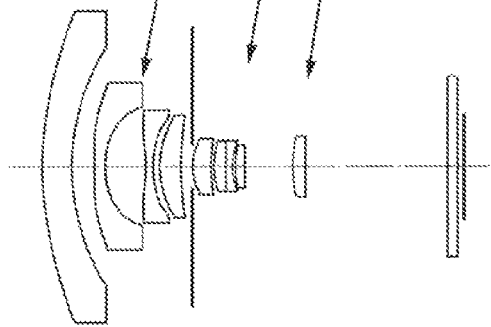
FIG. 17C TELEPHOTO END

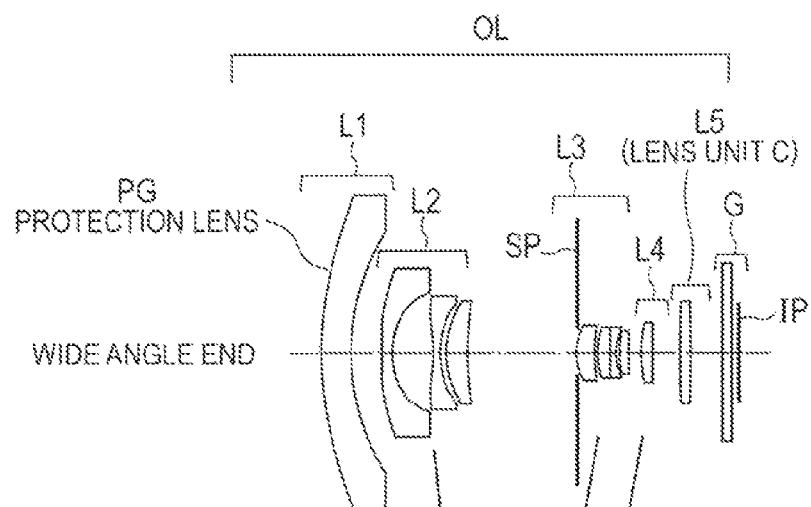
FIG. 19A WIDE ANGLE END
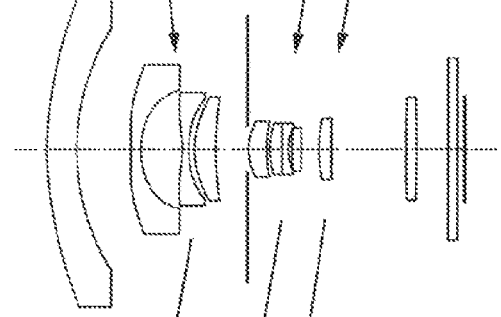
FIG. 19B INTERMEDIATE
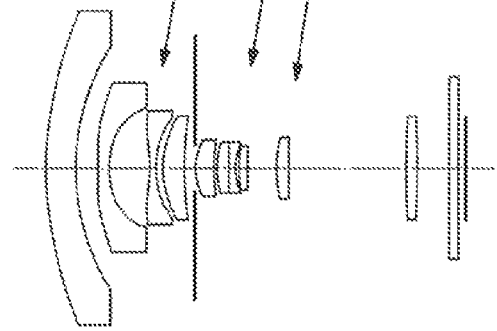
FIG. 19C TELEPHOTO END

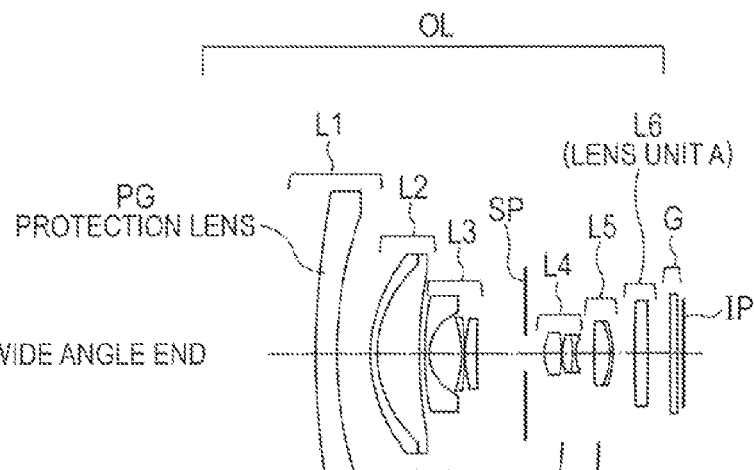
FIG. 21A  WIDE ANGLE END
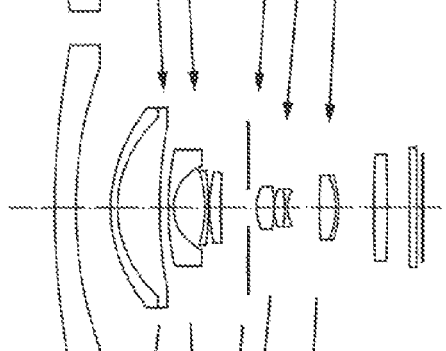
FIG. 21B  INTERMEDIATE
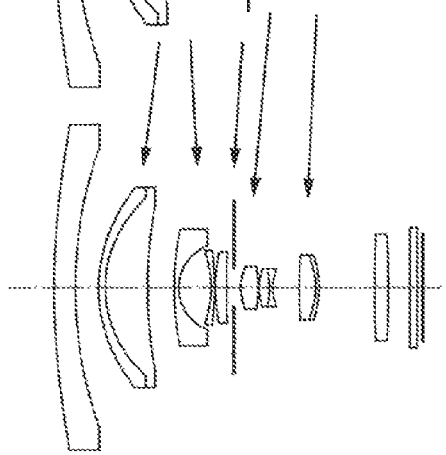
FIG. 21C  TELEPHOTO END

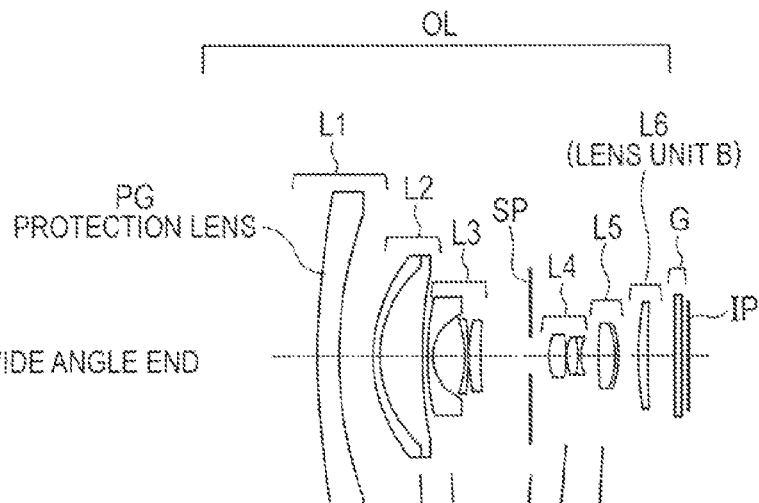
FIG. 23A  WIDE ANGLE END
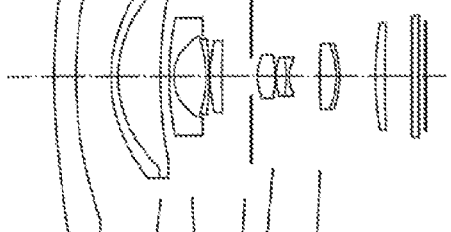
FIG. 23B  INTERMEDIATE
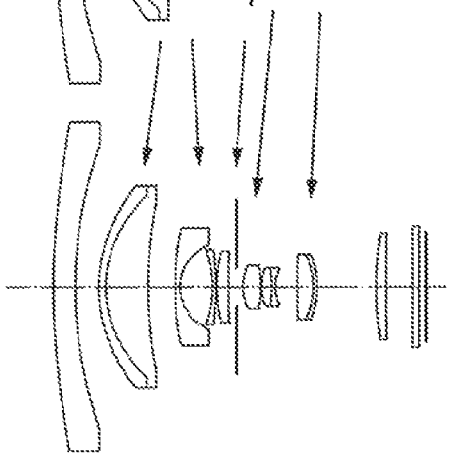
FIG. 23C  TELEPHOTO END

IMAGE PICKUP APPARATUS

BACKGROUND OF THE INVENTION

Field of the Invention

The present invention relates to an image pickup apparatus having a waterproof function and being capable of taking a good image both in air and in water.

Description of the Related Art

In recent years, with increased popularity of diving, an increase in number of underwater photographers, and the like, there are increasing opportunities for underwater photography, and an underwater camera is required to have portability, operability, an image pickup area, optical characteristics, and the like comparable to those in photography on the ground (in the air).

In general, as the underwater camera or an amphibious camera, a camera housed in an underwater housing or a camera equipped with a waterproof mechanism is used. However, water or salt water has a refractive index and a dispersion that are different than those of air, for example, a refractive index with respect to a d-line of about 4/3 of that of air, and a dispersion of about 62 in Abbe number. Therefore, when an image pickup optical system sufficiently corrected for aberrations in the air is used in water, a change in refracting action at an interface at which water and the image pickup optical system are brought into contact with each other occurs.

As a result, optical imaging characteristics significantly deteriorate due to a change in photographing field angle and changes in aberrations. In particular, in a case where the interface at which water and the image pickup optical system are brought into contact with each other is a planar surface, a photographing field angle in water becomes significantly small with respect to a photographing field angle in the air, and photography with a wide field angle becomes difficult.

As means for realizing the wide field angle during the underwater photography, a method in which the interface is formed into a shape that is convex toward an object side and a curvature thereof is increased to allow light beams to enter concentrically to mitigate the refracting action at the interface has been known. However, when the curvature of the convex shape of the interface is increased too much, a difference between refractive powers in the air and in water at the interface becomes too large, and various aberrations, in particular, field curvature is increased. Therefore, it becomes difficult to reduce the field curvature while realizing the wide field angle. Moreover, water has dispersion as well as the refractive index, and large lateral chromatic aberration occurs at the interface.

As means for reducing the increase in field curvature while realizing the wide field angle during the underwater photography, in Japanese Patent Application Laid-Open No. 2004-325711, there is described an image pickup apparatus utilizing a method in which a dome-shaped pressure-resistant window and a lens unit having a positive refractive power, which is removably insertable into an optical path, are included on an object side of an image pickup optical system. Moreover, as means for suppressing the lateral chromatic aberration, which occurs during the underwater photography, in Japanese Patent Application Laid-Open No. 2004-252219, there is disclosed an image pickup apparatus utilizing a method in which a filter attachment having a diffraction optical surface is attached on an object side of an image pickup optical system.

In Japanese Patent Application Laid-Open No. 2004-325711, the dome-shaped pressure-resistant window and the removably attachable lens unit having the positive refractive power are included on the object side of the image pickup optical system to form an afocal system when in water, with the result that a wide photographing field angle is secured, and that the occurrence of the field curvature is reduced. In the image pickup apparatus described in Japanese Patent Application Laid-Open No. 2004-325711, there has been a tendency for the dome-shaped pressure-resistant window to be increased in size with respect to the image pickup optical system. Moreover, in Japanese Patent Application Laid-Open No. 2004-252219, the filter attachment having the diffraction optical surface is attached on the object side of the image pickup optical system to suppress the lateral chromatic aberration generated when in water. However, the diffraction optical surface is extremely difficult to fabricate, and it has been difficult to obtain high optical characteristics both in water and on the ground.

The underwater camera is required to have good portability and attachability/removability during the underwater photography, and to generate small field curvature and lateral chromatic aberration during the underwater photography. The underwater camera is also required to have good optical characteristics during both the underwater photography and the photography in the air, to be easy to switch between the underwater photography and the photography in the air, and the like.

SUMMARY OF THE INVENTION

According to one embodiment of the present invention, there is provided an image pickup apparatus, including:

an image pickup optical system including a protection lens, which is arranged closest to a light incident side and has a convex-shaped surface on the light incident side; and a housing configured to house the image pickup optical system, in which the image pickup optical system includes an aperture stop, and an optical system A and an optical system B, which are arranged on an image side of the aperture stop to be selectively placed in an optical path of the image pickup optical system, the optical system A and the optical system B having mutually different optical characteristics, in which the housing is configured to separate a medium outside the housing and an inside of the housing, and in which the image pickup apparatus includes a switching unit configured to selectively place one of the optical system A and the optical system B in the optical path of the image pickup optical system depending on the medium outside the housing.

According to another embodiment of the present invention, there is provided an image pickup apparatus, including:

an image pickup optical system including a protection lens, which is arranged closest to a light incident side and has a convex-shaped surface on the light incident side; and a housing configured to house the image pickup optical system, in which the image pickup optical system includes an aperture stop, and an optical system C, which is arranged on an image side of the aperture stop to be removably insertable into an optical path of the image pickup optical system, in which the housing is configured to separate a medium outside the housing and a medium inside the housing, and in which the image pickup apparatus includes an insertion/removal unit configured to insert or remove the optical system C into or from the optical path of the image pickup optical system depending on the medium outside the housing.

Further features of the present invention will become apparent from the following description of exemplary embodiments with reference to the attached drawings.

BRIEF DESCRIPTION OF THE DRAWINGS

FIG. 3A is a lens cross-sectional view of an image pickup optical system according to Example 1 of the present invention in an image pickup state A at a wide angle end.

FIG. 3B is a lens cross-sectional view of the image pickup optical system according to Example 1 of the present invention in the image pickup state A at an intermediate zoom position.

FIG. 3C is a lens cross-sectional view of the image pickup optical system according to Example 1 of the present invention in the image pickup state A at a telephoto end.

FIG. 5A is a lens cross-sectional view of the image pickup optical system according to Example 1 of the present invention in the image pickup state B at a wide angle end.

FIG. 5B is a lens cross-sectional view of the image pickup optical system according to Example 1 of the present invention in the image pickup state B at an intermediate zoom position.

FIG. 5C is a lens cross-sectional view of the image pickup optical system according to Example 1 of the present invention in the image pickup state B at a telephoto end.

FIG. 6A is a longitudinal aberration diagram of the image pickup optical system according to Example 1 of the present invention in the image pickup state B at the wide angle end.

FIG. 6B is a longitudinal aberration diagram of the image pickup optical system according to Example 1 of the present invention in the image pickup state B at the intermediate zoom position.

FIG. 6C is a longitudinal aberration diagram of the image pickup optical system according to Example 1 of the present invention in the image pickup state B at the telephoto end.

FIG. 7A is a lens cross-sectional view of an image pickup optical system according to Example 2 of the present invention in the image pickup state A at a wide angle end.

FIG. 7B is a lens cross-sectional view of the image pickup optical system according to Example 2 of the present invention in the image pickup state A at an intermediate zoom position.

FIG. 7C is a lens cross-sectional view of the image pickup optical system according to Example 2 of the present invention in the image pickup state A at a telephoto end.

FIG. 8A is a lens cross-sectional view of the image pickup optical system according to Example 2 of the present invention in the image pickup state B at a wide angle end.

FIG. 8B is a lens cross-sectional view of the image pickup optical system according to Example 2 of the present invention in the image pickup state B at an intermediate zoom position.

FIG. 8C is a lens cross-sectional view of the image pickup optical system according to Example 2 of the present invention in the image pickup state B at a telephoto end.

FIG. 9A is a longitudinal aberration diagram of the image pickup optical system according to Example 2 of the present invention in the image pickup state B at the wide angle end.

FIG. 9B is a longitudinal aberration diagram of the image pickup optical system according to Example 2 of the present invention in the image pickup state B at the intermediate zoom position.

FIG. 9C is a longitudinal aberration diagram of the image pickup optical system according to Example 2 of the present invention in the image pickup state B at the telephoto end.

FIG. 10A is a lens cross-sectional view of an image pickup optical system according to Example 3 of the present invention in the image pickup state A at a wide angle end.

FIG. 10B is a lens cross-sectional view of the image pickup optical system according to Example 3 of the present invention in the image pickup state A at an intermediate zoom position.

FIG. 10C is a lens cross-sectional view of the image pickup optical system according to Example 3 of the present invention in the image pickup state A at a telephoto end.

FIG. 11A is a lens cross-sectional view of the image pickup optical system according to Example 3 of the present invention in the image pickup state B at a wide angle end.

FIG. 11B is a lens cross-sectional view of the image pickup optical system according to Example 3 of the present invention in the image pickup state B at an intermediate zoom position.

FIG. 11C is a lens cross-sectional view of the image pickup optical system according to Example 3 of the present invention in the image pickup state B at a telephoto end.

FIG. 13A is a lens cross-sectional view of an image pickup optical system according to Example 4 of the present invention in the image pickup state A at a wide angle end.

FIG. 13B is a lens cross-sectional view of the image pickup optical system according to Example 4 of the present invention in the image pickup state A at an intermediate zoom position.

FIG. 13C is a lens cross-sectional view of the image pickup optical system according to Example 4 of the present invention in the image pickup state A at a telephoto end.

FIG. 15A is a lens cross-sectional view of the image pickup optical system according to Example 4 of the present invention in the image pickup state B at a wide angle end.

FIG. 15B is a lens cross-sectional view of the image pickup optical system according to Example 4 of the present invention in the image pickup state B at an intermediate zoom position.

FIG. 15C is a lens cross-sectional view of the image pickup optical system according to Example 4 of the present invention in the image pickup state B at a telephoto end.

FIG. 17A is a lens cross-sectional view of an image pickup optical system according to Example 5 of the present invention in the image pickup state A at a wide angle end.

FIG. 17B is a lens cross-sectional view of the image pickup optical system according to Example 5 of the present invention in the image pickup state A at an intermediate zoom position.

FIG. 17C is a lens cross-sectional view of the image pickup optical system according to Example 5 of the present invention in the image pickup state A at a telephoto end.

FIG. 19A is a lens cross-sectional view of the image pickup optical system according to Example 5 of the present invention in the image pickup state B at a wide angle end.

FIG. 19B is a lens cross-sectional view of the image pickup optical system according to Example 5 of the present invention in the image pickup state B at an intermediate zoom position.

FIG. 19C is a lens cross-sectional view of the image pickup optical system according to Example 5 of the present invention in the image pickup state B at a telephoto end.

FIG. 21A is a lens cross-sectional view of an image pickup optical system according to Example 6 of the present invention in the image pickup state A at a wide angle end.

FIG. 21B is a lens cross-sectional view of the image pickup optical system according to Example 6 of the present invention in the image pickup state A at an intermediate zoom position.

FIG. 21C is a lens cross-sectional view of the image pickup optical system according to Example 6 of the present invention in the image pickup state A at a telephoto end.

FIG. 23A is a lens cross-sectional view of the image pickup optical system according to Example 6 of the present invention in the image pickup state B at a wide angle end.

FIG. 23B is a lens cross-sectional view of the image pickup optical system according to Example 6 of the present invention in the image pickup state B at an intermediate zoom position.

FIG. 23C is a lens cross-sectional view of the image pickup optical system according to Example 6 of the present invention in the image pickup state B at a telephoto end.

DESCRIPTION OF THE EMBODIMENTS

Now, exemplary embodiments of the present invention are described in detail with reference to the accompanying drawings. An image pickup apparatus according to the present invention includes an image pickup optical system including a protection lens, which is arranged closest to a light incident side and has a convex-shaped surface on the light incident side, and a housing configured to house the image pickup optical system. The image pickup optical system includes an aperture stop, and an optical system A and an optical system B, which are arranged on an image side of the aperture stop to be selectively placed in an optical path of the image pickup optical system, and the optical system A and the optical system B have mutually different optical characteristics.

The housing is configured to separate a medium outside the housing and a medium inside the housing. The image pickup apparatus includes a switching unit configured to selectively place any one of the optical system A and the optical system B in the optical path of the image pickup optical system depending on the medium outside the housing. Here, time when the optical system A is placed in the optical path is referred to as an "image pickup state A", and time when the optical system B is placed in the optical path is referred to as an "image pickup state B".

Alternatively, an image pickup apparatus according to the present invention includes an image pickup optical system including a protection lens, which is arranged closest to a light incident side and has a convex-shaped surface on the light incident side, and a housing configured to house the image pickup optical system. The image pickup optical system includes an aperture stop, and an optical system C, which is arranged on an image side of the aperture stop to be removably insertable into an optical path of the image pickup optical system. The housing is configured to separate a medium outside the housing and a medium inside the housing. The image pickup apparatus includes an insertion/removal unit configured to insert or remove the optical system C into or from the optical path of the image pickup optical system depending on the medium outside the housing. Here, time when the optical system C is not placed in the optical path is referred to as an "image pickup state A", and time when the optical system C is placed in the optical path is referred to as an "image pickup state B".

Figure 1:
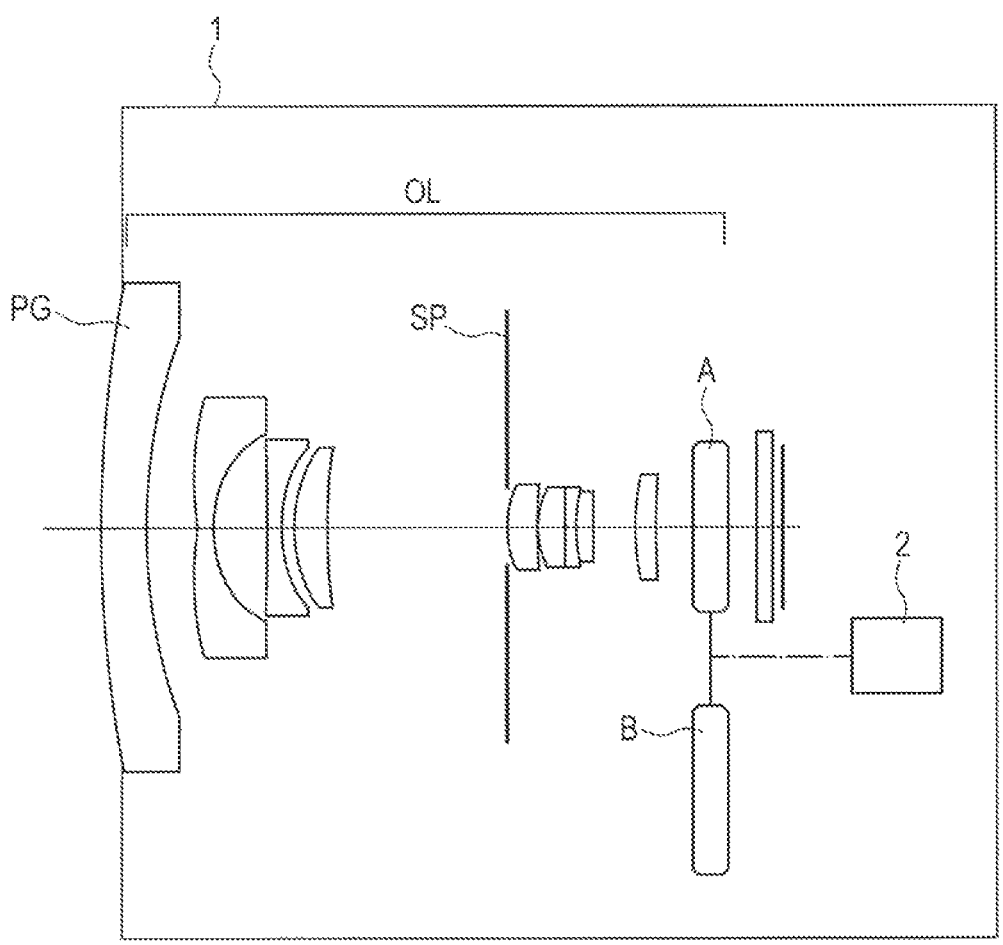
FIG. 1 is a schematic view of a main part of Example 1 of an image pickup apparatus according to the present invention.
Figure 2:
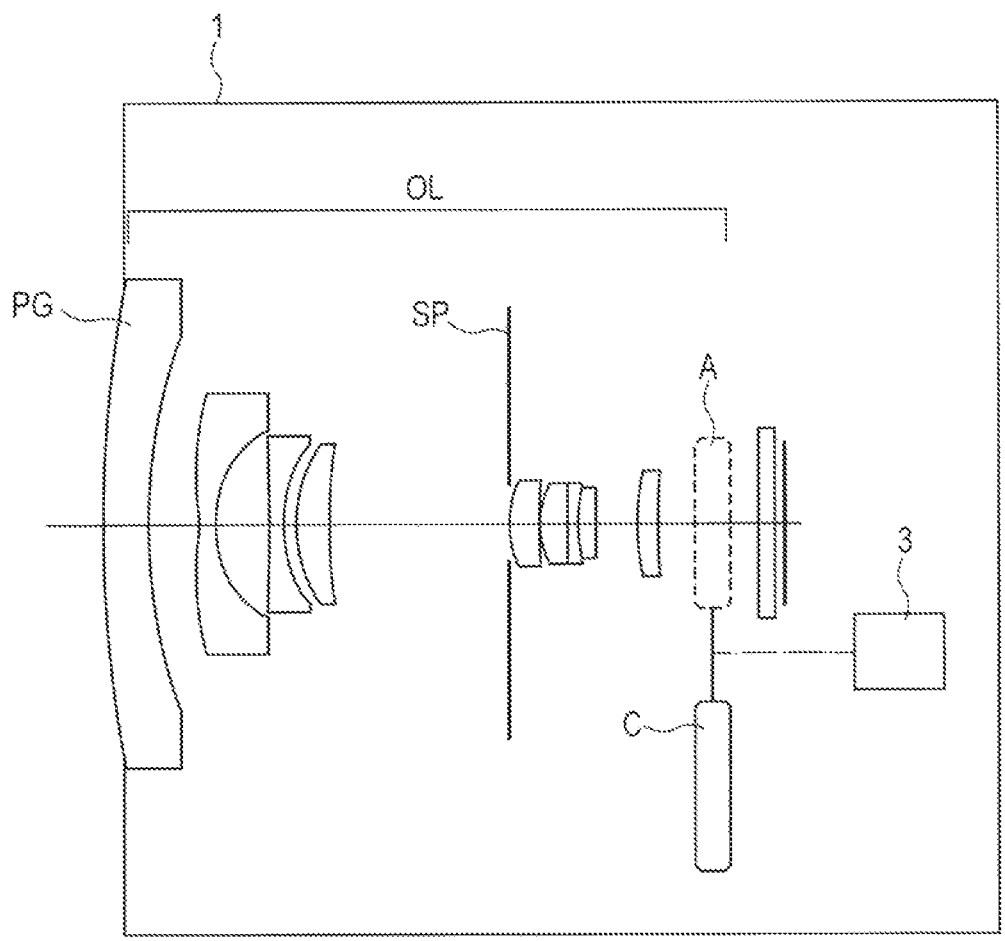
FIG. 2 is a schematic view of a main part of Example 2 of the image pickup apparatus according to the present invention.
Figure 12A:
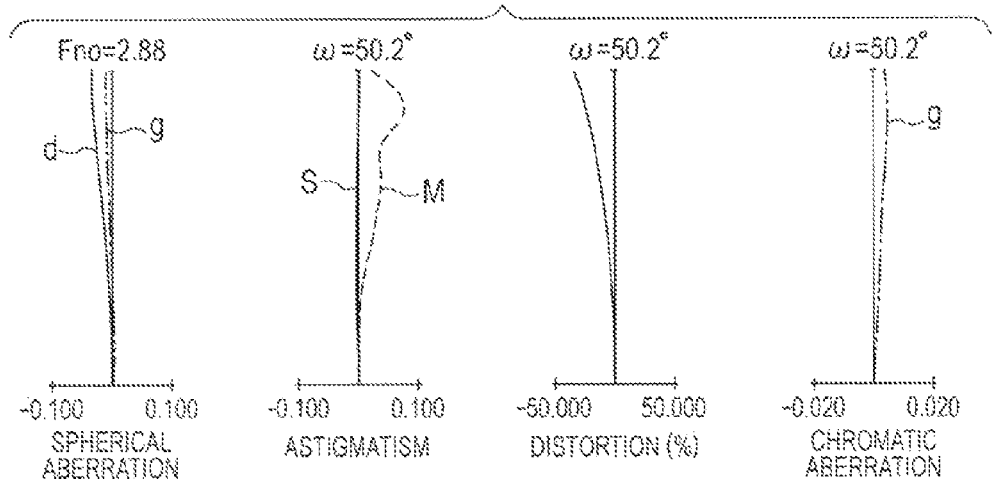
FIG. 12A is a longitudinal aberration diagram of the image pickup optical system according to Example 3 of the present invention in the image pickup state B at the wide angle end.
Figure 12B:
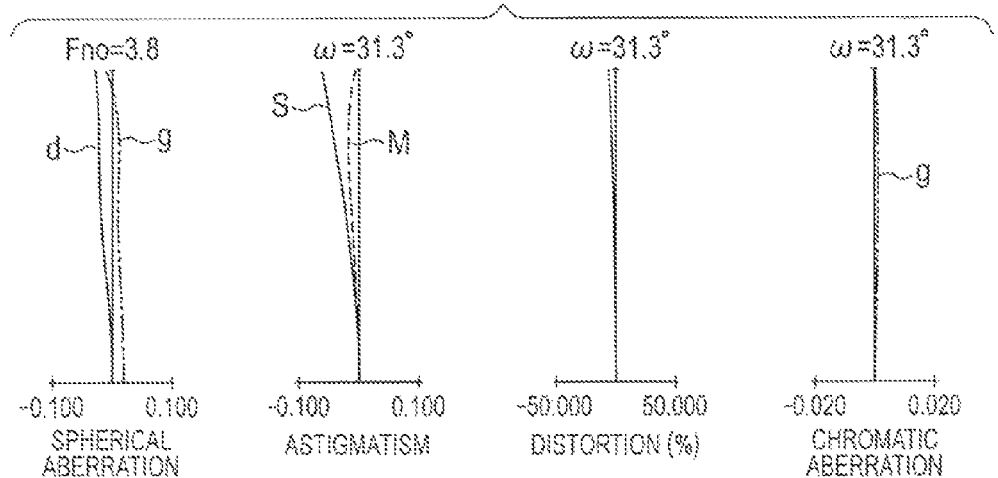
FIG. 12B is a longitudinal aberration diagram of the image pickup optical system according to Example 3 of the present invention in the image pickup state B at the intermediate zoom position.
Figure 12C:
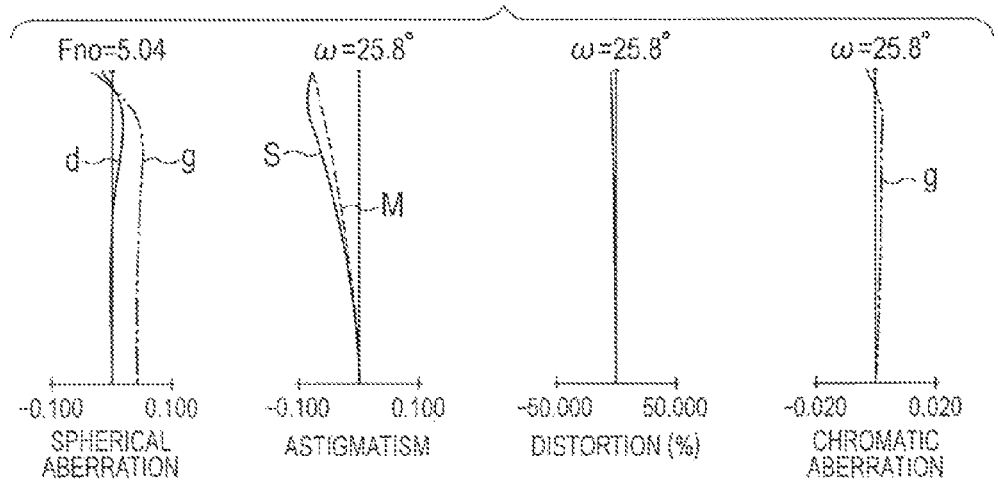
FIG. 12C is a longitudinal aberration diagram of the image pickup optical system according to Example 3 of the present invention in the image pickup state B at the telephoto end.

FIG. 1 is a schematic view of a main part of Example 1 of the image pickup apparatus according to the present invention. FIG. 2 is a schematic view of a main part of Example 2 of the image pickup apparatus according to the present invention. FIG. 3A, FIG. 3B, FIG. 3C, FIG. 5A, FIG. 5B, and FIG. 5C are lens cross-sectional views of an image pickup optical system according to Example 1 of the present invention, and FIG. 4A, FIG. 4B, FIG. 4C, FIG. 6A, FIG. 6B, and FIG. 6C are aberration diagrams of the image pickup optical system according to Example 1. FIG. 7A, FIG. 7B, FIG. 7C, FIG. 8A, FIG. 8B, and FIG. 8C are lens cross-sectional views of an image pickup optical system according to Example 2 of the present invention, and FIG. 9A, FIG. 9B, and FIG. 9C are aberration diagrams of the image pickup optical system according to Example 2. FIG. 10A, FIG. 10B, FIG. 10C, FIG. 11A, FIG. 11B, and FIG. 11C are lens cross-sectional views of an image pickup optical system according to Example 3 of the present invention, and FIG. 12A, FIG. 12B, and FIG. 12C are aberration diagrams of the image pickup optical system according to Example 3. FIG. 13A, FIG. 13B, FIG. 13C, FIG. 15A, FIG. 15B, and FIG. 15C are lens cross-sectional views of an image pickup optical system according to Example 4 of the present invention, and FIG. 14A, FIG. 14B, FIG. 14C, FIG. 16A, FIG. 16B, and FIG. 16C are aberration diagrams of the image pickup optical system according to Example 4.

Figure 25:
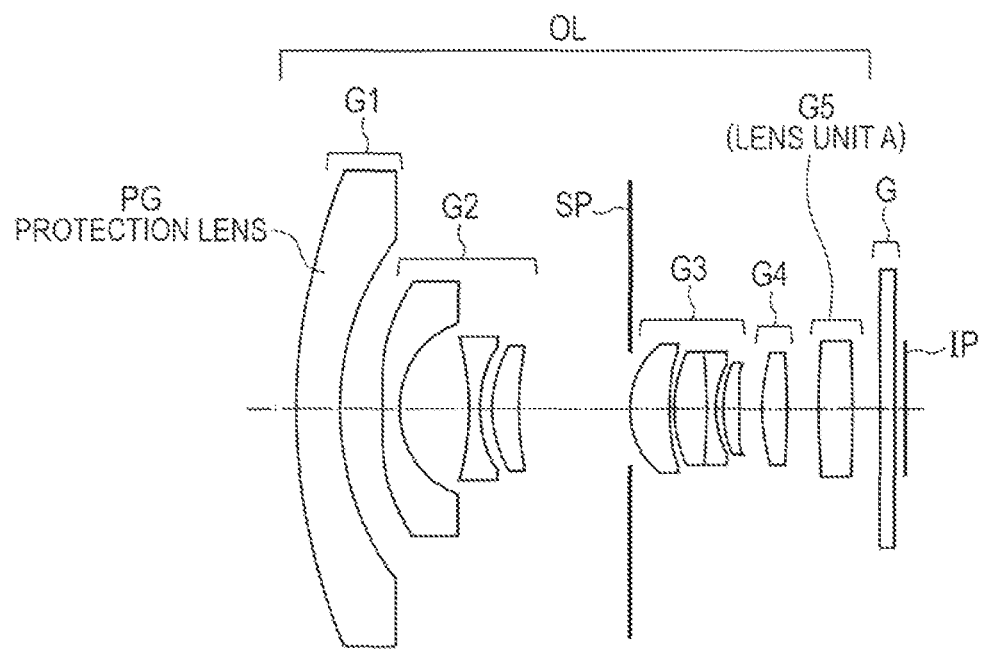
FIG. 25 is a lens cross-sectional view of an image pickup optical system according to Example 7 of the present invention in the image pickup state A.
Figure 26:
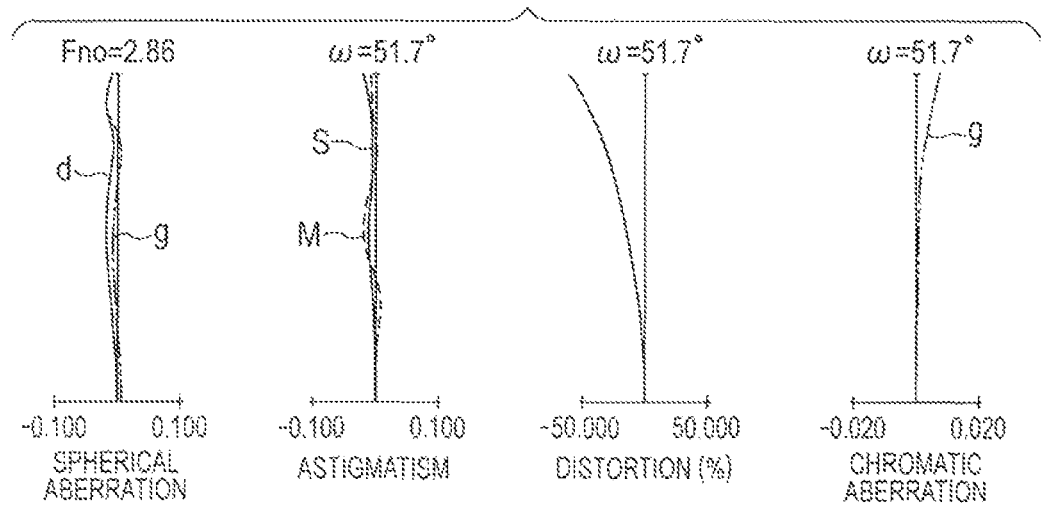
FIG. 26 is an aberration diagram of the image pickup optical system according to Example 7 of the present invention in the image pickup state A.
Figure 27:
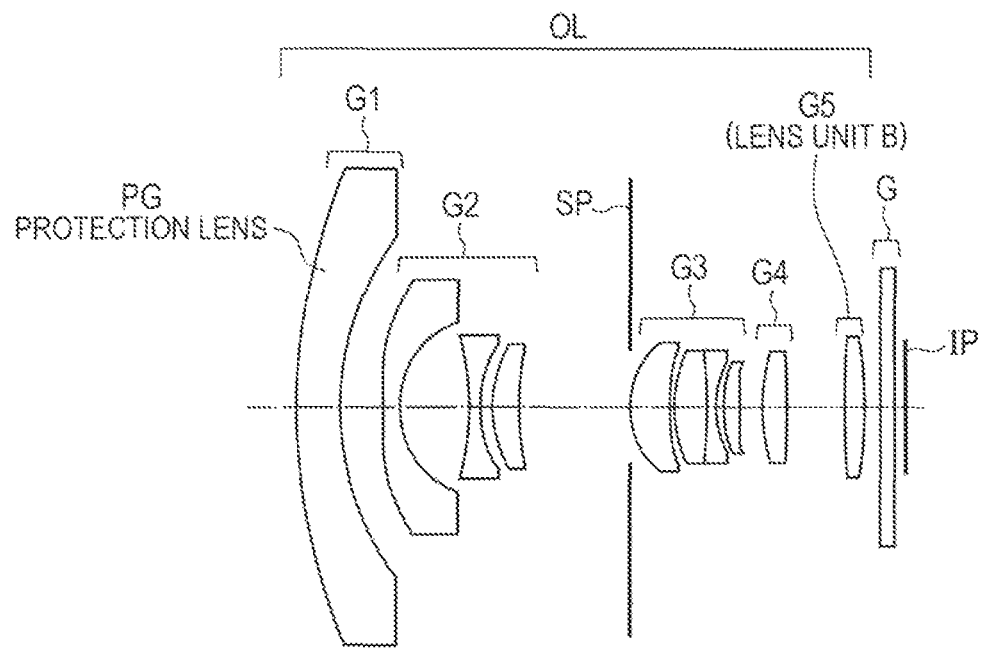
FIG. 27 is a lens cross-sectional view of the image pickup optical system according to Example 7 of the present invention in the image pickup state B.
Figure 28:
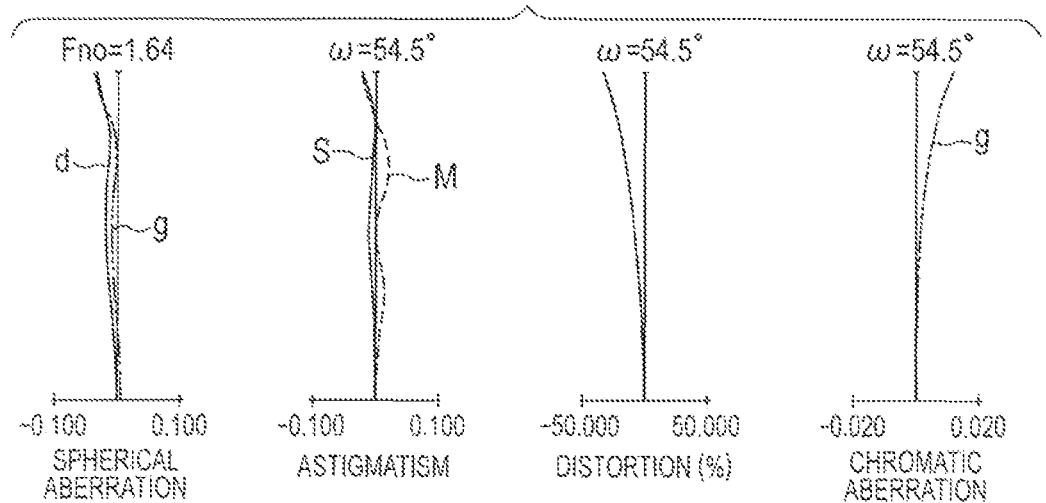
FIG. 28 is an aberration diagram of the image pickup optical system according to Example 7 of the present invention in the image pickup state B.
Figure 29:
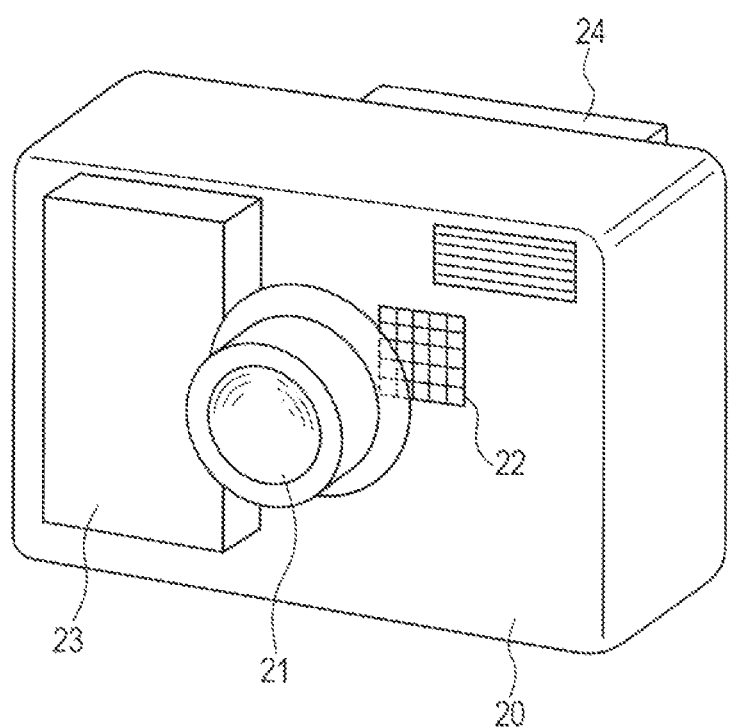
FIG. 29 is a schematic view of a main part of the image pickup apparatus according to the present invention.

FIG. 17A, FIG. 17B, FIG. 17C, FIG. 19A, FIG. 19B, and FIG. 19C are lens cross-sectional views of an image pickup optical system according to Example 5 of the present invention, and FIG. 18A, FIG. 18B, FIG. 18C, FIG. 20A, FIG. 20B, and FIG. 20C are aberration diagrams of the image pickup optical system according to Example 5. FIG. 21A, FIG. 21B, FIG. 21C, FIG. 23A, FIG. 23B, and FIG. 23C are lens cross-sectional views of an image pickup optical system according to Example 6 of the present invention, and FIG. 22A, FIG. 22B, FIG. 22C, FIG. 24A, FIG. 24B, and FIG. 24C are aberration diagrams of the image pickup optical system according to Example 6. FIG. 25 and FIG. 27 are lens cross-sectional views of an image pickup optical system according to Example 7 of the present invention, and FIG. 26 and FIG. 28 are aberration diagrams of the image pickup optical system according to Example 7. FIG. 29 is a schematic view of a main part of the image pickup apparatus according to the present invention.

In Example 1 of the image pickup apparatus in FIG. 1, a housing 1 is configured to house an image pickup optical system OL including a protection lens, which is arranged closest to a light incident side and has a convex-shaped surface on the light incident side. A protection lens PG is fixed and held by the housing 1. The housing 1 is configured to separate (hermetically seal) a medium outside the housing 1 and a medium inside the housing 1. For example, when the image pickup apparatus is placed in water, water is kept from entering the housing 1 from the outside.

The image pickup optical system OL includes an aperture stop SP, and an optical system A and an optical system B, which are arranged on an image side of the aperture stop SP to be selectively placed in an optical path of the image pickup optical system OL. The image pickup optical system OL is formed of a zoom lens or an optical system having a fixed focal length. The optical system A and the optical system B have mutually different optical characteristics. A switching unit 2 is configured to selectively place any one of the optical system A and the optical system B in the optical path of the image pickup optical system OL depending on the medium outside the housing 1.

Example 2 of the image pickup apparatus in FIG. 2 is different from Example 1 in FIG. 1 in that one optical system C is used instead of the optical system A and the optical system B, which are placed in the optical path, and in that an insertion/removal unit 3 is used instead of the switching unit 2, and the other components are the same. More specifically, the image pickup optical system OL includes an aperture stop SP, and the optical system C, which is arranged on an image side of the aperture stop SP to be removably insertable into the optical path of the image pickup optical system OL. The insertion/removal unit 3 is configured to insert or remove the optical system C into or from the optical path of the image pickup optical system OL depending on the medium outside the housing 1.

Next, Examples of the image pickup optical system OL used in the image pickup apparatus according to the present invention are described. The image pickup optical system OL according to the present invention includes the protection lens PG, which is located closest to an object side and in which a surface on the object side separates the inside of the image pickup optical system OL from a surrounding medium. With this configuration, when the surrounding medium is a liquid such as water, the medium is prevented from entering the image pickup optical system OL. Moreover, the surface on the object side of the protection lens PG of the image pickup optical system OL according to the present invention has a shape having a convex surface facing toward the object side.

With the above-mentioned configuration, even in a case where the surrounding medium has a refractive index of larger than 1.0 as with water, a wide image pickup field angle is easily secured. The image pickup optical system OL according to the present invention also includes the optical system A and the optical system B, which are located on the image side of the aperture stop SP to be switchable in the optical path depending on the image pickup state. Moreover, the image pickup optical system OL is configured to photograph in the image pickup state A, in which the optical system A is placed in the optical path, in the case where the surrounding medium is air, and to photograph in the image pickup state B, in which the optical system B is placed in the optical path, in the case where the surrounding medium has the refractive index of larger than 1.0.

With the above-mentioned configuration, in both image pickup states of the case where the surrounding medium is air and the case where the surrounding medium has the refractive index of larger than 1.0 as with water, the image pickup optical system OL attains good optical characteristics. In particular, the optical system A and the optical system B are arranged on the image side of the aperture stop SP to downsize the entire image pickup optical system while effectively correcting field curvature and lateral chromatic aberration. Note that, as illustrated in FIG. 2, the optical system A to be exchanged with the optical system B may be treated as an optical system having no refractive power or a state in which there is no lens, that is, a virtual air lens.

Moreover, in the image pickup optical system in each of Examples, the protection lens PG is positionally fixed with respect to an image forming surface. With this configuration, the entry of the medium such as water into the image pickup optical system OL is effectively prevented. First, a configuration in which the image pickup optical system OL used in the image pickup apparatus according to the present invention includes the optical system A and the optical system B, which are illustrated in Example 1 in FIG. 1, is described.

Each of the optical system A and the optical system B consists of at most two lenses. A focal length of the optical system A is represented by fA, a focal length of the optical system B is represented by fB, a curvature radius of a lens surface on the light incident side of the protection lens PG is represented by G1R1, and a total lens length of the image pickup optical system OL is represented by L. Here, the total lens length L is a total lens length at a wide angle end when the image pickup optical system OL is a zoom lens.

A distance from a vertex of a lens surface closest to the light incident side of the optical system A to an image plane when the optical system A is placed in the optical path of the image pickup optical system OL is represented by KA. A distance from a vertex of a lens surface closest to the light incident side of the optical system B to the image plane when the optical system B is placed in the optical path of the image pickup optical system is represented by KB. Each of the distance KA and the distance KB is a distance at the wide angle end when the image pickup optical system OL is a zoom lens. The optical system B includes at least one positive lens, and an Abbe number of a material of a positive lens Bp having the highest refractive power in the optical system B is represented by vdB.

A focal length of an entire system of the image pickup optical system when the optical system A is placed in the optical path of the image pickup optical system OL is represented by fWA, and a focal length of the entire system when the optical system B is placed in the optical path of the image pickup optical system is represented by fWB. Note that, the focal lengths fWA and fWB of the entire system are focal lengths of the entire system at the wide angle end when the image pickup optical system OL is a zoom lens. When a refractive index of the medium outside the housing 1 with respect to a d-line is represented by nd, and when the medium outside the housing 1 is a medium that satisfies the following conditional expression:

$$1.10 < nd < 1.50 \quad (1),$$

the switching unit places the optical system B in the optical path of the image pickup optical system OL.

The optical system A includes at least one positive lens, the optical system B includes at least one positive lens, and an Abbe number of a material of a positive lens Ap having the highest refractive power of the at least one positive lens included in the optical system A is represented by vdA. The Abbe number of the material of the positive lens Bp having the highest refractive power of the at least one positive lens included in the optical system B is represented by vdB. A refractive index of the material of the positive lens Ap with respect to the d-line is represented by ndGA. A refractive index of the material of the positive lens Bp with respect to the d-line is represented by ndGB.

At this time, it is preferred to satisfy at least one of the following conditional expressions.

$$0.04 < (fA - fB) \times G1R1 / (fA \times fB) < 1.80 \quad (2)$$

$$0.50 < G1R1/L < 3.00 \quad (3)$$

$$0.02 < KA/L < 0.60 \quad (4A)$$

$$0.02 < KB/L < 0.60 \quad (4B)$$

$$10.0 < vdB < 62.0 \quad (5)$$

$$0.80 < fWB/fWA < 1.02 \quad (6)$$

$$1.00 \leq vdA/vdB \leq 5.00 \quad (7)$$

$$1.00 \leq ndGB/ndGA < 1.60 \quad (8)$$

Next, a configuration in which, as the image pickup optical system OL used in the image pickup apparatus according to the present invention, the image pickup optical system OL illustrated in Example 2 in FIG. 2 includes only the optical system C instead of the optical system A and the optical system B is described. The optical system C consists of at most two lenses. A focal length of the optical system C is represented by fC, a curvature radius of a lens surface on the light incident side of the protection lens PG is represented by G1R1, and a total lens length of the image pickup optical system OL is represented by L. A distance from a vertex of a lens surface closest to the light incident side of the optical system C to the image plane when the optical system C is placed in the optical path of the image pickup optical system OL is represented by KC, and the total lens length of the image pickup optical system OL is represented by L.

The optical system C includes at least one positive lens, and an Abbe number of a material of a positive lens Cp having the highest refractive power in the optical system C is represented by vdC. A focal length of the entire system when the optical system C is placed in the optical path of the image pickup optical system OL is represented by fWC1, and a focal length of the entire system when the optical system C is not placed in the optical path of the image pickup optical system OL is represented by fWC2.

When a refractive index of the medium outside the housing 1 with respect to the d-line is represented by nd, and the medium outside the housing 1 is a medium that satisfies the following conditional expression:

$$1.10 < nd < 1.50 \quad (1X),$$

the insertion/removal unit 3 inserts the optical system C into the optical path of the image pickup optical system OL. Note that, the parameters, the total lens length, the distance KC, the focal length fWC1, and the focal length fWC2 are values at the wide angle end when the image pickup optical system OL is a zoom lens.

At this time, it is preferred to satisfy at least one of the following conditional expressions.

$$0.04 < (1/fC) \times G1R1 < 1.80 \quad (2X)$$

$$0.50 < G1R1/L < 3.00 \quad (3X)$$

$$0.02 < KC/L < 0.60 \quad (4BX)$$

$$10.0 < vdC < 62.0 \quad (5X)$$

$$0.80 < fWC1/fWC2 < 1.02 \quad (6X)$$

Here, the conditional expression (1) corresponds to the conditional expression (1X). The conditional expression (2) corresponds to the conditional expression (2X). The conditional expression (3) corresponds to the conditional expression (3X). The conditional expressions (4A) and (4B) correspond to the conditional expression (4BX). The conditional expression (5) corresponds to the conditional expression (5X). The conditional expression (6) corresponds to the conditional expression (6X). Technical meanings of the corresponding expressions are the same. In other words, in Example 2 in FIG. 2, the optical system B according to Example 1 in FIG. 1 corresponds to the optical system C, and the optical system A corresponds to the air lens.

In the conditional expression (2X), the focal length fA in the conditional expression (2) corresponds to infinity. In the conditional expression (4BX), KA in the conditional expression (4A) corresponds to 0, and KB in the conditional expression (4B) corresponds to KC. In the conditional expression (5X), vdB in the conditional expression (5) corresponds to vdC. In the conditional expression (6X), fWB in the conditional expression (6) corresponds to fWC1, and fWA in the conditional expression (6) corresponds to fWC2.

Next, the technical meanings of the above-mentioned conditional expressions are described. Note that, in the following description, in the image pickup apparatus illustrated in FIG. 2, the air lens (virtual lens) may be treated as corresponding to the optical system A, and the optical system C may be treated as corresponding to the optical system B. The image pickup state A refers to when the optical system A is placed in the optical path in the image pickup apparatus illustrated in FIG. 1, and to an image pickup state in which the optical system C is not placed in the image pickup apparatus illustrated in FIG. 2. On the other hand, the image pickup state B refers to when the optical system B is placed in the optical path in the image pickup apparatus illustrated in FIG. 1, and to when the optical system C is placed in the optical path in the image pickup apparatus illustrated in FIG. 2.

The conditional expression (2) defines a product between a difference between refractive powers of the optical system B and the optical system A and the curvature radius G1R1 of the surface on the object side of the protection lens PG. When the product exceeds the upper limit of the conditional expression (2), and hence the difference between the refractive powers of the optical system B and the optical system A becomes too large, it becomes difficult to reduce Petzval sums in the image pickup state A and the image pickup state B, and hence it becomes difficult to correct the field curvature. In addition, the curvature radius G1R1 of the surface of the protection lens PG becomes too large, and it becomes difficult to obtain the wide image pickup field angle in the image pickup state B.

When the product falls below the lower limit value of the conditional expression (2), and hence the difference between the refractive powers of the optical system B and the optical system A becomes too small, it becomes difficult to reduce the Petzval sums in the image pickup state A and the image pickup state B, and hence it becomes difficult to correct the field curvature. In addition, the curvature radius G1R1 of the surface of the protection lens PG becomes too small, and it becomes difficult to correct higher-order components of the field curvature in the image pickup state B. In the case where the optical system A is an air lens, a value of the focal length fA becomes infinite. Note that, in the conditional expression (2), it is more preferred to set the numerical value range as follows in terms of the configuration.

$$0.05 < (fA - fB) \times G1R1 / (fA \times fB) < 1.75 \quad (2a)$$

It is further preferred to set the numerical value range of the conditional expression (2a) as follows.

$$0.06 < (fA - fB) \times G1R1 / (fA \times fB) < 1.70 \quad (2b)$$

The conditional expression (3) defines a ratio between the curvature radius G1R1 of the surface on the object side of the protection lens PG and the total lens length L of the image pickup optical system OL. Here, the "total lens length" is a value obtained by adding a back focus to a distance from the first lens surface to the last lens surface. The back focus is an air-equivalent distance from the last lens surface to the image plane. When the ratio exceeds the upper limit value of the conditional expression (3), and hence the curvature radius G1R1 of the surface on the object side becomes too long, it becomes difficult to secure the wide image pickup field angle in the image pickup state B, in particular. In addition, when the total lens length L becomes too short, the refractive powers of the optical systems (lens portions) become too high, and it becomes difficult to correct various aberrations such as spherical aberration.

When the ratio falls below the lower limit value of the conditional expression (3), and hence the curvature radius G1R1 of the surface on the object side becomes too short, it becomes difficult to correct aberrations of the higher-order components such as the field curvature in the image pickup state B, in particular. In addition, when the total lens length L becomes too long, the entire image pickup optical system OL becomes large in size.

The conditional expression (4) defines a ratio between a distance K from the vertex of the lens surface closest to the object side of each of the optical system A and the optical system B to the image plane and the total lens length L of the image pickup optical system OL. Here, when the optical system A is an air lens, only the optical system B becomes the subject. When the ratio exceeds the upper limit value of the conditional expression (4), and hence the distance K becomes too long, a position of each of the optical system A and the optical system B becomes too close to a position of the aperture stop SP, and hence it becomes difficult to correct the field curvature, the lateral chromatic aberration, and the like, in particular. When the ratio falls below the lower limit value of the conditional expression (4), and hence the distance K becomes too short, it becomes difficult to secure a predetermined amount of the back focus.

The conditional expression (5) defines a range of the Abbe number vdB of the material of the positive lens Bp having the highest refractive power of the lenses included in the optical system B. When vdB exceeds the upper limit value of the conditional expression (5), the lateral chromatic aberration becomes undercorrected in the image pickup state B. When vdB falls below the lower limit value of the conditional expression (5), the lateral chromatic aberration becomes overcorrected in the image pickup state B.

The conditional expression (6) defines a ratio between the focal length fWA of the entire image pickup optical system OL at the wide angle end in the image pickup state A and the focal length fWB of the entire image pickup optical system OL at the wide angle end in the image pickup state B. When the ratio exceeds the upper limit value of the conditional expression (6), it becomes difficult to secure a wide field angle in the image pickup state B. The focal lengths fWA and fWB are values of focal lengths in the image pickup state A and the image pickup state B when the image pickup optical system OL has a fixed focal length. When the ratio falls below the lower limit value of the conditional expression (6), it becomes difficult to correct the aberrations of, in particular, the higher-order components such as the field curvature in the image pickup state B.

The conditional expression (1) defines a range of the refractive index of the surrounding medium of the image pickup optical system OL with respect to the d-line in the case where the photography is performed in the image pickup state B. The image pickup optical system according to the present invention has a preferred configuration in the case where the refractive index of the surrounding medium of the image pickup optical system OL in the image pickup state B is about 1.333, such as water, in particular. When nd exceeds the upper limit value of the conditional expression (1), and hence a difference in refractive index from water becomes too large in a positive direction, it becomes difficult to correct the field curvature and the like in the image pickup state B. When nd falls below the lower limit value of the conditional expression (1), and hence the difference in refractive index from water becomes too large in a negative direction, it becomes difficult to correct the field curvature in the image pickup state B.

Note that, in each of Examples, it is more preferred to set the numerical value ranges of the conditional expressions (1) and (3) to (6) as follows in terms of the configuration.

$$1.12 < ndB < 1.48 \quad (1a)$$

$$0.55 < G1R1/L < 2.95 \quad (3a)$$

$$0.03 < KA/L < 0.58 \quad (4Aa)$$

$$0.03 < KB/L < 0.58 \quad (4Ba)$$

$$10.5 < vdB < 61.0 \quad (5a)$$

$$0.81 < fWB/fWA < 1.01 \quad (6a)$$

It is further preferred to set the numerical value ranges of the conditional expressions (1a), (3a), (4Aa), (4Ba), (5a) and (6a) as follows.

$$1.14 < ndB < 1.46 \quad (1b)$$

$$0.60 < G1R1/L < 2.90 \quad (3b)$$

$$0.04 < KA/L < 0.56 \quad (4Ab)$$

$$0.04 < KB/L < 0.56 \quad (4Bb)$$

$$11.0 < vdB < 60.0 \quad (5b)$$

$$0.82 < fWB/fWA < 1.00 \quad (6b)$$

The conditional expression (7) defines a ratio of the Abbe number vdA to the Abbe number vdB. When the ratio exceeds the upper limit of the conditional expression (7), the lateral chromatic aberration becomes overcorrected in the image pickup state B, which is not preferred. When the ratio falls below the lower limit of the conditional expression (7), the lateral chromatic aberration becomes undercorrected in the image pickup state B, which is not preferred.

The conditional expression (8) defines a ratio of the refractive index ndGB to the refractive index ndGA. When the ratio exceeds the upper limit of the conditional expression (8), the Petzval sum becomes undercorrected in the image pickup state B, and it becomes difficult to correct the field curvature, which is not preferred. When the ratio falls below the lower limit of the conditional expression (8), the Petzval sum becomes overcorrected in the image pickup state B, and it becomes difficult to correct the field curvature, which is not preferred.

It is further preferred to set the numerical value ranges of the conditional expressions (7) and (8) as follows.

$$1.05 < vdA/vdB < 4.90 \quad (7a)$$

$$1.00 \leq ndGB/ndGA < 1.55 \quad (8a)$$

It is still further preferred to set the numerical value ranges of the conditional expressions (7a) and (8a).

$$1.10 < vdA/vdB < 4.85 \quad (7b)$$

$$1.00 \geq ndGB/ndGA < 1.50 \quad (8b)$$

Now, Examples 1 to 7 of the image pickup optical system according to the present invention are described.

Example 1

(Image Pickup State A)

Figure 4A:
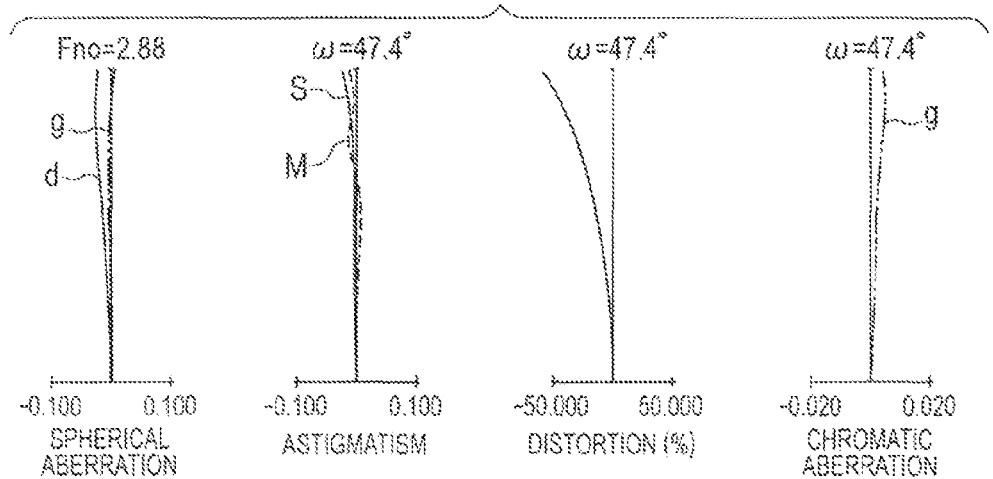
FIG. 4A is a longitudinal aberration diagram of the image pickup optical system according to Example 1 of the present invention in the image pickup state A at the wide angle end.
Figure 4B:
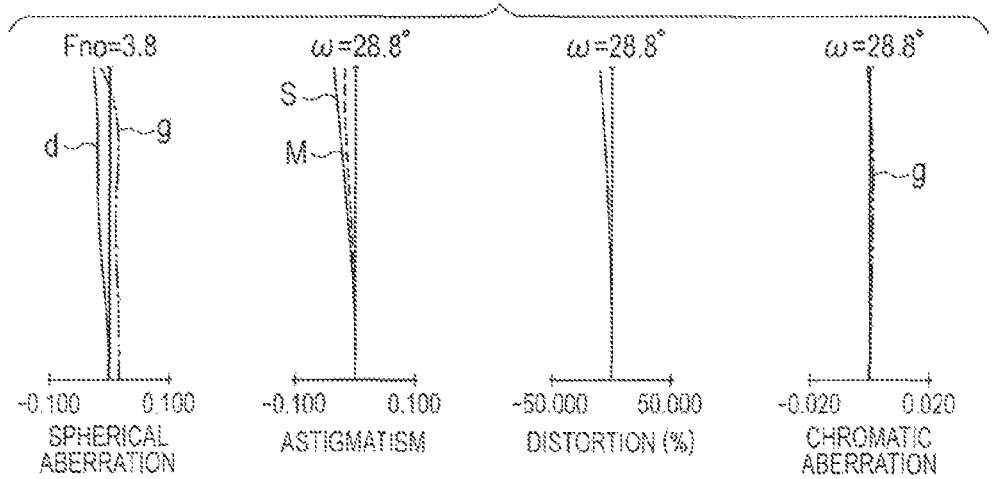
FIG. 4B is a longitudinal aberration diagram of the image pickup optical system according to Example 1 of the present invention in the image pickup state A at the intermediate zoom position.
Figure 4C:
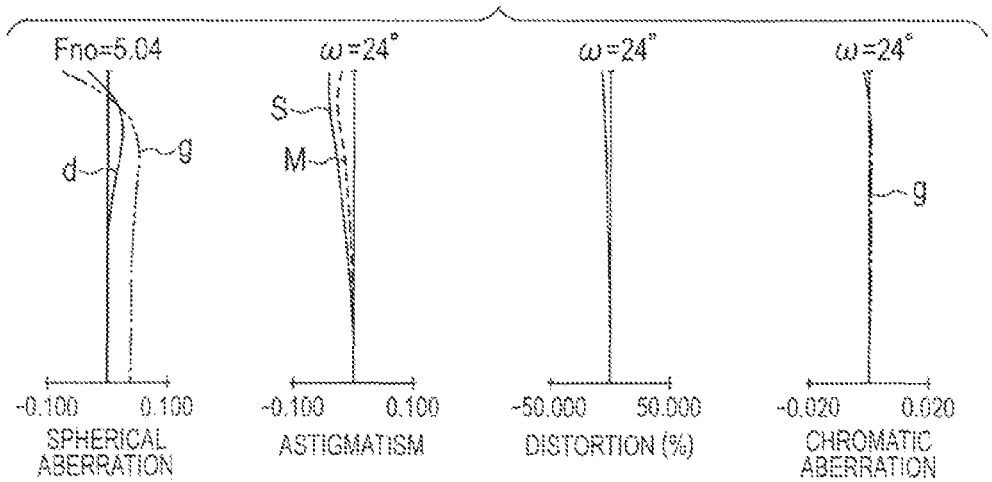
FIG. 4C is a longitudinal aberration diagram of the image pickup optical system according to Example 1 of the present invention in the image pickup state A at the telephoto end.

FIG. 3A, FIG. 3B, and FIG. 3C are lens cross-sectional views of the image pickup optical system according to Example 1 of the present invention in the image pickup state A at a wide angle end (short focal length), an intermediate zoom position, and a telephoto end (long focal length), respectively. FIG. 4A, FIG. 4B, and FIG. 4C are longitudinal aberration diagrams of the image pickup optical system according to Example 1 (image pickup state A) at the wide angle end, the intermediate zoom position, and the telephoto end, respectively. Example 1 (image pickup state A) relates to a zoom lens having a zoom ratio of 2.94, and an aperture ratio (Fnumber) of from about 2.88 to about 5.04.

In the lens cross-sectional views of FIG. 3A, FIG. 3B, and FIG. 3C, a first lens unit L1 having a negative refractive power and including a protection lens PG, a second lens unit L2 having a negative refractive power, a third lens unit L3 having a positive refractive power, a fourth lens unit L4 having a positive refractive power, and a fifth lens unit L5 having a positive refractive power are illustrated. The optical system A is the fifth lens unit.

An F number determination member (hereinafter referred to also as "aperture stop") SP has a function of aperture stop for determining (limiting) a maximum F number (Fno) light flux. An optical block G corresponds to an optical filter, a face plate, a quartz low-pass filter, an infrared cut filter, or the like. As an image plane IP, an image pickup plane of a solid-state image pickup element (photo-electric conversion element) such as a CCD sensor or a CMOS sensor is arranged when the image pickup optical system is used as an image pickup optical system for use in a video camera, a digital still camera, or the like. Alternatively, a photosensitive surface corresponding to a film surface is arranged when the image pickup optical system is used as an image pickup optical system of a silver halide film camera.

In the zoom lens in FIG. 3A, FIG. 3B, and FIG. 3C, the second lens unit L2, the third lens unit L3, and the fourth lens unit L4 are configured to move so that an interval between each pair of adjacent lens units is changed during zooming. A change in interval between each pair of adjacent lens units during zooming from the wide angle end to the telephoto end is as follows. At the telephoto end as compared to the wide angle end, an interval between the first lens unit L1 and the second lens unit L2 is reduced, an interval between the second lens unit L2 and the third lens unit L3 is reduced, an interval between the third lens unit L3 and the fourth lens unit L4 is increased, and an interval between the fourth lens unit L4 and the fifth lens unit L5 is increased.

Note that, the first lens unit L1 and the fifth lens unit L5 are configured not to move during zooming. Moreover, the aperture stop SP is configured to move integrally with (along the same locus as that of) the third lens unit L3 during zooming.

At the telephoto end as compared to the wide angle end, all of the second lens unit L2, the third lens unit L3, and the fourth lens unit L4 are positioned on the object side. Moreover, the second lens unit L2 is configured to move along a locus that is convex toward the image side during zooming. The lens units are configured to move appropriately as described above during zooming to realize the downsizing of the entire system and a high zoom ratio. Note that, in the image pickup state A, the surrounding medium of the image pickup optical system OL is air having a refractive index of 1.000 with respect to the d-line.

(Image Pickup State B)

FIG. 5A, FIG. 5B, and FIG. 5C are lens cross-sectional views of the image pickup optical system according to Example 1 of the present invention in the image pickup state B at a wide angle end, an intermediate zoom position, and a telephoto end, respectively.

In Example 1, the fifth lens unit L5 in FIG. 3A, FIG. 3B, and FIG. 3C is configured to serve as the optical system A. In FIG. 5A, FIG. 5B, and FIG. 5C, the fifth lens unit L5 having the positive refractive power is illustrated as the optical system B. The optical system A and the optical system B have mutually different lens configurations. As compared to the image pickup optical system according to Example 1 (image pickup state A), the fifth lens unit L5 having the positive refractive power (optical system A) is switched to the fifth lens unit L5 having the positive refractive power (optical system B). The image pickup state B is different from the image pickup state A only in a movement locus of the fourth lens unit L4 during zooming.

FIG. 6A, FIG. 6B, and FIG. 6C are longitudinal aberration diagrams of the image pickup optical system according to Example 1 (image pickup state B) at the wide angle end, the intermediate zoom position, and the telephoto end, respectively. Example 1 (image pickup state B) relates to a zoom lens having a zoom ratio of 3.00, and an aperture ratio of from about 2.88 to about 5.04. Note that, in this image pickup state B, the surrounding medium of the image pickup optical system OL is water having a refractive index of 1.333 with respect to the d-line.

Example 2

(Image Pickup State A)

A lens configuration of the image pickup optical system according to Example 2 in the image pickup state A illustrated in FIG. 7A, FIG. 7B, and FIG. 7C is the same as the image pickup state A in Example 1 in FIG. 3A, FIG. 3B, and FIG. 3C. In Example 2, the fourth lens unit L4 in FIG. 3A, FIG. 3B, and FIG. 3C is configured to serve as the optical system A. In FIG. 7A, FIG. 7B, and FIG. 7C, the fourth lens unit L4 having the positive refractive power is illustrated as the optical system A.

(Image Pickup State B)

FIG. 8A, FIG. 8B, and FIG. 8C are lens cross-sectional views of the image pickup optical system according to Example 2 of the present invention in the image pickup state B. As compared to the image pickup optical system according to Example 1 in FIG. 3A, FIG. 3B, and FIG. 3C (image pickup state A), the fourth lens unit L4 having the positive refractive power is switched to the fourth lens unit L4 having the positive refractive power (optical system B). The image pickup state B is different from the image pickup state A only in a movement locus of the fourth lens unit L4 during zooming.

FIG. 9A, FIG. 9B, and FIG. 9C are longitudinal aberration diagrams of the image pickup optical system according to Example 2 (image pickup state B) at a wide angle end, an intermediate zoom position, and a telephoto end, respectively. Example 2 (image pickup state B) relates to a zoom lens having a zoom ratio of 3.01, and an aperture ratio of from about 2.88 to about 5.04.

Note that, in this image pickup state B, the surrounding medium of the image pickup optical system OL is water having the refractive index of 1.333 with respect to the d-line.

Example 3

(Image Pickup State A)

A lens configuration of the image pickup optical system according to Example 3 in the image pickup state A illustrated in FIG. 10A, FIG. 10B, and FIG. 10C is the same as the image pickup state A in Example 1. In Example 3, the fifth lens unit L5 in FIG. 3A, FIG. 3B, and FIG. 3C is configured to serve as the optical system A. In FIG. 10A, FIG. 10B, and FIG. 10C, the fifth lens unit L5 having the positive refractive power is illustrated as the optical system A.

(Image Pickup State B)

FIG. 11A, FIG. 11B, and FIG. 11C are lens cross-sectional views of the image pickup optical system according to Example 3 of the present invention in the image pickup state B. As compared to the image pickup optical system according to Example 1 in FIG. 3A, FIG. 3B, and FIG. 3C (image pickup state A), the fifth lens unit L5 having the positive refractive power (optical system A) is switched to the fifth lens unit L5 having the positive refractive power (optical system B). The image pickup state B is different from the image pickup state A only in a movement locus of the fourth lens unit L4 during zooming.

FIG. 12A, FIG. 12B, and FIG. 12C are longitudinal aberration diagrams of the image pickup optical system according to Example 3 (image pickup state B) at a wide angle end, an intermediate zoom position, and a telephoto end, respectively. Example 3 (image pickup state B) relates to a zoom lens having a zoom ratio of 3.00, and an aperture ratio of from about 2.88 to about 5.04. Note that, in this image pickup state B, the surrounding medium is water having the refractive index of 1.333 with respect to the d-line.

Example 4

(Image Pickup State A)

Figure 14A:
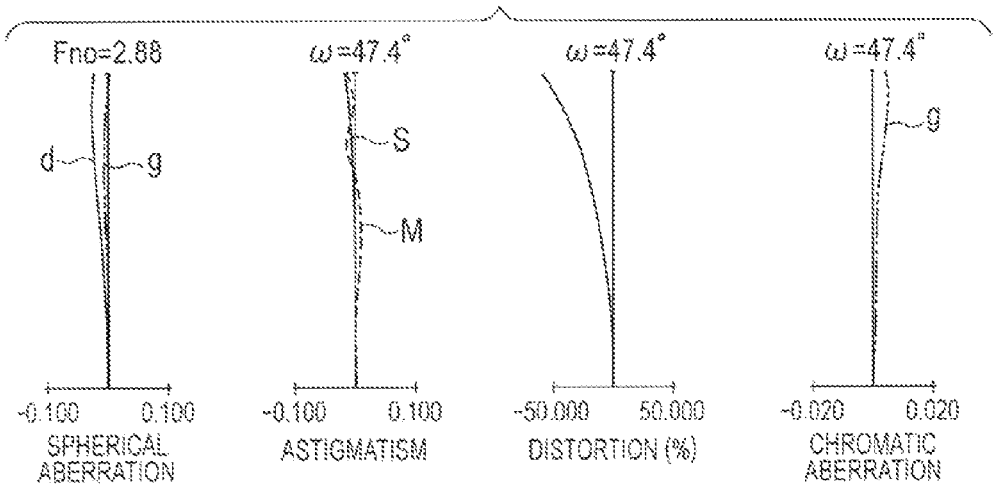
FIG. 14A is a longitudinal aberration diagram of the image pickup optical system according to Example 4 of the present invention in the image pickup state A at the wide angle end.
Figure 14B:
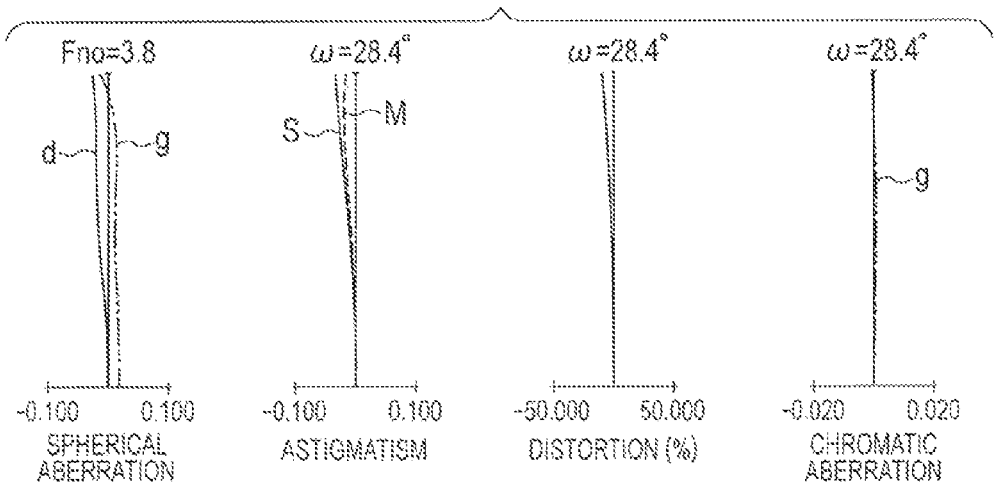
FIG. 14B is a longitudinal aberration diagram of the image pickup optical system according to Example 4 of the present invention in the image pickup state A at the intermediate zoom position.
Figure 14C:
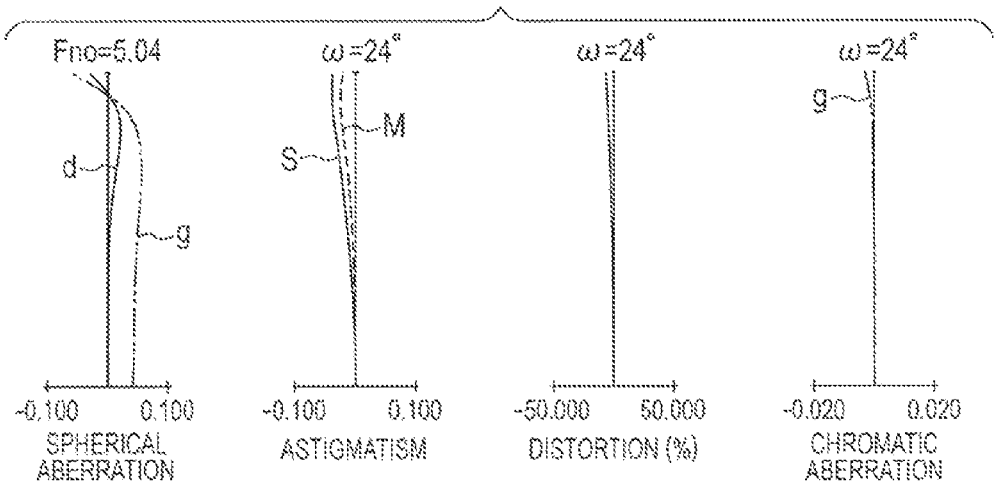
FIG. 14C is a longitudinal aberration diagram of the image pickup optical system according to Example 4 of the present invention in the image pickup state A at the telephoto end.

FIG. 13A, FIG. 13B, and FIG. 13C are lens cross-sectional views of the image pickup optical system according to Example 4 of the present invention in the image pickup state A at a wide angle end, an intermediate zoom position, and a telephoto end, respectively. FIG. 14A, FIG. 14B, and FIG. 14C are longitudinal aberration diagrams of the image pickup optical system according to Example 4 (image pickup state A) at the wide angle end, the intermediate zoom position, and the telephoto end, respectively. Example 4 (image pickup state A) relates to a zoom lens having a zoom ratio of 2.94, and an aperture ratio of from about 2.88 to about 5.04.

In the lens cross-sectional views of FIG. 13A, FIG. 13B, and FIG. 13C, a first lens unit L1 having a negative refractive power and including a protection lens PG, a second lens unit L2 having a negative refractive power, a third lens unit L3 having a positive refractive power, a fourth lens unit L4 having a positive refractive power, and a fifth lens unit L5 having a positive refractive power are illustrated. The optical system A is the fifth lens unit L5.

In the zoom lens in FIG. 13A, FIG. 13B, and FIG. 13C, the second lens unit L2, the third lens unit L3, and the fourth lens unit L4 are configured to move so that an interval between each pair of adjacent lens units is changed during zooming. A change in interval between each pair of adjacent lens units during zooming from the wide angle end to the telephoto end is as follows. At the telephoto end as compared to the wide angle end, an interval between the first lens unit L1 and the second lens unit L2 is reduced, an interval between the second lens unit L2 and the third lens unit L3 is reduced, an interval between the third lens unit L3 and the fourth lens unit L4 is increased, and an interval between the fourth lens unit L4 and the fifth lens unit L5 is increased.

Note that, the first lens unit L1 and the fifth lens unit L5 are configured not to move during zooming. Moreover, the aperture stop SP is configured to move integrally with the third lens unit L3 during zooming.

At the telephoto end as compared to the wide angle end, all of the second lens unit L2, the third lens unit L3, and the fourth lens unit L4 are positioned on the object side. Moreover, the second lens unit L2 is configured to move along a locus that is convex toward the image side during zooming. The lens units are configured to move appropriately as described above during zooming to realize the downsizing of the entire system and a high zoom ratio. Note that, in the image pickup state A, the surrounding medium of the image pickup optical system OL is air having the refractive index of 1.000 with respect to the d-line.

(Image Pickup State B)

FIG. 15A, FIG. 15B, and FIG. 15C are lens cross-sectional views of the image pickup optical system according to Example 4 of the present invention in the image pickup state B at a wide angle end, an intermediate zoom position, and a telephoto end, respectively. In FIG. 15A, FIG. 15B, and FIG. 15C, the fifth lens unit L5 having the positive refractive power is illustrated as the optical system B. As compared to the image pickup optical system according to Example 4 (image pickup state A), the fifth lens unit L5 having the positive refractive power (optical system A) is switched to the fifth lens unit L5 having the positive refractive power (optical system B). The image pickup state B is different from the image pickup state A only in a movement locus of the fourth lens unit L4 during zooming.

Figure 16A:
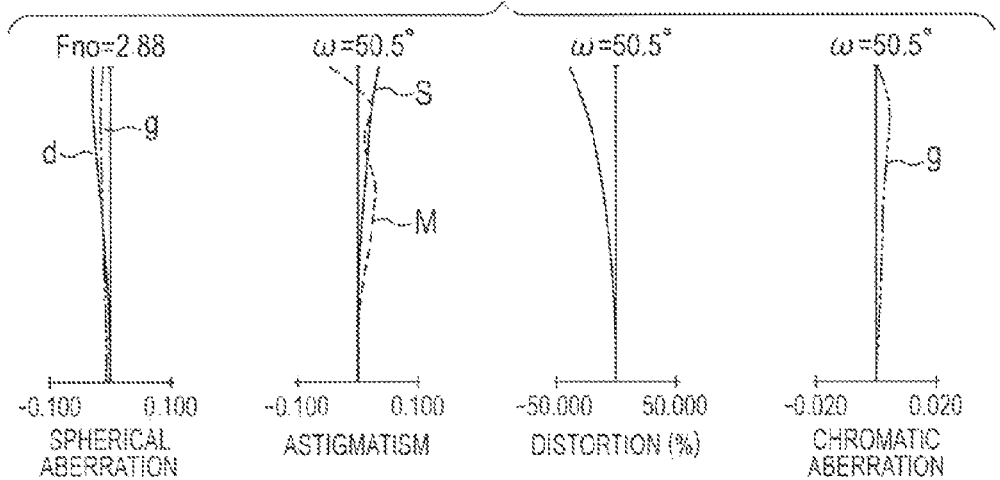
FIG. 16A is a longitudinal aberration diagram of the image pickup optical system according to Example 4 of the present invention in the image pickup state B at the wide angle end.
Figure 16B:
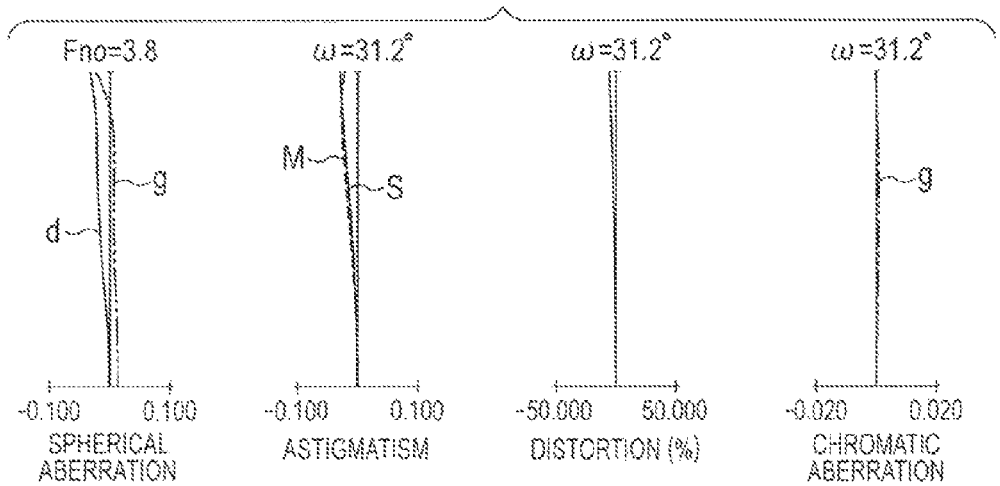
FIG. 16B is a longitudinal aberration diagram of the image pickup optical system according to Example 4 of the present invention in the image pickup state B at the intermediate zoom position.
Figure 16C:
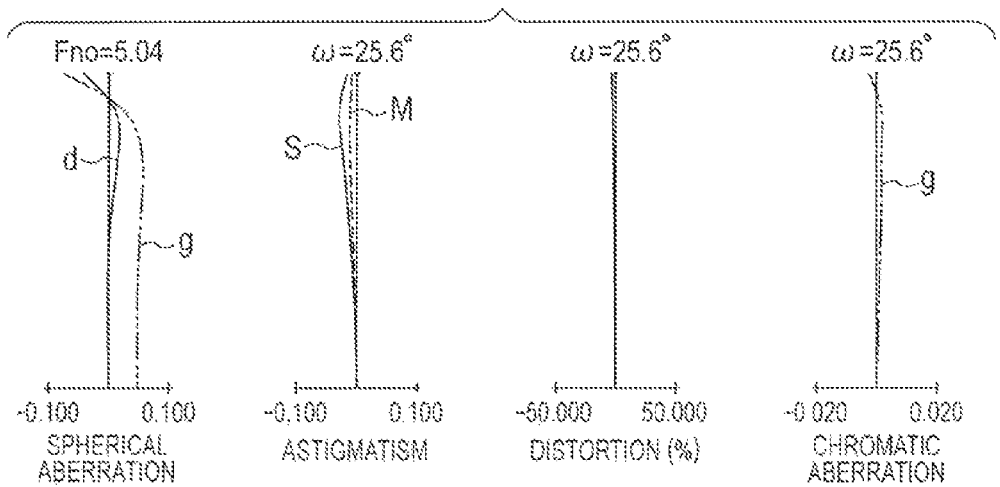
FIG. 16C is a longitudinal aberration diagram of the image pickup optical system according to Example 4 of the present invention in the image pickup state B at the telephoto end.

FIG. 16A, FIG. 16B, and FIG. 16C are longitudinal aberration diagrams of the image pickup optical system according to Example 4 (image pickup state B) at the wide angle end, the intermediate zoom position, and the telephoto end, respectively. Example 4 (image pickup state B) relates to a zoom lens having a zoom ratio of 3.05, and an aperture ratio of from about 2.88 to about 5.04. Note that, in this image pickup state B, the surrounding medium of the image pickup optical system OL is water having the refractive index of 1.333 with respect to the d-line.

Example 5

(Image Pickup State A)

Figure 18A:
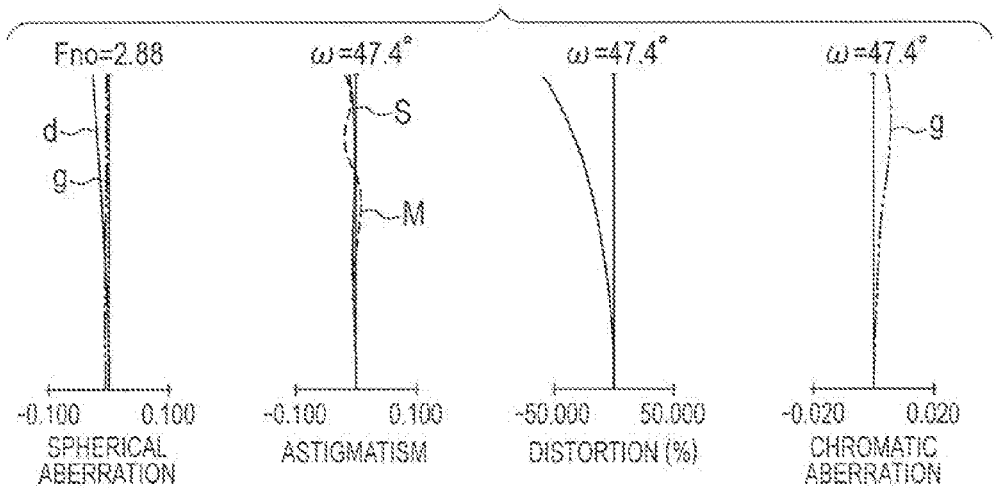
FIG. 18A is a longitudinal aberration diagram of the image pickup optical system according to Example 5 of the present invention in the image pickup state A at the wide angle end.
Figure 18B:
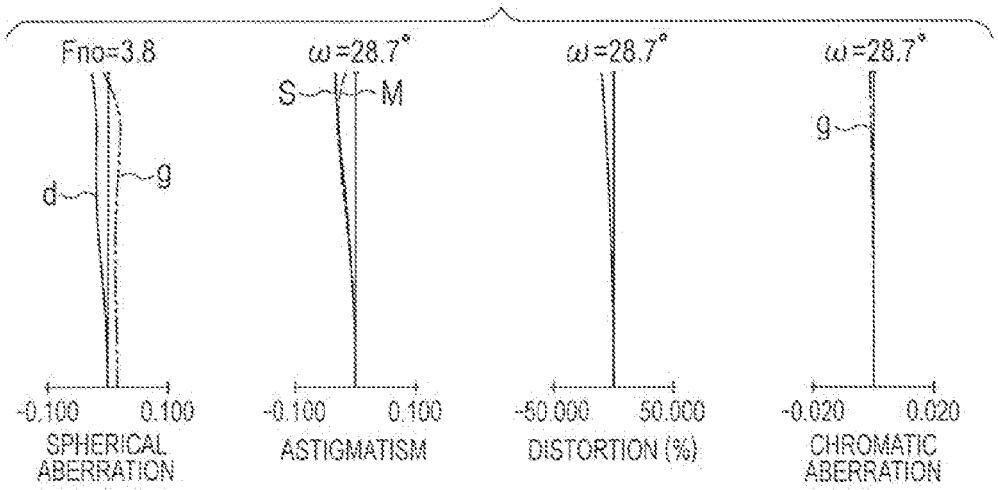
FIG. 18B is a longitudinal aberration diagram of the image pickup optical system according to Example 5 of the present invention in the image pickup state A at the intermediate zoom position.
Figure 18C:
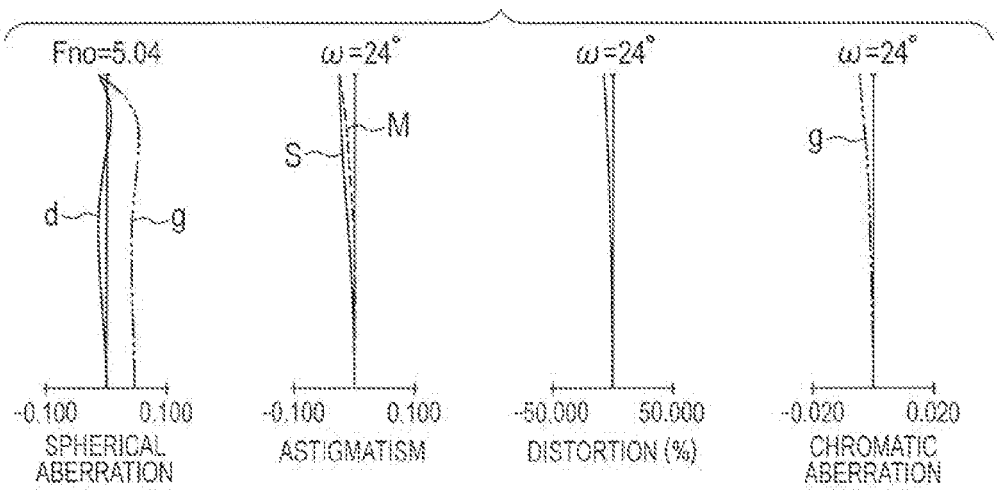
FIG. 18C is a longitudinal aberration diagram of the image pickup optical system according to Example 5 of the present invention in the image pickup state A at the telephoto end.

FIG. 17A, FIG. 17B, and FIG. 17C are lens cross-sectional views of the image pickup optical system according to Example 5 of the present invention in the image pickup state A at a wide angle end, an intermediate zoom position, and a telephoto end, respectively. FIG. 18A, FIG. 18B, and FIG. 18C are longitudinal aberration diagrams of the image pickup optical system according to Example 5 (image pickup state A) at the wide angle end, the intermediate zoom position, and the telephoto end, respectively. Example 5 (image pickup state A) relates to a zoom lens having a zoom ratio of 2.94, and an aperture ratio of from about 2.88 to about 5.04.

In the lens cross-sectional views of FIG. 17A, FIG. 17B, and FIG. 17C, a first lens unit L1 having a negative refractive power and including a protection lens PG, a second lens unit L2 having a negative refractive power, a third lens unit L3 having a positive refractive power, and a fourth lens unit L4 having a positive refractive power are illustrated. Moreover, in this Example, the virtual air lens (optical system A) is set on the image side of the fourth lens unit L4.

In the zoom lens in FIG. 17A, FIG. 17B, and FIG. 17C, the second lens unit L2, the third lens unit L3, and the fourth lens unit L4 are configured to move so that an interval between each pair of adjacent lens units is changed during zooming. A change in interval between each pair of adjacent lens units during zooming from the wide angle end to the telephoto end is as follows. An interval between the first lens unit L1 and the second lens unit L2 is reduced, an interval between the second lens unit L2 and the third lens unit L3 is reduced, and an interval between the third lens unit L3 and the fourth lens unit L4 is increased. Note that, the first lens unit L1 is configured not to move during zooming. Moreover, the aperture stop SP is configured to move integrally with the third lens unit L3 during zooming.

At the telephoto end as compared to the wide angle end, all of the second lens unit L2, the third lens unit L3, and fourth lens unit L4 are positioned on the object side. Moreover, the second lens unit L2 is configured to move along a locus that is convex toward the image side during zooming. The lens units are configured to move appropriately as described above during zooming to realize the downsizing of the entire system and a high zoom ratio. Note that, in the image pickup state A, the surrounding medium of the image pickup optical system OL is air having the refractive index of 1.000 with respect to the d-line.

(Image Pickup State B)

FIG. 19A, FIG. 19B, and FIG. 19C are lens cross-sectional views of the image pickup optical system according to Example 5 of the present invention in the image pickup state B at a wide angle end, an intermediate zoom position, and a telephoto end, respectively. In FIG. 19A, FIG. 19B, and FIG. 19C the fifth lens unit L5 having the positive refractive power is illustrated as the optical system C. As compared to the image pickup optical system according to Example 5 (image pickup state A), the air lens (optical system A) is switched to the fifth lens unit L5 having the positive refractive power (optical system C). The image pickup state B is different from the image pickup state A only in a movement locus of the fourth lens unit L4 during zooming. The fifth lens unit L5 (optical system B) is configured not to more during zooming.

Figure 20A:
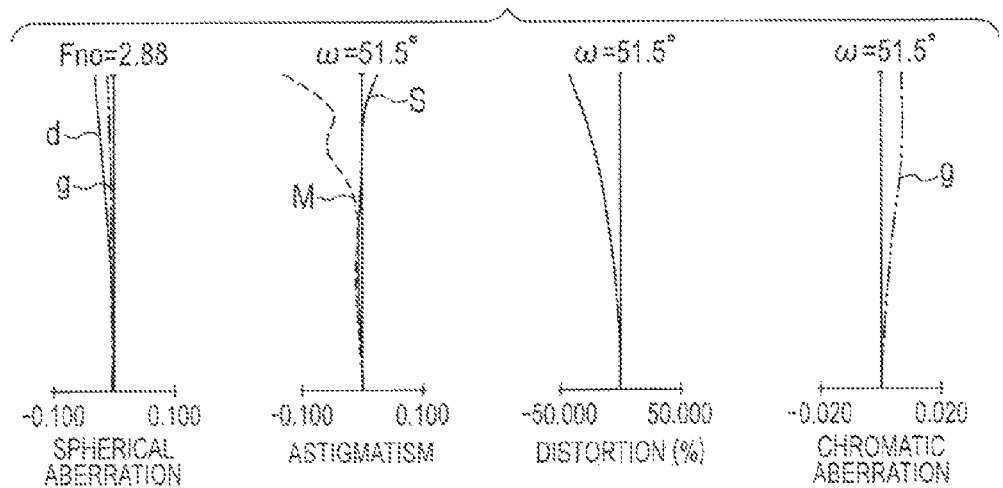
FIG. 20A is a longitudinal aberration diagram of the image pickup optical system according to Example 5 of the present invention in the image pickup state B at the wide angle end.
Figure 20B:
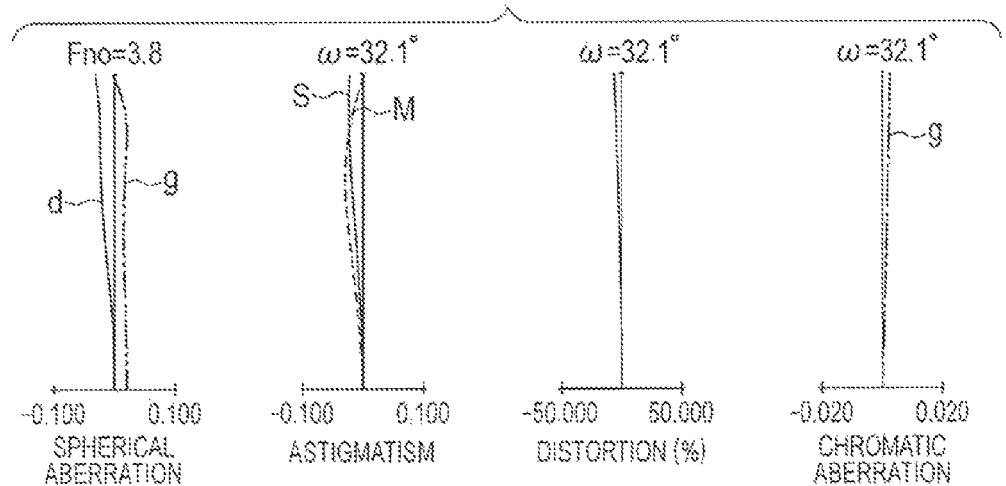
FIG. 20B is a longitudinal aberration diagram of the image pickup optical system according to Example 5 of the present invention in the image pickup state B at the intermediate zoom position.
Figure 20C:
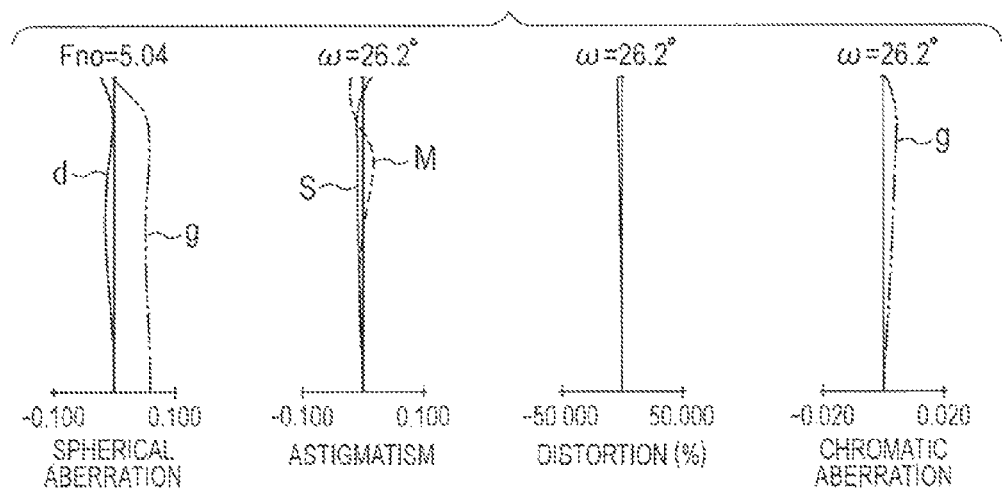
FIG. 20C is a longitudinal aberration diagram of the image pickup optical system according to Example 5 of the present invention in the image pickup state B at the telephoto end.

FIG. 20A, FIG. 20B, and FIG. 20C are longitudinal aberration diagrams of the image pickup optical system according to Example 5 (image pickup state B) at the wide angle end, the intermediate zoom position, and the telephoto end, respectively. Example 5 (image pickup state B) relates to a zoom lens having a zoom ratio of 3.09, and an aperture ratio of from about 2.88 to about 5.04. Note that, in this image pickup state B, the surrounding medium of the image pickup optical system OL is water having the refractive index of 1.333 with respect to the d-line.

Example 6

(Image Pickup State A)

Figure 22A:
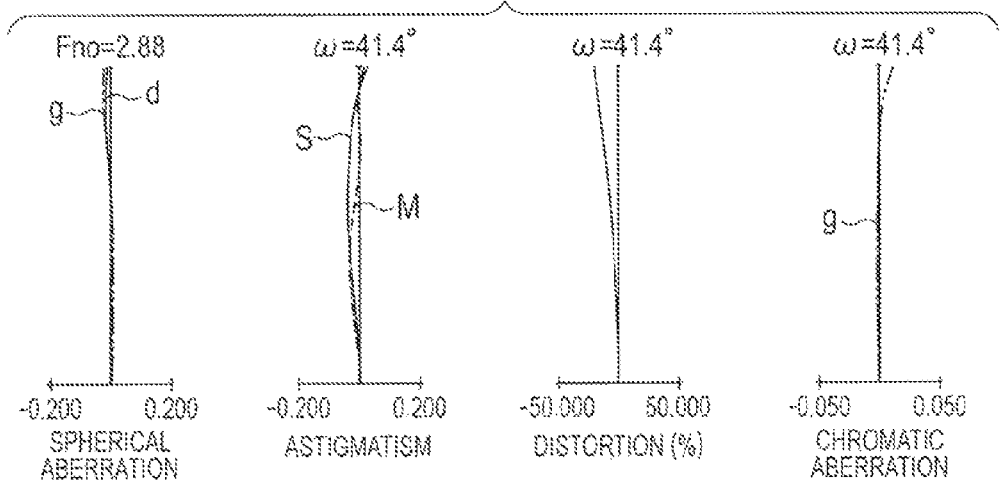
FIG. 22A is a longitudinal aberration diagram of the image pickup optical system according to Example 6 of the present invention in the image pickup state A at the wide angle end.
Figure 22B:
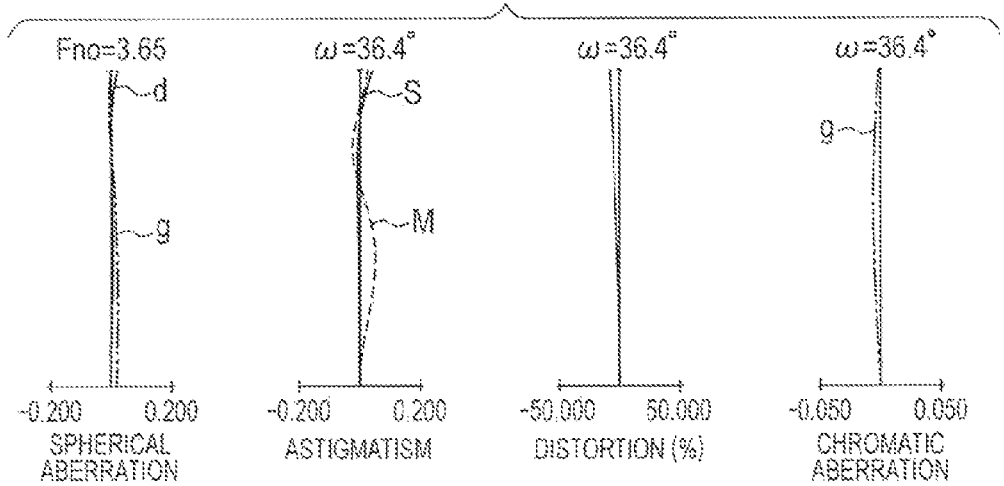
FIG. 22B is a longitudinal aberration diagram of the image pickup optical system according to Example 6 of the present invention in the image pickup state A at the intermediate zoom position.
Figure 22C:
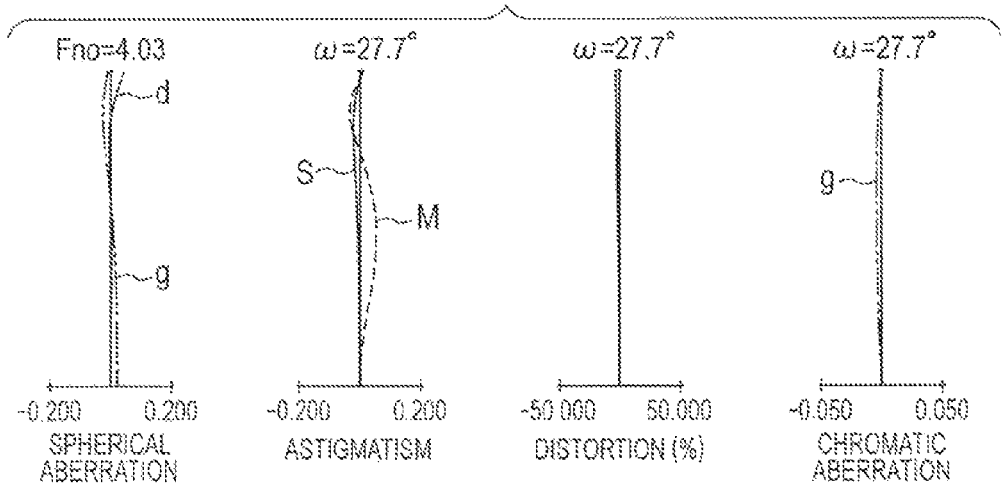
FIG. 22C is a longitudinal aberration diagram of the image pickup optical system according to Example 6 of the present invention in the image pickup state A at the telephoto end.

FIG. 21A, FIG. 21B, and FIG. 21C are lens cross-sectional views of the image pickup optical system according to Example 6 of the present invention in the image pickup state A at a wide angle end, an intermediate zoom position, and a telephoto end, respectively. FIG. 22A, FIG. 22B, and FIG. 22C are longitudinal aberration diagrams of the image pickup optical system according to Example 6 (image pickup state A) at the wide angle end, the intermediate zoom position, and the telephoto end, respectively. Example 6 (image pickup state A) relates to a zoom lens having a zoom ratio of 2.05, and an aperture ratio of from about 2.88 to about 4.03.

In the lens cross-sectional views of FIG. 21A, FIG. 21B, and FIG. 21C, a first lens unit L1 having a negative refractive power and including a protection lens PG, a second lens unit L2 having a positive refractive power, a third lens unit L3 having a negative refractive power, and a fourth lens unit L4 having a positive refractive power are illustrated. A fifth lens unit L5 having a positive refractive power and a sixth lens unit L6 having a positive refractive power are also illustrated.

In the zoom lens in FIG. 21A, FIG. 21B, and FIG. 21C, the second lens unit L2 to the fifth lens unit L5 are configured to move so that an interval between each pair of adjacent lens units is changed during zooming. A change in interval between each pair of adjacent lens units during zooming from the wide angle end to the telephoto end is as follows.

At the telephoto end as compared to the wide angle end, an interval between the first lens unit L1 and the second lens unit L2 is reduced, an interval between the second lens unit L2 and the third lens unit L3 is increased, an interval between the third lens unit L3 and the fourth lens unit L4 is reduced, and an interval between the fourth lens unit L4 and the fifth lens unit L5 is increased. Moreover, an interval between the fifth lens unit L5 and the sixth lens unit L6 is increased. Note that, the first lens unit L1 and the sixth lens unit L6 are configured not to move during zooming. Moreover, the aperture stop SP is configured to move independently of the lens units during zooming.

Further at the telephoto end as compared to the wide angle end, the second lens unit L2, the fourth lens unit L4, the fifth lens unit L5, and the aperture stop SP are positioned on the object side, and the third lens unit L3 is positioned on the image side. Moreover, the second lens unit L2 is configured to move along a locus that is convex toward the image side during zooming. The lens units are configured to move appropriately as described above during zooming to realize the downsizing of the entire system and a high zoom ratio. Note that, in the image pickup state A, the surrounding medium of the image pickup optical system OL is air having the refractive index of 1.000 with respect to the d-line.

(Image Pickup State B)

FIG. 23A, FIG. 23B, and FIG. 23C are lens cross-sectional views of the image pickup optical system according to Example 6 of the present invention in the image pickup state B at a wide angle end, an intermediate zoom position, and a telephoto end, respectively. In FIG. 23A, FIG. 23B, and FIG. 23C, the sixth lens unit L6 having the positive refractive power is illustrated as the optical system B. As compared to the image pickup optical system according to Example 6 (image pickup state A), the sixth lens unit L6 having the positive refractive power (optical system A) is switched to the sixth lens unit L6 having the positive refractive power (optical system B). The image pickup state B is different from the image pickup state A only in a movement locus of the fifth lens unit L5 during zooming.

Figure 24A:
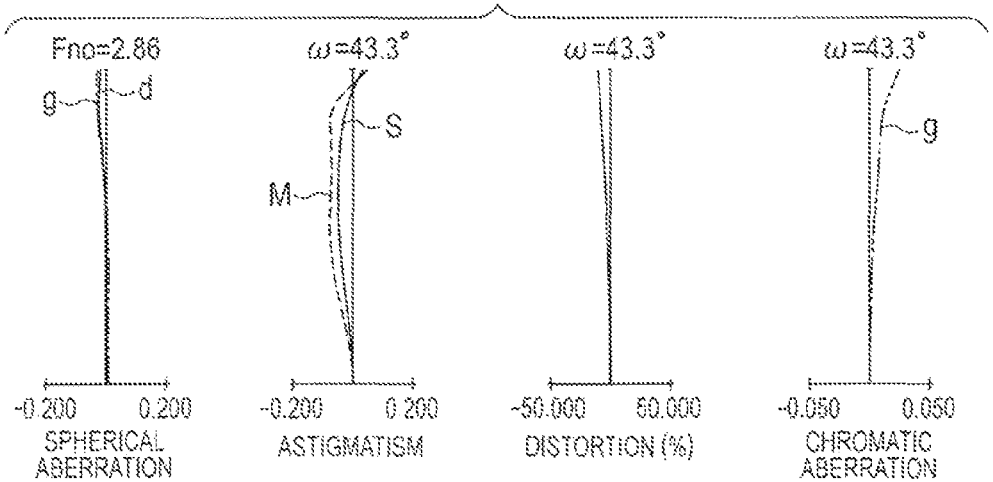
FIG. 24A is a longitudinal aberration diagram of the image pickup optical system according to Example 6 of the present invention in the image pickup state B at the wide angle end.
Figure 24B:
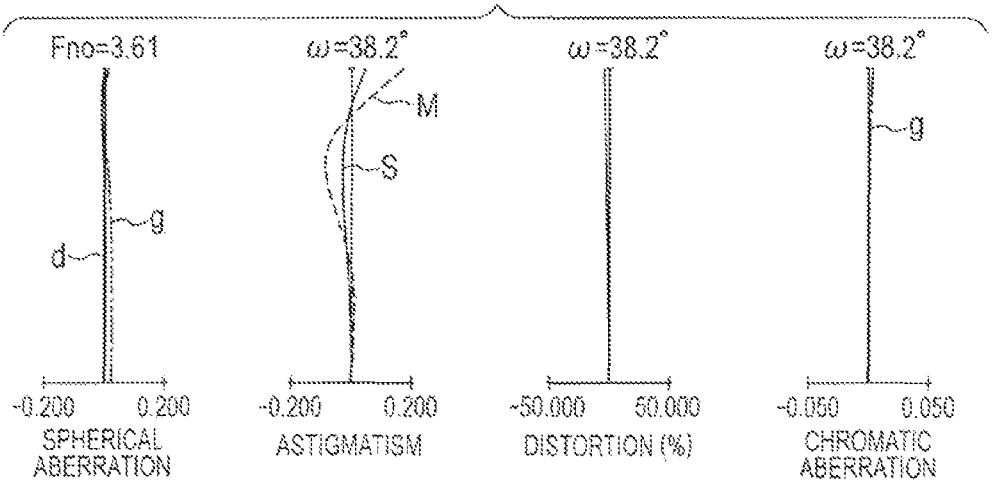
FIG. 24B is a longitudinal aberration diagram of the image pickup optical system according to Example 6 of the present invention in the image pickup state B at the intermediate zoom position.
Figure 24C:
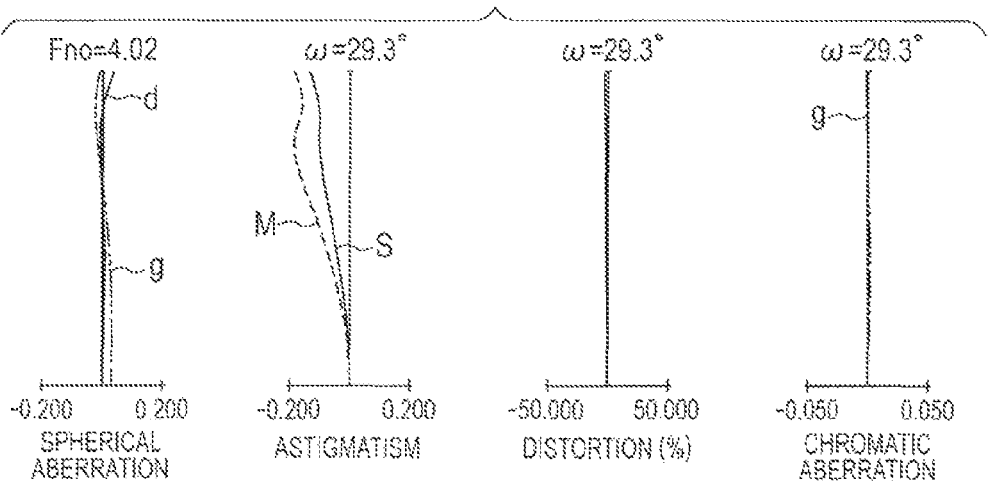
FIG. 24C is a longitudinal aberration diagram of the image pickup optical system according to Example 6 of the present invention in the image pickup state B at the telephoto end.

FIG. 24A, FIG. 24B, and FIG. 24C are longitudinal aberration diagrams of the image pickup optical system according to Example 6 (image pickup state B) at the wide angle end, the intermediate zoom position, and the telephoto end, respectively. Example 6 (image pickup state B) relates to a zoom lens having a zoom ratio of 2.05, and an aperture ratio of from about 2.86 to about 4.02. Note that, in this image pickup state B, the surrounding medium of the image pickup optical system OL is water having the refractive index of 1.333 with respect to the d-line.

Example 7

(Image Pickup State A)

FIG. 25 is a lens cross-sectional view of the image pickup optical system according to Example 7 of the present invention in the image pickup state A. FIG. 26 is a longitudinal aberration diagram of the image pickup optical system according to Example 7 (image pickup state A). Example 7 (image pickup state A) relates to the image pickup optical system having a fixed focal length and having an aperture ratio of about 1.64.

In the lens cross-sectional view of FIG. 25, a first lens unit G1 having a negative refractive power and including a protection lens PG, a second lens unit G2 having a negative refractive power, a third lens unit G3 having a positive refractive power, a fourth lens unit G4 having a positive refractive power, and a fifth lens unit G5 having a positive refractive power are illustrated. The optical system A is the fifth lens unit. The optical system A is the fifth lens portion G5. Moreover, the aperture stop SP is located between the second lens unit G2 and the third lens unit G3. With this lens configuration, the wide field angle and a bright aperture ratio are attained. Note that, in this image pickup state A, the surrounding medium of the image pickup optical system OL is air having the refractive index of 1.000 with respect to the d-line.

(Image Pickup State B)

FIG. 27 is a lens cross-sectional view of the image pickup optical system according to Example 7 of the present invention in the image pickup state B. As compared to the image pickup optical system according to Example 7 (image pickup state A), the fifth lens unit L5 having the positive refractive power (optical system A) is switched to the fifth lens unit G5 having the positive refractive power (optical system B). FIG. 28 is a longitudinal aberration diagram of the image pickup optical system according to Example 7 (image pickup state B). Example 7 (image pickup state B) relates to the image pickup optical system having a fixed focal length and having the aperture ratio of about 1.64. Note that, in this image pickup state B, the surrounding medium of the image pickup optical system OL is water having the refractive index of 1.333 with respect to the d-line.

Also note that, in the longitudinal aberration diagrams, the solid line in the spherical aberration indicates the d-line, and the two-dot chain line indicates a g-line. In the astigmatism, the broken line indicates a meridional image plane, and the solid line indicates a sagittal image plane. The distortion is shown with respect to the d-line. The lateral chromatic aberration is expressed by the g-line with respect to the d-line.

Next, a digital camera (image pickup apparatus) according to an embodiment of the present invention using the image pickup optical system of the present invention is described with reference to FIG. 29. In FIG. 29, a reference numeral 20 represents a digital camera main body. A photographing optical system 21 includes the image pickup optical system of any one of Examples described above. An image pickup element 22 such as a CCD receives light corresponding to an object image by using the image pickup optical system 21. A recording unit 23 records data on the object image, the light corresponding to which is received by the image pickup element 22. A finder 24 is used to observe the object image displayed on a display element (not shown). The display element includes a liquid crystal panel or the like. The object image formed on the image pickup element 22 is displayed on the display element.

The image pickup optical system according to the present invention is applied to the image pickup apparatus such as a digital camera as described above to satisfactorily correct the various aberrations both in the air and in water. As a result, an amphibious image pickup apparatus, which has high optical characteristics, with which the wide image pickup field angle is secured even under water, and which is compact and inexpensive may be obtained.

Next, numerical value data of each of Examples is described. In the numerical value data of each of Examples, symbol i represents the number of a surface counted from the object side. In the numerical value data, symbol ri represents a curvature radius of an i-th lens surface in order from the object side. Symbol di represents a lens thickness and an air gap between an i-th surface and an (i+1)th surface in order from the object side. Symbols ndi and vdi represent a refractive index and an Abbe number with respect to the d-line of a material between the i-th surface and the (i+1)th surface in order from the object side, respectively. An aspherical shape is expressed by the expression below.

$$X = \frac{(1/R)H^2}{1+\sqrt{1-(1+K)(H/R)^2}} + A4 \times H^4 + A6 \times H^6 + A8 \times H^8 + A10 \times H^{10}$$

where the X axis corresponds to the optical axis direction, the H axis corresponds to the direction perpendicular to the optical axis, a direction from the object side toward the image side is positive, symbol r represents a paraxial curvature radius, symbol K represents a conic constant, and symbols A4, A6, A8, and A10 represent aspherical coefficients, respectively.

In addition, [e+x] means [×10$^{+x}$] and [e−x] means [×10$^{-x}$]. Symbol BF is an air-equivalent distance (back focus) from a final lens surface to a paraxial image plane. A total lens length is obtained by adding the back focus BF to a distance from a forefront lens surface to the final lens surface. An aspherical surface is represented by adding the mark "*" after a surface number. Moreover, the distances KA, KB, and KC are values obtained by adding the back focus BF to the distances from the vertices of the lens surfaces closest to the object side of the optical system A, the optical system B, and the optical system C to the last lens surface, respectively. Moreover, relationships between the conditional expressions and various numerical values in the numerical value data are shown in Table 1.

Example 1

[Image Pickup State A]

| Unit mm | | | | |
|---|---|---|---|---|
| Surface data | | | | |
| Surface number | r | d | nd | vd |
| 1 | 65.000 | 2.50 | 1.51633 | 64.1 |
| 2 | 29.220 | (Variable) | | |
| 3* | −22.841 | 0.95 | 1.76802 | 49.2 |
| 4* | 10.231 | 3.08 | | |
| 5* | −12.859 | 0.60 | 1.69350 | 53.2 |
| 6* | 13.409 | 0.65 | | |
| 7 | 8.078 | 1.81 | 1.84666 | 23.8 |
| 8 | 25.882 | (Variable) | | |
| 9 (Stop) | ∞ | 0.00 | | |
| 10* | 5.279 | 1.63 | 1.69350 | 53.2 |
| 11* | 48.359 | 0.20 | | |
| 12 | 7.767 | 1.36 | 1.48749 | 70.2 |
| 13 | 116.902 | 0.50 | 1.85478 | 24.8 |
| 14 | 5.526 | 0.14 | | |
| 15* | 14.527 | 0.94 | 1.62263 | 58.2 |
| 16* | −24.339 | (Variable) | | |
| 17 | 11.067 | 1.16 | 1.49700 | 81.5 |
| 18 | 29.785 | (Variable) | | |
| 19 | 80.000 | 2.00 | 1.51633 | 64.1 |
| 20 | −80.000 | 1.60 | | |
| 21 | ∞ | 0.80 | 1.51633 | 64.1 |
| 22 | ∞ | 0.60 | | |
| Image plane | ∞ | | | |
| Aspherical surface data | | | | |
| Third surface | | | | |

K = 0.00000e+000 A4 = 1.57582e−003 A6 = −2.87073e−005
A8 = 1.80616e−007

-continued

Unit mm

Fourth surface

K = 0.00000e+000 A4 = 1.11655e−003 A6 = 3.69336e−005
Fifth surface

K = 0.00000e+000 A4 = 1.70633e−003 A6 = −1.27056e−005
Sixth surface

K = 0.00000e+000 A4 = 2.78879e−003 A6 = −5.17972e−005
Tenth surface

K = 0.00000e+000 A4 = 6.01185e−004 A6 = 6.37189e−005
A8 = 2.66873e−006
Eleventh surface K = 0.00000e+000 A4 = 2.80516e−003 A6 = 7.75002e−005
Fifteenth surface K = 0.00000e+000 A4 = 8.19026e−003 A6 = 3.65309e−004
A8 = −8.07997e−006
Sixteenth surface K = 0.00000e+000 A4 = 6.70862e−003 A6 = 5.99425e−004
A8 = 3.20142e−005

Various data
Zoom ratio 2.94

|  | Wide angle | Intermediate | Telephoto |
| --- | --- | --- | --- |
| Focal length | 3.55 | 7.01 | 10.43 |
| F number | 2.88 | 3.80 | 5.04 |
| Half field angle (degree) | 47.39 | 28.83 | 24.03 |
| Image height | 3.86 | 3.86 | 4.65 |
| Total lens length | 37.23 | 37.23 | 37.23 |
| BF | 2.73 | 2.73 | 2.73 |
| d2 | 2.80 | 4.76 | 2.00 |
| d8 | 9.84 | 3.10 | 1.09 |
| d16 | 2.32 | 2.61 | 3.73 |
| d18 | 2.01 | 6.50 | 10.16 |

Zoom lens unit data

| Unit | First surface | Focal length |
| --- | --- | --- |
| 1 | 1 | −105.31 |
| 2 | 3 | −6.89 |
| 3 | 10 | 8.58 |
| 4 | 17 | 34.72 |
| 5 | 19 | 77.80 |

| Optical system A | Fifth lens unit |
| --- | --- |
| G1R1 | 65.000 |
| KA | 4.730 |

[Image Pickup State B]

Unit mm
Surface data

| Surface number | r | d | nd | vd |
| --- | --- | --- | --- | --- |
| 1 | 65.000 | 2.50 | 1.51633 | 64.1 |
| 2 | 29.220 | (Variable) |  |  |
| 3* | −22.841 | 0.95 | 1.76802 | 49.2 |
| 4* | 10.231 | 3.08 |  |  |
| 5* | −12.859 | 0.60 | 1.69350 | 53.2 |
| 6* | 13.409 | 0.65 |  |  |
| 7 | 8.078 | 1.81 | 1.84666 | 23.8 |
| 8 | 25.882 | (Variable) |  |  |
| 9 (Stop) | ∞ | 0.00 |  |  |
| 10* | 5.279 | 1.63 | 1.69350 | 53.2 |
| 11* | 48.359 | 0.20 |  |  |
| 12 | 7.767 | 1.36 | 1.48749 | 70.2 |
| 13 | 116.902 | 0.50 | 1.85478 | 24.8 |
| 14 | 5.526 | 0.14 |  |  |
| 15* | 14.527 | 0.94 | 1.62263 | 58.2 |
| 16* | −24.339 | (Variable) |  |  |
| 17 | 11.067 | 1.16 | 1.49700 | 81.5 |
| 18 | 29.785 | (Variable) |  |  |
| 19 | 768.274 | 1.30 | 1.95906 | 17.5 |
| 20 | −45.525 | 1.60 |  |  |
| 21 | ∞ | 0.80 | 1.51633 | 64.1 |
| 22 | ∞ | 0.60 |  |  |
| Image plane | ∞ |  |  |  |

Aspherical surface data

Third surface

K = 0.00000e+000 A4 = 1.57582e−003 A6 = −2.87073e−005
A8 = 1.80616e−007
Fourth surface K = 0.00000e+000 A4 = 1.11655e−003 A6 = 3.69336e−005
Fifth surface K = 0.00000e+000 A4 = 1.70633e−003 A6 = −1.27056e−005
Sixth surface K = 0.00000e+000 A4 = 2.78879e−003 A6 = −5.17972e−005
Tenth surface K = 0.00000e+000 A4 = 6.01185e−004 A6 = 6.37189e−005
A8 = 2.66873e−006
Eleventh surface K = 0.00000e+000 A4 = 2.80516e−003 A6 = 7.75002e−005
Fifteenth surface K = 0.00000e+000 A4 = 8.19026e−003 A6 = 3.65309e−004
A8 = −8.07997e−006
Sixteenth surface K = 0.00000e+000 A4 = 6.70862e−003 A6 = 5.99425e−004
A8 = 3.20142e−005

Various data
Zoom ratio 3.00

|  | Wide angle | Intermediate | Telephoto |
| --- | --- | --- | --- |
| Focal length | 3.34 | 6.59 | 10.00 |
| F number | 2.88 | 3.80 | 5.04 |
| Half field angle (degree) | 49.15 | 30.37 | 24.94 |
| Image height | 3.86 | 3.86 | 4.65 |
| Total lens length | 37.23 | 37.23 | 37.23 |
| BF | 2.73 | 2.73 | 2.73 |
| d2 | 2.80 | 4.76 | 2.00 |
| d8 | 9.84 | 3.10 | 1.09 |
| d16 | 2.32 | 2.27 | 2.98 |
| d18 | 2.72 | 7.54 | 11.61 |

Zoom lens unit data

| Unit | First surface | Focal length |
| --- | --- | --- |
| 1 | 1 | −67.71 |
| 2 | 3 | −6.89 |
| 3 | 10 | 8.58 |
| 4 | 17 | 34.72 |
| 5 | 19 | 44.85 |

| Optical system B | Fifth lens unit |
| --- | --- |
| G1R1 | 65.000 |
| KB | 4.028 |
| vdB | 17.47 |
| ndB | 1.333 |

Example 2

[Image Pickup State A]

Numerical value data of the image pickup state A of this Example is the same as that of the image pickup state A of Example 1.

| Optical system A | Fourth lens unit |
|---|---|
| G1R1 | 65.000 |
| KA | 7.906 (Wide angle) 16.050 (Telephoto) |

[Image Pickup State B]

Unit mm

Surface data

| Surface number | r | d | nd | vd |
|---|---|---|---|---|
| 1 | 65.000 | 2.50 | 1.51633 | 64.1 |
| 2 | 29.220 | (Variable) | | |
| 3* | −22.841 | 0.95 | 1.76802 | 49.2 |
| 4* | 10.231 | 3.08 | | |
| 5* | −12.859 | 0.60 | 1.69350 | 53.2 |
| 6* | 13.409 | 0.65 | | |
| 7 | 8.078 | 1.81 | 1.84666 | 23.8 |
| 8 | 25.882 | (Variable) | | |
| 9 (Stop) | ∞ | 0.00 | | |
| 10* | 5.279 | 1.63 | 1.69350 | 53.2 |
| 11* | 48.359 | 0.20 | | |
| 12 | 7.767 | 1.36 | 1.48749 | 70.2 |
| 13 | 116.902 | 0.50 | 1.85478 | 24.8 |
| 14 | 5.526 | 0.14 | | |
| 15* | 14.527 | 0.94 | 1.62263 | 58.2 |
| 16* | −24.339 | (Variable) | | |
| 17 | 10.438 | 0.82 | 1.88300 | 40.8 |
| 18 | 7.906 | 0.15 | | |
| 19 | 7.609 | 0.80 | 1.51742 | 52.4 |
| 20 | 37.912 | (Variable) | | |
| 21 | 80.000 | 2.00 | 1.51633 | 64.1 |
| 22 | −80.000 | 1.60 | | |
| 23 | ∞ | 0.80 | 1.51633 | 64.1 |
| 24 | ∞ | 0.60 | | |
| Image plane | ∞ | | | |

Aspherical surface data

Third surface

K = 0.00000e+000 A4 = 1.57582e−003 A6 = −2.87073e−005
A8 = 1.80616e−007
Fourth surface K = 0.00000e+000 A4 = 1.11655e−003 A6 = 3.69336e−005
Fifth surface K = 0.00000e+000 A4 = 1.70633e−003 A6 = −1.27056e−005
Sixth surface K = 0.00000e+000 A4 = 2.78879e−003 A6 = −5.17972e−005
Tenth surface K = 0.00000e+000 A4 = 6.01185e−004 A6 = 6.37189e−005
A8 = 2.66873e−006
Eleventh surface K = 0.00000e+000 A4 = 2.80516e−003 A6 = 7.75002e−005
Fifteenth surface K = 0.00000e+000 A4 = 8.19026e−003 A6 = 3.65309e−004
A8 = −8.07997e−006
Sixteenth surface K = 0.00000e+000 A4 = 6.70862e−003 A6 = 5.99425e−004
A8 = 3.20142e−005

Unit mm

Various data
Zoom ratio 3.01

| | Wide angle | Intermediate | Telephoto |
|---|---|---|---|
| Focal length | 3.32 | 6.58 | 10.00 |
| F number | 2.88 | 3.80 | 5.04 |
| Half field angle (degree) | 49.31 | 30.38 | 24.94 |
| Image height | 3.86 | 3.86 | 4.65 |
| Total lens length | 37.23 | 37.23 | 37.23 |
| BF | 2.73 | 2.73 | 2.73 |
| d2 | 2.80 | 4.76 | 2.00 |
| d8 | 9.84 | 3.10 | 1.09 |
| d16 | 1.93 | 2.29 | 3.23 |
| d20 | 1.79 | 6.21 | 10.04 |

Zoom lens unit data

| Unit | First surface | Focal length |
|---|---|---|
| 1 | 1 | −67.71 |
| 2 | 3 | −6.89 |
| 3 | 10 | 8.58 |
| 4 | 17 | 33.46 |
| 5 | 21 | 77.80 |

| Optical system B | Fourth lens unit |
|---|---|
| G1R1 | 65.000 |
| KB | 8.295 (Wide angle) 16.548 (Telephoto) |
| vdB | 52.43 |
| ndB | 1.333 |

Example 3

[Image Pickup State A]

Numerical value data of the image pickup state A of this Example is the same as that of the image pickup state A of Example 1.

| Optical system A | Fifth lens unit |
|---|---|
| G1R1 | 65.000 |
| KA | 4.730 |

[Image Pickup State B]

Unit mm

Surface data

| Surface number | r | d | nd | vd |
|---|---|---|---|---|
| 1 | 65.000 | 2.50 | 1.51633 | 64.1 |
| 2 | 29.220 | (Variable) | | |
| 3* | −22.841 | 0.95 | 1.76802 | 49.2 |
| 4* | 10.231 | 3.08 | | |
| 5* | −12.859 | 0.60 | 1.69350 | 53.2 |
| 6* | 13.409 | 0.65 | | |
| 7 | 8.078 | 1.81 | 1.84666 | 23.8 |
| 8 | 25.882 | (Variable) | | |
| 9 (Stop) | ∞ | 0.00 | | |
| 10* | 5.279 | 1.63 | 1.69350 | 53.2 |
| 11* | 48.359 | 0.20 | | |
| 12 | 7.767 | 1.36 | 1.48749 | 70.2 |
| 13 | 116.902 | 0.50 | 1.85478 | 24.8 |
| 14 | 5.526 | 0.14 | | |
| 15* | 14.527 | 0.94 | 1.62263 | 58.2 |
| 16* | −24.339 | (Variable) | | |
| 17 | 11.067 | 1.16 | 1.49700 | 81.5 |

-continued

Unit mm

| | | | | |
|---|---|---|---|---|
| 18 | 29.785 | (Variable) | | |
| 19 | 151.558 | 1.66 | 1.84666 | 23.8 |
| 20 | −30.360 | 1.60 | | |
| 21 | ∞ | 0.80 | 1.51633 | 64.1 |
| 22 | ∞ | 0.60 | | |
| Image plane | ∞ | | | |

Aspherical surface data

Third surface

K = 0.00000e+000 A4 = 1.57582e−003 A6 = −2.87073e−005
A8 = 1.80616e−007
Fourth surface K = 0.00000e+000 A4 = 1.11655e−003 A6 = 3.69336e−005
Fifth surface K = 0.00000e+000 A4 = 1.70633e−003 A6 = 1.27056e−005
Sixth surface K = 0.00000e+000 A4 = 2.78879e−003 A6 = −5.17972e−005
Tenth surface K = 0.00000e+000 A4 = 6.01185e−004 A6 = 6.37189e−005
A8 = 2.66873e−006
Eleventh surface K = 0.00000e−+000 A4 = 2.80516e−003 A6 = 7.75002e−005
Fifteenth surface K = 0.00000e+000 A4 = 8.19026e−003 A6 = 3.65309e−004
A8 = −8.07997e−006
Sixteenth surface K = 0.00000e+000 A4 = 6.70862e−003 A6 = 5.99425e−004
A8 = 3.20142e−005

Various data
Zoom ratio 3.00

| | Wide angle | Intermediate | Telephoto |
|---|---|---|---|
| Focal length | 3.22 | 6.35 | 9.63 |
| F number | 2.88 | 3.80 | 5.04 |
| Half field angle (degree) | 50.20 | 31.31 | 25.76 |
| Image height | 3.86 | 3.86 | 4.65 |
| Total lens length | 37.23 | 37.23 | 37.23 |
| BF | 2.73 | 2.73 | 2.73 |
| d2 | 2.80 | 4.76 | 2.00 |
| d8 | 9.84 | 3.10 | 1.09 |
| d16 | 2.32 | 2.27 | 2.98 |
| d18 | 2.35 | 7.18 | 11.24 |

Zoom lens unit data

| Unit | First surface | Focal length |
|---|---|---|
| 1 | 1 | −67.71 |
| 2 | 3 | −6.89 |
| 3 | 10 | 8.58 |
| 4 | 17 | 34.72 |
| 5 | 19 | 30.00 |

| Optical system B | Fifth lens unit |
|---|---|
| G1R1 | 65.000 |
| KB | 4.393 |
| vdB | 23.78 |
| ndB | 1.333 |

Example 4

[Image Pickup State A]

Unit mm

Surface data

| Surface number | r | d | nd | vd |
|---|---|---|---|---|
| 1 | 35.000 | 2.50 | 1.51633 | 64.1 |
| 2 | 24.978 | (Variable) | | |
| 3* | −21.886 | 0.95 | 1.76802 | 49.2 |
| 4* | 10.080 | 3.17 | | |
| 5* | −12.447 | 0.60 | 1.69350 | 53.2 |
| 6* | 13.289 | 0.67 | | |
| 7 | 8.147 | 1.82 | 1.84666 | 23.8 |
| 8 | 25.666 | (Variable) | | |
| 9 (Stop) | ∞ | 0.00 | | |
| 10* | 5.278 | 1.59 | 1.69350 | 53.2 |
| 11* | 49.013 | 0.20 | | |
| 12 | 7.749 | 1.36 | 1.48749 | 70.2 |
| 13 | 100.703 | 0.50 | 1.85478 | 24.8 |
| 14 | 5.536 | 0.14 | | |
| 15* | 14.518 | 0.93 | 1.62263 | 58.2 |
| 16* | −24.300 | (Variable) | | |
| 17 | 11.067 | 1.13 | 1.49700 | 81.5 |
| 18 | 30.272 | (Variable) | | |
| 19 | 80.000 | 2.00 | 1.51633 | 64.1 |
| 20 | −80.000 | 1.60 | | |
| 21 | ∞ | 0.80 | 1.51633 | 64.1 |
| 22 | ∞ | 0.60 | | |
| Image plane | ∞ | | | |

Aspherical surface data

Third surface

K = 0.00000e+000 A4 = 1.59149e−003 A6 = −2.98873e−005
A8 = 1.90280e−007
Fourth surface K = 0.00000e+000 A4 = 1.13550e−003 A6 = 3.69324e−005
Fifth surface K = 0.00000e+000 A4 = 1.66268e−003 A6 = −7.65304e−006
Sixth surface K = 0.00000e+000 A4 = 2.74838e−003 A6 = −4.87623e−005
Tenth surface K = 0.00000e+000 A4 = 5.82371e−004 A6 = 6.30004e−005
A8 = 2.79556e−006
Eleventh surface K = 0.00000e+000 A4 = 2.72342e−003 A6 = 7.76875e−005
Fifteenth surface K = 0.00000e+000 A4 = 8.03486e−003 A6 = 3.77268e−004
A8 = −5.37347e−006
Sixteenth surface K = 0.00000e+000 A4 = 6.68384e−003 A6 = 5.90648e−004
A8 = 3.79253e−005

Various data
Zoom ratio 2.94

| | Wide angle | Intermediate | Telephoto |
|---|---|---|---|
| Focal length | 3.55 | 7.13 | 10.43 |
| F number | 2.88 | 3.80 | 5.04 |
| Half field angle (degree) | 47.39 | 28.43 | 24.03 |
| Image height | 3.86 | 3.86 | 4.65 |
| Total lens length | 37.23 | 37.23 | 37.23 |
| BF | 2.73 | 2.73 | 2.73 |
| d2 | 2.80 | 4.83 | 2.00 |
| d8 | 9.81 | 3.02 | 1.09 |

-continued

Unit mm

| | | | |
|---|---|---|---|
| d16 | 2.32 | 2.43 | 3.73 |
| d18 | 1.99 | 6.64 | 10.10 |

Zoom lens unit data

| Unit | First surface | Focal length |
|---|---|---|
| 1 | 1 | −184.63 |
| 2 | 3 | −6.54 |
| 3 | 10 | 8.53 |
| 4 | 17 | 34.42 |
| 5 | 19 | 77.80 |

| Optical system A | Fifth lens unit |
|---|---|
| G1R1 | 35.000 |
| KA | 4.730 |

[Image Pickup State B]

Unit mm

Surface data

| Surface number | r | d | nd | νd |
|---|---|---|---|---|
| 1 | 35.000 | 2.50 | 1.51633 | 64.1 |
| 2 | 24.978 | (Variable) | | |
| 3* | −21.886 | 0.95 | 1.76802 | 49.2 |
| 4* | 10.080 | 3.17 | | |
| 5* | −12.447 | 0.60 | 1.69350 | 53.2 |
| 6* | 13.289 | 0.67 | | |
| 7 | 8.147 | 1.82 | 1.84666 | 23.8 |
| 8 | 25.666 | (Variable) | | |
| 9 (Stop) | ∞ | 0.00 | | |
| 10* | 5.278 | 1.59 | 1.69350 | 53.2 |
| 11* | 49.013 | 0.20 | | |
| 12 | 7.749 | 1.36 | 1.48749 | 70.2 |
| 13 | 100.703 | 0.50 | 1.85478 | 24.8 |
| 14 | 5.536 | 0.14 | | |
| 15* | 14.518 | 0.93 | 1.62263 | 58.2 |
| 16* | −24.300 | (Variable) | | |
| 17 | 11.067 | 1.13 | 1.49700 | 81.5 |
| 18 | 30.272 | (Variable) | | |
| 19 | −11.913 | 0.50 | 1.69680 | 55.5 |
| 20 | −13.274 | 0.20 | | |
| 21 | 430.088 | 0.75 | 1.84666 | 23.8 |
| 22 | −27.455 | 2.05 | | |
| 23 | ∞ | 0.80 | 1.51633 | 64.1 |
| 24 | ∞ | 0.60 | | |
| Image plane | ∞ | | | |

Aspherical surface data

Third surface

K = 0.00000e+000 A4 = 1.59149e−003 A6 = −2.98873e−005
A8 = 1.90280e−007
Fourth surface K = 0.00000e+000 A4 = 1.13550e−003 A6 = 3.69324e−005
Fifth surface K = 0.00000e+000 A4 = 1.66268e−003 A6 = −7.65304e−006
Sixth surface K = 0.00000e+000 A4 = 2.74838e−003 A6 = −4.87623e−005
Tenth surface K = 0.00000e+000 A4 = 5.82371e−004 A6 = 6.30004e−005
A8 = 2.79556e−006

-continued

Unit mm

Eleventh surface

K = 0.00000e+000 A4 = 2.72342e−003 A6 = 7.76875e−005
Fifteenth surface

K = 0.00000e+000 A4 = 8.03486e−003 A6 = 3.77268e−004
A8 = −5.37347e−006
Sixteenth surface K = 0.00000e+000 A4 = 6.68384e−003 A6 = 5.90648e−004
A8 = 3.79253e−005

Various data
Zoom ratio 3.05

| | Wide angle | Intermediate | Telephoto |
|---|---|---|---|
| Focal length | 3.18 | 6.38 | 9.70 |
| F number | 2.88 | 3.80 | 5.04 |
| Half field angle (degree) | 50.50 | 31.18 | 25.61 |
| Image height | 3.86 | 3.86 | 4.65 |
| Total lens length | 37.23 | 37.23 | 37.23 |
| BF | 3.18 | 3.18 | 3.18 |
| d2 | 2.80 | 4.83 | 2.00 |
| d8 | 9.81 | 3.02 | 1.09 |
| d16 | 2.32 | 1.81 | 2.39 |
| d18 | 2.09 | 7.36 | 11.54 |

Zoom lens unit data

| Unit | First surface | Focal length |
|---|---|---|
| 1 | 1 | −65.55 |
| 2 | 3 | −6.54 |
| 3 | 10 | 8.53 |
| 4 | 17 | 34.42 |
| 5 | 19 | 35.28 |

| Optical system B | Fifth lens unit |
|---|---|
| G1R1 | 35.000 |
| KB | 4.630 |
| νdB | 23.78 |
| ndB | 1.333 |

Example 5

[Image Pickup State A]

Unit mm

Surface data

| Surface number | r | d | nd | νd |
|---|---|---|---|---|
| 1 | 35.000 | 2.50 | 1.51633 | 64.1 |
| 2 | 19.121 | (Variable) | | |
| 3* | −80.075 | 0.95 | 1.76802 | 49.2 |
| 4* | 10.096 | 3.77 | | |
| 5* | −11.086 | 0.60 | 1.69350 | 53.2 |
| 6* | 12.194 | 0.58 | | |
| 7 | 8.105 | 1.78 | 1.84666 | 23.8 |
| 8 | 24.801 | (Variable) | | |
| 9 (Stop) | ∞ | 0.00 | | |
| 10* | 5.340 | 1.67 | 1.69350 | 53.2 |
| 11* | 44.147 | 0.24 | | |
| 12 | 7.908 | 1.11 | 1.48749 | 70.2 |
| 13 | 54.360 | 0.50 | 1.85478 | 24.8 |
| 14 | 5.609 | 0.14 | | |
| 15* | 14.596 | 0.96 | 1.62263 | 58.2 |
| 16* | −24.014 | (Variable) | | |
| 17 | 10.711 | 0.96 | 1.49700 | 81.5 |
| 18 | 47.623 | (Variable) | | |

-continued

| Unit mm | | | | |
|---|---|---|---|---|
| 19 | ∞ | 0.80 | 1.51633 | 64.1 |
| 20 | ∞ | 0.60 | | |
| Image plane | ∞ | | | |

Aspherical surface data

Third surface

K = 0.00000e+000 A4 = 1.67512e−003 A6 = −3.20365e−005
A8 = 1.96797e−007
Fourth surface K = 0.00000e+000 A4 = 1.80123e−003 A6 = 2.25555e−005
Fifth surface K = 0.00000e+000 A4 = 1.78310e−003 A6 = −2.08150e−005
Sixth surface K = 0.00000e+000 A4 = 2.44283e−003 A6 = −4.27855e−005
Tenth surface K = 0.00000e+000 A4 = 5.65678e−004 A6 = 5.46489e−005
A8 = 3.98646e−006
Eleventh surface K = 0.00000e+000 A4 = 3.04733e−003 A6 = 8.11958e−005
Fifteenth surface K = 0.00000e+000 A4 = 8.21856e−003 A6 = 4.33546e−004
A8 = −1.15872e−005

-continued

| Unit mm |
|---|

Sixteenth surface

K = 0.00000e+000 A4 = 6.31391e−003 A6 = 5.84302e−004
A8 = 3.69584e−005

Various data
Zoom ratio 2.94

| | Wide angle | Intermediate | Telephoto |
|---|---|---|---|
| Focal length | 3.55 | 7.05 | 10.43 |
| F number | 2.88 | 3.80 | 5.04 |
| Half field angle (degree) | 47.39 | 28.71 | 24.03 |
| Image height | 3.86 | 3.86 | 4.65 |
| Total lens length | 37.23 | 37.23 | 37.23 |
| BF | 6.53 | 10.67 | 14.01 |
| d2 | 2.80 | 4.87 | 2.00 |
| d8 | 10.00 | 3.08 | 1.10 |
| d16 | 2.13 | 2.83 | 4.34 |
| d18 | 5.40 | 9.55 | 12.88 |

Zoom lens unit data

| Unit | First surface | Focal length |
|---|---|---|
| 1 | 1 | −86.25 |
| 2 | 3 | −6.97 |
| 3 | 10 | 8.72 |
| 4 | 17 | 27.57 |

| Optical system A | Air lens |
|---|---|
| G1R1 | 35.000 |

[Image Pickup State B]

| Unit mm | | | | |
|---|---|---|---|---|
| Surface data | | | | |
| Surface number | r | d | nd | vd |
| 1 | 35.000 | 2.50 | 1.51633 | 64.1 |
| 2 | 19.121 | (Variable) | | |
| 3* | −80.075 | 0.95 | 1.76802 | 49.2 |
| 4* | 10.096 | 3.77 | | |
| 5* | −11.086 | 0.60 | 1.69350 | 53.2 |
| 6* | 12.194 | 0.58 | | |
| 7 | 8.105 | 1.78 | 1.84666 | 23.8 |
| 8 | 24.801 | (Variable) | | |
| 9 (Stop) | ∞ | 0.00 | | |
| 10* | 5.340 | 1.67 | 1.69350 | 53.2 |
| 11* | 44.147 | 0.24 | | |
| 12 | 7.908 | 1.11 | 1.48749 | 70.2 |
| 13 | 54.360 | 0.50 | 1.85478 | 24.8 |
| 14 | 5.609 | 0.14 | | |
| 15* | 14.596 | 0.96 | 1.62263 | 58.2 |
| 16* | −24.014 | (Variable) | | |
| 17 | 10.711 | 0.96 | 1.49700 | 81.5 |
| 18 | 47.623 | (Variable) | | |
| 19 | 750.551 | 0.93 | 2.10205 | 16.8 |
| 20* | −140.344 | 2.83 | | |
| 21 | ∞ | 0.80 | 1.51633 | 64.1 |
| 22 | ∞ | 0.60 | | |
| Image plane | ∞ | | | |

Aspherical surface data

Third surface
K = 0.00000e+000 A4 = 1.67512e−003 A6 = −3.20365e−005
A8 = 1.96797e−007
Fourth surface
K = 0.00000e+000 A4 = 1.80123e−003 A6 = 2.25555e−005
Fifth surface
K = 0.00000e+000 A4 = 1.78310e−003 A6 = −2.08150e−005
Sixth surface
K = 0.00000e+000 A4 = 2.44283e−003 A6 = −4.27855e−005

-continued

| Unit mm |
|---|

Tenth surface
K = 0.00000e+000 A4 = 5.65678e−004 A6 = 5.46489e−005
A8 = 3.98646e−006
Eleventh surface
K = 0.00000e+000 A4 = 3.04733e−003 A6 = 8.11958e−005
Fifteenth surface
K = 0.00000e+000 A4 = 8.21856e−003 A6 = 4.33546e−004
A8 = −1.15872e−005
Sixteenth surface
K = 0.00000e+000 A4 = 6.31391e−003 A6 = 5.84302e−004
A8 = 3.69584e−005
Twentieth surface
K = 0.00000e+000 A4 = −5.15007e−005 A6 = 4.65183e−006
A8 = −1.71159e−007

Various data
Zoom ratio 3.09

| | Wide angle | Intermediate | Telephoto |
|---|---|---|---|
| Focal length | 3.07 | 6.14 | 9.47 |
| F number | 2.88 | 3.80 | 5.04 |
| Half field angle (degree) | 51.54 | 32.15 | 26.15 |
| Image height | 3.86 | 3.86 | 4.65 |
| Total lens length | 37.23 | 37.23 | 37.23 |
| BF | 3.96 | 3.96 | 3.96 |
| d2 | 2.80 | 4.87 | 2.00 |
| d8 | 10.00 | 3.08 | 1.10 |
| d16 | 1.22 | 1.71 | 2.73 |
| d18 | 2.56 | 6.91 | 10.74 |

Zoom lens unit data

| Unit | First surface | Focal length |
|---|---|---|
| 1 | 1 | −46.44 |
| 2 | 3 | −6.97 |
| 3 | 10 | 8.72 |
| 4 | 17 | 27.57 |
| 5 | 19 | 107.35 |

| Optical system C | Fifth lens unit |
|---|---|
| G1R1 | 35.000 |
| KC | 4.887 |
| νdC | 16.77 |
| ndC | 1.333 |

Example 6

[Image Pickup State A]

| Unit mm |
|---|

| Surface data | | | | |
|---|---|---|---|---|
| Surface number | r | d | nd | vd |
| 1 | 120.000 | 3.00 | 1.51633 | 64.1 |
| 2 | 58.963 | (Variable) | | |
| 3 | 22.042 | 0.85 | 1.95906 | 17.5 |
| 4 | 16.960 | 5.95 | 1.88300 | 40.8 |
| 5 | 60.233 | (Variable) | | |
| 6 | 41.127 | 0.67 | 1.88300 | 40.8 |
| 7 | 6.004 | 4.56 | | |
| 8* | −15.101 | 0.40 | 1.76802 | 49.2 |
| 9 | −61.048 | 0.10 | | |
| 10 | 19.791 | 1.68 | 1.95906 | 17.5 |
| 11 | 100.369 | (Variable) | | |
| 12 (Stop) | ∞ | (Variable) | | |
| 13* | 8.290 | 2.34 | 1.76802 | 49.2 |
| 14* | −27.533 | 0.10 | | |
| 15 | 7.493 | 1.52 | 1.77250 | 49.6 |
| 16 | −33.393 | 0.45 | 2.00330 | 28.3 |
| 17 | 5.602 | (Variable) | | |
| 18* | 60.332 | 2.34 | 1.58313 | 59.4 |
| 19 | −11.902 | 0.00 | | |
| 20 | −11.902 | 0.40 | 2.00069 | 25.5 |
| 21 | −14.924 | (Variable) | | |
| 22 | 200.000 | 2.00 | 1.51633 | 64.1 |
| 23 | −200.000 | 3.00 | | |
| 24 | ∞ | 1.00 | 1.51633 | 64.1 |
| 25 | ∞ | 0.90 | | |
| Image plane | ∞ | | | |

Aspherical surface data

Eighth surface

K = 0.00000e + 000 A4 = 1.10165e−004 A6 = −4.59689e−006
A8 = 1.58044e−007 A10 = −2.46579e−009
Thirteenth surface K = 0.00000e+000 A4 = 1.29868e−004 A6 = 3.17162e−006
A8 = 1.87472e−006

-continued

Unit mm

Fourteenth surface

K = 0.00000e+000 A 4 = 5.50489e−004 A6 = 4.12641e−008
A8 = 3.19490e−006 A10 = 2.34722e−011
Eighteenth surface K = 0.00000e+000 A4 = −2.55396e−004 A6 = 2.05231e−005
A8 = −1.26680e−006 A10 = 3.23463e−008

Various data
Zoom ratio 2.05

|  | Wide angle | Intermediate | Telephoto |
|---|---|---|---|
| Focal length | 7.33 | 10.72 | 15.00 |
| F number | 2.88 | 3.65 | 4.03 |
| Half field angle (degree) | 41.43 | 36.35 | 27.74 |
| Image height | 6.47 | 7.89 | 7.89 |
| Total lens length | 51.83 | 51.83 | 51.83 |
| BF | 4.56 | 4.56 | 4.56 |
| d2 | 5.00 | 5.33 | 3.51 |
| d5 | 0.78 | 1.20 | 3.77 |
| d11 | 6.95 | 3.98 | 1.02 |
| d12 | 2.60 | 0.99 | 1.02 |
| d17 | 2.57 | 4.53 | 3.78 |
| d21 | 3.00 | 4.86 | 7.79 |

Zoom lens unit data

| Unit | First surface | Focal length |
|---|---|---|
| 1 | 1 | −228.33 |
| 2 | 3 | 37.68 |
| 3 | 6 | −8.25 |
| 4 | 13 | 11.57 |
| 5 | 18 | 24.09 |
| 6 | 22 | 194.00 |

| Optical system A | Sixth lens unit |
|---|---|
| G1R1 | 120.000 |
| KA | 6.630 |

[Image Pickup State B]

Unit mm

Surface data

| Surface number | r | d | nd | vd |
|---|---|---|---|---|
| 1 | 120.000 | 3.00 | 1.51633 | 64.1 |
| 2 | 58.963 | (Variable) |  |  |
| 3 | 22.042 | 0.85 | 1.95906 | 17.5 |
| 4 | 16.960 | 5.95 | 1.88300 | 40.8 |
| 5 | 60.233 | (Variable) |  |  |
| 6 | 41.127 | 0.67 | 1.88300 | 40.8 |
| 7 | 6.004 | 4.56 |  |  |
| 8* | −15.101 | 0.40 | 1.76802 | 49.2 |
| 9 | −61.048 | 0.10 |  |  |
| 10 | 19.791 | 1.68 | 1.95906 | 17.5 |
| 11 | 100.369 | (Variable) |  |  |
| 12 (Stop) | ∞ | (Variable) |  |  |
| 13* | 8.290 | 2.34 | 1.76802 | 49.2 |
| 14* | −27.533 | 0.10 |  |  |
| 15 | 7.493 | 1.52 | 1.77250 | 49.6 |
| 16 | −33.393 | 0.45 | 2.00330 | 28.3 |
| 17 | 5.602 | (Variable) |  |  |
| 18* | 60.332 | 2.34 | 1.58313 | 59.4 |
| 19 | −11.902 | 0.00 |  |  |
| 20 | −11.902 | 0.40 | 2.00069 | 25.5 |
| 21 | −14.924 | (Variable) |  |  |
| 22 | 69.141 | 1.32 | 2.10205 | 16.8 |
| 23* | 117.239 | 3.68 |  |  |

-continued

Unit mm

| 24 | ∞ | 1.00 | 1.51633 | 64.1 |
|---|---|---|---|---|
| 25 | ∞ | 0.90 |  |  |
| Image plane | ∞ |  |  |  |

Aspherical surface data

Eighth surface

K = 0.00000e+000 A4 = 1.10165e−004 A6 = −4.59689e−006
A8 = 1.58044e−007 A10 = −2.46579e−009
Thirteenth surface K = 0.00000e+000 A4 = 1.29868e−004 A6 = 3.17162e−006
A8 = 1.87472e−006
Fourteenth surface K = 0.00000e+000 A4 = 5.50489e−004 A6 = 4.12641e−008
A8 = 3.19490e−006 A10 = 2.34722e−011
Eighteenth surface K = 0.00000e+000 A4 = −2.55396e−004 A6 = 2.05231e−005
A8 = −1.26680e−006 A10 = 3.23463e−008
Twenty-third surface K = 0.00000e+000 A4 = −4.94091e−005 A6 = 2.59160e−007

Various data
Zoom ratio 2.05

|  | Wide angle | Intermediate | Telephoto |
|---|---|---|---|
| Focal length | 6.86 | 10.04 | 14.08 |
| F number | 2.86 | 3.61 | 4.02 |
| Half field angle (degree) | 43.31 | 38.15 | 29.26 |
| Image height | 6.47 | 7.89 | 7.89 |
| Total lens length | 51.83 | 51.83 | 51.83 |
| BF | 5.24 | 5.24 | 5.24 |
| d2 | 5.00 | 5.33 | 3.51 |
| d5 | 0.78 | 1.20 | 3.77 |
| d11 | 6.95 | 3.98 | 1.02 |
| d12 | 2.60 | 0.99 | 1.02 |
| d17 | 2.57 | 4.30 | 3.21 |
| d21 | 3.00 | 5.09 | 8.36 |

Zoom lens unit data

| Unit | First surface | Focal length |
|---|---|---|
| 1 | 1 | −138.83 |
| 2 | 3 | 37.68 |
| 3 | 6 | −8.25 |
| 4 | 13 | 11.57 |
| 5 | 18 | 24.09 |
| 6 | 22 | 150.76 |

| Optical system B | Sixth lens unit |
|---|---|
| G1R1 | 120.000 |
| KB | 6.630 |
| vdB | 16.77 |
| ndB | 1.333 |

Example 7

[Image Pickup State A]

Unit mm

Surface data

| Surface number | r | d | nd | vd |
|---|---|---|---|---|
| 1 | 35.000 | 2.50 | 1.51633 | 64.1 |
| 2 | 16.611 | 2.45 |  |  |

-continued

Unit mm

| | | | | |
|---|---|---|---|---|
| 3* | −55.817 | 0.95 | 1.76802 | 49.2 |
| 4* | 8.388 | 4.01 | | |
| 5* | −10.616 | 0.60 | 1.69350 | 53.2 |
| 6* | 8.503 | 0.71 | | |
| 7 | 6.849 | 1.55 | 1.84666 | 23.8 |
| 8 | 18.073 | 6.46 | | |
| 9 (Stop) | ∞ | 0.00 | | |
| 10* | 5.312 | 2.28 | 1.69350 | 53.2 |
| 11* | 57.317 | 0.24 | | |
| 12 | 7.595 | 1.90 | 1.48749 | 70.2 |
| 13 | −32.027 | 0.50 | 1.85478 | 24.8 |
| 14 | 5.650 | 0.42 | | |
| 15* | 12.133 | 0.93 | 1.62263 | 58.2 |
| 16* | −18.168 | 1.30 | | |
| 17 | 10.356 | 1.41 | 1.49700 | 81.5 |
| 18 | −79.936 | 1.80 | | |
| 19 | 33.775 | 2.00 | 1.48749 | 70.2 |
| 20 | −68.646 | 1.60 | | |
| 21 | ∞ | 0.80 | 1.51633 | 64.1 |
| 22 | ∞ | 0.60 | | |
| Image plane | ∞ | | | |

Aspherical surface data

Third surface

K = 0.00000e+000 A4 = 1.96913e−003 A6 = −3.43582e−005
A8 = 2.16700e−007
Fourth surface K = 0.00000e+000 A4 = 2.13256e−003 A6 = 5.31361e−005
Fifth surface K = 0.00000e+000 A4 = 1.79510e−003 A6 = −5.09954e−005
Sixth surface K = 0.00000e+000 A4 = 2.43900e−003 A6 = −7.68185e−005
Tenth surface K = 0.00000e+000 A4 = 6.44904e−004 A6 = −8.62572e−006
A8 = 2.30619e−006
Eleventh surface K = 0.00000e+000 A4 = 2.66628e−003 A6−2.02907e−005
Fifteenth surface K = 0.00000e+000 A4 = 6.14923e−003 A6 = 1.03731e−004
A8 = 1.87482e−005
Sixteenth surface K = 0.00000e+000 A4 = 5.75731e−003 A6 = 1.01471e−004
A8 = 6.23622e−005

Various data

| | |
|---|---|
| Focal length | 3.05 |
| F number | 1.64 |
| Half field angle (degree) | 51.67 |
| Image height | 3.86 |
| Total lens length | 34.73 |
| BF | 2.73 |

Lens unit Data

| Lens unit | First surface | Focal length |
|---|---|---|
| 1 | 1 | −64.20 |
| 2 | 3 | −5.17 |
| 3 | 10 | 8.01 |
| 4 | 17 | 18.54 |
| 5 | 19 | 46.74 |

| Optical system A | Fifth lens unit |
|---|---|
| G1R1 | 35.000 |
| KA | 4.730 |

[Image Pickup State B]

Unit mm

Surface data

| Surface number | r | d | nd | vd |
|---|---|---|---|---|
| 1 | 35.000 | 2.50 | 1.51633 | 64.1 |
| 2 | 16.611 | 2.45 | | |
| 3* | −55.817 | 0.95 | 1.76802 | 49.2 |
| 4* | 8.388 | 4.01 | | |
| 5* | −10.616 | 0.60 | 1.69350 | 53.2 |
| 6* | 8.503 | 0.71 | | |
| 7 | 6.849 | 1.55 | 1.84666 | 23.8 |
| 8 | 18.073 | 6.46 | | |
| 9 (Stop) | ∞ | 0.00 | | |
| 10* | 5.312 | 2.28 | 1.69350 | 53.2 |
| 11* | 57.317 | 0.24 | | |
| 12 | 7.595 | 1.90 | 1.48749 | 70.2 |
| 13 | −32.027 | 0.50 | 1.85478 | 24.8 |
| 14 | 5.650 | 0.42 | | |
| 15* | 12.133 | 0.93 | 1.62263 | 58.2 |
| 16* | −18.168 | 1.30 | | |
| 17 | 10.356 | 1.41 | 1.49700 | 81.5 |
| 18 | −79.936 | 3.34 | | |
| 19 | 46.977 | 1.12 | 1.84666 | 23.8 |
| 20 | −30.644 | 0.93 | | |
| 21 | ∞ | 0.80 | 1.51633 | 64.1 |
| 22 | ∞ | 0.60 | | |
| Image plane | ∞ | | | |

Aspherical surface data

Third surface

K = 0.00000e+000 A4 = 1.96913e−003 A6 = −3.43582e−005
A8 = 2.16700e−007
Fourth surface K = 0.00000e+000 A4 = 2.13256e−003 A6 = 5.31361e−005
Fifth surface K = 0.00000e+000 A4 = 1.79510e−003 A6 = −5.09954e−005
Sixth surface K = 0.00000e+000 A4 = 2.43900e−003 A6 = −7.68185e−005
Tenth surface K = 0.00000e+000 A4 = 6.44904e−004 A6 = −8.62572e−006
A8 = 2.30619e−006
Eleventh surface K = 0.00000e+000 A4 = 2.66628e−003 A6 = 2.02907e−005
Fifteenth surface K = 0.00000e+000 A4 = 6.14923e−003 A6 = 1.03731e−004
A8 = 1.87482e−005
Sixteenth surface K = 0.00000e+000 A4 = 5.75731e−003 A6 = 1.01471e−004
A8 = 6.23622e−005

0Various data

| | |
|---|---|
| Focal length | 2.75 |
| F number | 1.64 |
| Half field angle (degree) | 54.51 |
| Image height | 3.86 |
| Total lens length | 34.73 |
| BF | 2.06 |

Lens unit Data

| Lens unit | First surface | Focal length |
|---|---|---|
| 1 | 1 | −39.09 |
| 2 | 3 | −5.17 |
| 3 | 10 | 8.01 |

-continued

Unit mm

| 4 | 17 | 18.54 |
| 5 | 19 | 22.05 |

| Optical system B | Fifth lens unit |
| --- | --- |
| G1R1 | 35.000 |
| KB | 3.186 |
| vdB | 23.78 |
| ndB | 1.333 |

TABLE 1

| Example | Image pickup state | Conditional expressions | | | | | | | |
| --- | --- | --- | --- | --- | --- | --- | --- | --- | --- |
| | | (1) or (1X) | (2) or (2X) | (3) or (3X) | (4A), (4B), or (4BX) | (5) or (5X) | (6) or (6X) | (7) | (8) |
| 1 | A | — | 0.614 | 1.746 | 0.127 | — | 0.940 | 3.67 | 1.29 |
|   | B | 1.333 |   | 1.746 | 0.108 | 17.47 |   |   |   |
| 2 | A | — | 0.070 | 1.746 | 0.212 (Wide angle) 0.431 (Telephoto) | — | 0.935 | 1.22 | 1.00 |
|   | B | 1.333 |   | 1.746 | 0.223 (Wide angle) 0.444 (Telephoto) | 52.43 |   |   |   |
| 3 | A | — | 1.331 | 1.746 | 0.127 | — | 0.906 | 2.70 | 1.22 |
|   | B | 1.333 |   | 1.746 | 0.118 | 23.78 |   |   |   |
| 4 | A | — | 0.542 | 0.940 | 0.127 | — | 0.896 | 2.70 | 1.22 |
|   | B | 1.333 |   | 0.940 | 0.124 | 23.78 |   |   |   |
| 5 | A | — | 0.326 | 0.940 | — | — | 0.863 |   |   |
|   | B | 1.333 |   | 0.940 | 0.131 | 16.77 |   |   |   |
| 6 | A | — | 0.177 | 2.315 | 0.128 | — | 0.936 | 3.82 | 1.39 |
|   | B | 1.333 |   | 2.315 | 0.128 | 16.77 |   |   |   |
| 7 | A | — | 0.838 | 1.008 | 0.136 | — | 0.902 | 2.95 | 1.24 |
|   | B | 1.333 |   | 1.008 | 0.092 | 23.78 |   |   |   |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-078355, filed Apr. 7, 2015, which is hereby incorporated by reference herein in its entirety.

What is claimed is:

1. An image pickup apparatus, comprising: an image pickup optical system including a protection lens arranged closest to a light incident side and having a convex-shaped surface on the light incident side an aperture stop, an optical system A, and an optical system B having different optical characteristics from the optical system A;
a housing configured to house the image pickup optical system and separate a medium outside the housing and a medium inside the housing; and
a switching unit arranged in the housing, connected to the optical system A and the optical system B, and configured to place the optical system A in an optical path of the image pickup optical system and the optical system B out of the optical path when the medium outside the housing is a first medium, and to place the optical system A out of the optical path and the optical system B in the optical path when the medium outside the housing is a second medium different from the first medium.

2. The image pickup apparatus according to claim 1, wherein the protection lens is fixed and held by the housing.

3. The image pickup apparatus according to claim 1, wherein each of the optical system A and the optical system B consists of at most two lenses.

4. The image pickup apparatus according to claim 1, wherein the following conditional expression is satisfied:

$$0.04 < (fA - fB) \times G1R1 / (fA \times fB) < 1.80,$$

where fA represents a focal length of the optical system A, fB represents a focal length of the optical system B, and G1R1 represents a curvature radius of a lens surface on the light incident side of the protection lens.

5. The image pickup apparatus according to claim 1, wherein the following conditional expression is satisfied:

$$0.50 < G1R1/L < 3.00,$$

where G1R1 represents a curvature radius of a lens surface on the light incident side of the protection lens, and L represents a total lens length of the image pickup optical system.

6. The image pickup apparatus according to claim 1, wherein the following conditional expressions are satisfied:

$$0.02 < KA/L < 0.60; \text{ and}$$

$$0.02 < KB/L < 0.60,$$

where KA represents a distance from a vertex of a lens surface closest to the light incident side of the optical system A to an image plane when the optical system A is placed in the optical path of the image pickup optical system, KB represents a distance from a vertex of a lens surface closest to the light incident side of the optical system B to the image plane when the optical system B is placed in the optical path of the image pickup optical system, and L represents a total lens length of the image pickup optical system.

7. The image pickup apparatus according to claim 1, wherein the optical system B includes at least one positive lens, and
wherein the following conditional expression is satisfied:

$$10.0 < vdB < 62.0,$$

where vdB represents an Abbe number of a material of a positive lens Bp having a highest refractive power in the optical system B.

8. The image pickup apparatus according to claim 1, wherein the following conditional expression is satisfied:

$$0.80 < fWB/fWA < 1.02,$$

where fWA represents a focal length of an entire system of the image pickup optical system when the optical system A is placed in the optical path of the image pickup optical system, and fWB represents a focal length of the entire system when the optical system B is placed in the optical path of the image pickup optical system.

9. The image pickup apparatus according to claim 7, wherein the second medium satisfies the following conditional expression:

$$1.10 < nd < 1.50,$$

where nd represents a refractive index of the second medium with respect to a d-line.

10. The image pickup apparatus according to claim 1, wherein the optical system A includes at least one positive lens, and the optical system B includes at least one positive lens, and
wherein the following conditional expression is satisfied:

$$1.00 < vdA/vdB < 5.00,$$

where vdA represents an Abbe number of a material of a positive lens Ap having a highest refractive power of the at least one positive lens included in the optical system A, and vdB represents an Abbe number of a material of a positive lens Bp having a highest refractive power of the at least one positive lens included in the optical system B.

11. The image pickup apparatus according to claim 1, wherein the optical system A includes at least one positive lens, and the optical system B includes at least one positive lens, and
wherein the following conditional expression is satisfied:

$$1.00 \leq ndGB/ndGA < 1.60,$$

where ndGA represents a refractive index with respect to a d-line of a material of a positive lens Ap having a highest refractive power of the at least one positive lens included in the optical system A, and ndGB represents a refractive index with respect to the d-line of a material of a positive lens Bp having a highest refractive power of the at least one positive lens included in the optical system B.

12. An image pickup apparatus, comprising: an image pickup optical system including a protection lens, arranged closest to a light incident side and having a convex-shaped surface on the light incident side an aperture stop, and an optical system C; a housing configured to house the image pickup optical system and separate a medium outside the housing and a medium inside the housing; and an insertion/removal unit arranged in the housing directly connected to the optical system C, and configured to insert or remove the optical system C into or from an optical path of the image pickup optical system on an image side of the aperture stop depending on the medium outside the housing, wherein the following conditional expression is satisfied: $0.04 < (1/fC) \times G1R1 < 1.80$, where C represents a focal length of the optical system C, and G1R1 represents a curvature radius of a lens surface on the light incident side of the protection lens.

13. The image pickup apparatus according to claim 12, wherein the protection lens is fixed and held by the housing.

14. The image pickup apparatus according to claim 12, wherein the optical system C consists of at most two lenses.

15. The image pickup apparatus according to claim 12, wherein the following conditional expression is satisfied:

$$0.50 < G1R1/L < 3.00,$$

where G1R1 represents a curvature radius of a lens surface on the light incident side of the protection lens, and L represents a total lens length of the image pickup optical system.

16. The image pickup apparatus according to claim 12, wherein the following conditional expression is satisfied:

$$0.02 < KC/L < 0.60,$$

where KC represents a distance from a vertex of a lens surface closest to the light incident side of the optical system C to an image plane when the optical system C is placed in the optical path of the image pickup optical system, and L represents a total lens length of the image pickup optical system.

17. The image pickup apparatus according to claim 12, wherein the optical system C includes at least one positive lens, and
wherein the following conditional expression is satisfied:

$$10.0 < vdC < 62.0,$$

where vdC represents an Abbe number of a material of a positive lens Cp having a highest refractive power in the optical system C.

18. The image pickup apparatus according to claim 12, wherein the following conditional expression is satisfied:

$$0.80 < fWC1/fWC2 < 1.02,$$

where fWC1 represents a focal length of an entire system of the image pickup optical system when the optical system C is placed in the optical path of the image pickup optical system, and fWC2 represents a focal length of the entire system when the optical system C is not placed in the optical path of the image pickup optical system.

19. The image pickup apparatus according to claim 12, wherein the medium outside the housing is a medium that satisfies the following conditional expression:

$$1.10 < nd < 1.50,$$

where nd represents a refractive index of the medium outside the housing with respect to a d-line.

* * * * *